US012707295B2

(12) United States Patent
Fan et al.

(10) Patent No.: US 12,707,295 B2
(45) Date of Patent: Aug. 11, 2026

(54) BEAM FAILURE RECOVERY METHOD AND APPARATUS

(71) Applicant: HUAWEI TECHNOLOGIES CO., LTD., Shenzhen (CN)

(72) Inventors: Bo Fan, Chengdu (CN); Xi Zhang, Chengdu (CN); Shitong Yuan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 277 days.

(21) Appl. No.: 18/467,711

(22) Filed: Sep. 14, 2023

(65) Prior Publication Data

US 2024/0064538 A1 Feb. 22, 2024

Related U.S. Application Data

(63) Continuation of application No. PCT/CN2022/082687, filed on Mar. 24, 2022.

(30) Foreign Application Priority Data

Apr. 2, 2021 (CN) ......................... 202110362327.3
May 11, 2021 (CN) ......................... 202110513313.7

(51) Int. Cl.
*H04W 24/04* (2009.01)
*H04W 72/044* (2023.01)

(52) U.S. Cl.
CPC ......... *H04W 24/04* (2013.01); *H04W 72/046* (2013.01)

(58) Field of Classification Search
CPC ............................ H04W 24/04; H04W 72/046
See application file for complete search history.

(56) References Cited

U.S. PATENT DOCUMENTS

2019/0253986 A1* 8/2019 Jeon ...................... H04W 16/28
2022/0217653 A1* 7/2022 Kung .................. H04W 52/367

(Continued)

FOREIGN PATENT DOCUMENTS

CA 3193620 A1 4/2022
CN 107959554 * 4/2018

(Continued)

OTHER PUBLICATIONS

3rd Generation Partnership Project; Technical Specification Group Radio Access Network; NR;Physical layer procedures for control(Release 15),3GPP TS 38.213 V15.11.0 (Sep. 2020),total: 109pages.
3rd Generation Partnership Project; Technical Specification Group Radio Access Network; NR;Radio Resource Control (RRC) protocol specification(Release 15),3GPP TS 38.331 V15.13.0 (Mar. 2021),total:540pages.

(Continued)

*Primary Examiner* — Mewale A Ambaye

(57) ABSTRACT

This application provides a beam failure recovery method and an apparatus. The method includes: A terminal device receives configuration information of a cell, where the configuration information of the cell includes M beam failure detection resource groups and M candidate beam resource groups, the M beam failure detection resource groups are in a one-to-one correspondence with the M candidate beam resource groups, and M is an integer. When M is an integer greater than 1, and a beam failure occurs in at least one of the M beam failure detection resource groups, the terminal device sends, by using a first media access control control element (MAC CE), beam failure recovery information corresponding to the cell. According to the beam failure recovery method provided in this application, beam failure recovery can be performed in time.

20 Claims, 11 Drawing Sheets

(56) References Cited

U.S. PATENT DOCUMENTS

2023/0180332 A1* 6/2023 Agiwal ................. H04W 76/19
370/216
2023/0283510 A1* 9/2023 Yapici .................. H04B 1/0475
375/262
2024/0032115 A1* 1/2024 Wu ................... H04W 74/0841
2024/0064517 A1* 2/2024 Yapici ................. H04L 63/1491

FOREIGN PATENT DOCUMENTS

CN 112351450 * 2/2021
CN 112351450 A 2/2021
WO WO-2021034672 A1 * 2/2021 ............. H04L 5/001
WO 2022206533 A1 10/2022

OTHER PUBLICATIONS

3GPP TSG-RAN WG2 Meeting#109,SAMSUNG:"Summary of email discussion [108#70] [NR-eMIMO]:BFR MAC CE", R2-2000227,Feb. 2020,XP051848517,total 11 pages.

3GPP TS 38.321 V16.4.0 (Mar. 2021),3rd Generation Partnership Project; Technical Specification Group Radio Access Network;NR;Medium Access Control (MAC) protocol specification (Release 16),total 156 pages.

3GPP TSG RAN WG1 Meeting #103-e R1-2009253, "Enhancements on beam management for multi-TRP", Qualcomm Incorporated, Oct. 26-Nov. 13, 2020,total 7 pages.

3GPP TSG RAN WG1#104-e R1-2100276,"Enhancements on beam management for multi-TRP",Lenovo,Motorola Mobility,Meeting, Jan. 25-Feb. 5, 2021,total 9 pages.

* cited by examiner

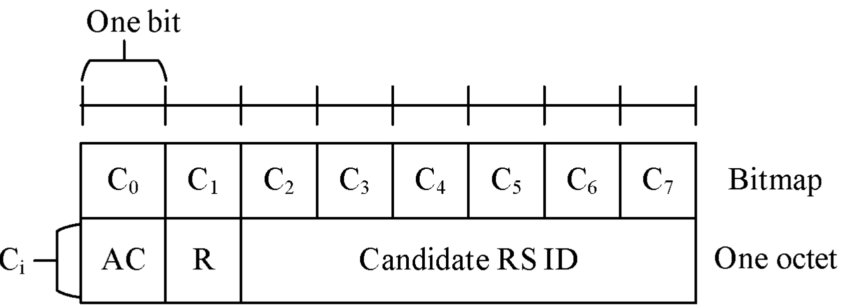

FIG. 4

Method 500

Terminal device

Network device

510: Configuration information of a cell, where the configuration information of the cell includes M beam failure detection resource groups and M candidate beam resource groups, the M beam failure detection resource groups are in a one-to-one correspondence with the M candidate beam resource groups, and M is an integer 520: Beam failure detection 530: When M is an integer greater than 1, and a beam failure occurs in at least one of the M beam failure detection resource groups, send, by using a first MAC CE, beam failure recovery information corresponding to the cell

FIG. 5

BEAM FAILURE RECOVERY METHOD AND APPARATUS

CROSS-REFERENCE TO RELATED APPLICATIONS

This application is a continuation of International Application No. PCT/CN2022/082687, filed on Mar. 24, 2022, which claims priority to Chinese Patent Application No. 202110362327.3, filed on Apr. 2, 2021 and Chinese Patent Application No. 202110513313.7, filed on May 11, 2021. All of the aforementioned patent applications are hereby incorporated by reference in their entireties.

TECHNICAL FIELD

This application relates to the field of communication technologies, and more specifically, to a beam failure recovery method and an apparatus.

BACKGROUND

A 5th generation (5G) mobile communication system uses high-frequency communication based on an analog beam. The analog beam has narrow signal coverage, and is easily blocked by an obstacle, resulting in a beam failure (beam failure). To resolve the foregoing problem, a beam failure recovery (BFR) procedure is provided in Release (Rel) 15 of the 5G system. The procedure includes: A network device configures, for a terminal device, one beam failure detection resource group used for beam failure detection and one candidate beam resource group used to determine a candidate beam of a current beam. When detecting that quality of each resource in the beam failure detection resource group is lower than a threshold 1, the terminal device determines that a beam failure occurs. When there is a resource whose quality is higher than a threshold 2 in one corresponding candidate beam resource group, the terminal device may determine one candidate beam to perform beam failure recovery. The candidate beam is a beam corresponding to a candidate beam resource whose quality is higher than the threshold 2 in the candidate beam resource group.

However, in some scenarios, a plurality of beam failure detection resource groups and a plurality of candidate beam resource groups may need to be configured in one cell for local beam failure detection and recovery. For example, when a cell includes a plurality of transmission reception points (TRPs), the terminal device needs to perform beam failure detection and recovery for each TRP in the cell. In the foregoing scenario, if the foregoing BFR method is used to perform beam failure recovery, because the terminal device determines that the beam failure occurs and performs beam failure recovery only when quality of all beam failure detection resources configured by the network device is lower than the threshold 1, the terminal device cannot perform beam failure recovery in time.

Therefore, a beam failure recovery method is urgently needed, to perform beam failure recovery in time.

SUMMARY

This application provides a beam failure recovery method, to perform beam failure recovery in time.

According to a first aspect, a beam failure recovery method is provided, and includes the following steps:

A terminal device receives configuration information of a cell, where the configuration information of the cell includes M beam failure detection resource groups and M candidate beam resource groups, the M beam failure detection resource groups are in a one-to-one correspondence with the M candidate beam resource groups, and M is an integer.

When M is an integer greater than 1, and a beam failure occurs in at least one of the M beam failure detection resource groups, the terminal device sends, by using a first medium access control control element (MAC CE), beam failure recovery information corresponding to the cell.

Corresponding to the foregoing method, a communication apparatus is further disclosed. The apparatus may be the foregoing terminal device, or may be a chip or a function module in the terminal device, and includes:

a receiving unit, configured to receive configuration information of a cell, where the configuration information of the cell includes M beam failure detection resource groups and M candidate beam resource groups, the M beam failure detection resource groups are in a one-to-one correspondence with the M candidate beam resource groups, and M is an integer; and a sending unit, configured to: when M is an integer greater than 1, and a beam failure occurs in at least one of the M beam failure detection resource groups, send, by using a first medium access control control element (MAC CE), beam failure recovery information corresponding to the cell.

The M beam failure detection resource groups and the M candidate beam resource groups that are included in the configuration information of the cell are information configured by the network device for the terminal device. It may be understood that when M is equal to 1, the M beam failure detection resource groups and the M candidate beam resource groups are configured by one network device. In this case, the cell may be understood as a single-TRP cell. When M is an integer greater than 1, the M beam failure detection resource groups and the M candidate beam resource groups are configured by the M network devices. In this case, the cell may be understood as a multi-TRP cell. It should be further understood that when the cell is a multi-TRP cell (in other words, M is an integer greater than 1), a downlink signal in the cell is simultaneously sent to the terminal device by using a plurality of TRPs. In this case, the plurality of TRPs may be considered as one network device, or the plurality of TRPs may be considered as a plurality of transmitters of an entire network device. In this embodiment of this application, the descriptions, such as "by using a plurality of TRPs", "a plurality of beam failure detection resource groups are configured", and "a plurality of candidate beam resource groups are configured" are equivalent to each other. Meanings indicated by the descriptions are consistent when a difference is not emphasized.

Optionally, the configuration information of the cell may further include a scheduling request (SR) resource. If the network device configures a plurality of cells for one terminal device, and at least one of the plurality of cells is a multi-TRP cell, the network device needs to configure a plurality of SR resources for the one terminal device, and the plurality of SR resources are in a one-to-one correspondence with a plurality of TRPs, or the network device configures one SR resource, but the one SR resource has a plurality of spatial relation (spatial relation) parameters (that is, uplink transmit beams). If all cells configured by the network device for the terminal device are single-TRP cells, the network device needs to configure only one SR resource, and the one SR resource has only a single spatial relation (spatial relation) parameter.

Optionally, if the network device configures a plurality of cells for the terminal device, and the plurality of cells include the cell, the configuration information received by the terminal device not only includes the configuration information of the cell, but also includes configuration information of a cell other than the cell in the plurality of cells.

In the foregoing technical solution, when the terminal device determines that the cell is the multi-TRP cell (in other words, M is the integer greater than 1), and the beam failure occurs in at least one of the M beam failure detection resource groups configured for the cell, the terminal device can report, by using the first MAC CE, beam failure recovery information corresponding to the at least one beam failure detection resource group. In other words, when the beam failure recovery method provided in this application is applied to a multi-TRP cell, provided that the terminal device determines that a beam failure occurs in one TRP in the multi-TRP cell, the terminal device may report, by using the first MAC CE, beam failure recovery information corresponding to the one TRP in which the beam failure occurs, so that beam failure recovery can be implemented in the multi-TRP cell in time.

With reference to the first aspect, in some implementations of the first aspect, the first MAC CE includes one bitmap.

If configuration information of a cell corresponding to any bit in the bitmap includes N beam failure detection resource groups and N candidate beam resource groups, N is 0 or 1, and a value of the any bit is a first value by default, the first value indicates that no beam failure occurs in the cell corresponding to the any bit.

In the foregoing technical solution, when one cell corresponding to any bit in one bitmap included in the first MAC CE is a single-TRP cell, regardless of a value (for example, 0 or 1) of the any bit, the terminal device considers by default that no beam failure occurs in the one cell corresponding to the any bit. It may also be understood as that, when the configuration information of the cell corresponding to the any bit includes the N beam failure detection resource groups and the N candidate beam resource groups, and N is 0 or 1, the value of the any bit is the first value by default, the first value indicates that no beam failure occurs in the cell corresponding to the any bit, and the first value may be 0 or 1. In other words, the first MAC CE provided in this embodiment of this application is only used to report beam failure recovery information of a multi-TRP cell. For a single-TRP cell, even if the beam failure occurs in the single-TRP cell, the first MAC CE is not used to report beam failure recovery information of the single-TRP cell.

With reference to the first aspect, in some implementations of the first aspect, the any bit in the bitmap corresponds to M octets.

The M octets are in a one-to-one correspondence with the M beam failure detection resource groups.

Alternatively, the M octets are in a one-to-one correspondence with the M candidate beam resource groups.

Alternatively, the M octets are in a one-to-one correspondence with M transmission reception points TRPs.

The M beam failure detection resource groups and the M candidate beam resource groups are configured for the M TRPs. It may be understood that, in this embodiment of this application, descriptions, such as “TRP”, “beam failure detection resource group”, and “candidate beam resource group” are equivalent to each other. Meanings indicated by the descriptions are consistent when a difference is not emphasized.

The any bit corresponds to the M octets. The any bit may be understood as one bit corresponding to one cell configured by the network device for the terminal device, and the one cell corresponding to the any bit is a multi-TRP cell in which the beam failure occurs. For example, the beam failure may occur in one TRP in the multi-TRP cell. Alternatively, the beam failure may occur in some or all TRPs in the multi-TRP cell. That a beam failure occurs in one cell may be understood as that the terminal device detects that the beam failure occurs in M beam failure detection resource groups included in configuration information of the one cell.

With reference to the first aspect, in some implementations of the first aspect, each of the M octets includes one first field, and the first field indicates whether a beam failure is detected in a beam failure detection resource group corresponding to each octet.

In this embodiment of this application, the beam failure detection resource group and the TRP may be equivalent to each other. In other words, the first field may also indicate whether a beam failure occurs in a TRP corresponding to each octet. A length of the first field may be one bit. In this case, the first field may be located in a first bit or a second bit of an octet of the first field. Optionally, the length of the first field may alternatively be more bits. For example, the length of the first field may alternatively be two bits. In this case, the first field may use any two bits (for example, first two bits) of the octet of the first field.

With reference to the first aspect, in some implementations of the first aspect, a remaining field in each octet is reserved if the first field indicates that no beam failure is detected in the beam failure detection resource group corresponding to each octet.

With reference to the first aspect, in some implementations of the first aspect, each of the M octets further includes one second field.

The second field indicates whether there is a candidate beam resource meeting a quality requirement in a candidate beam resource group corresponding to each octet.

Optionally, the second field indicates whether there is information about a candidate beam resource in each octet. In this embodiment of this application, the candidate beam resource group and the TRP may be equivalent to each other. In other words, the second field may alternatively indicate whether there is a candidate beam resource meeting the quality requirement in the TRP corresponding to each octet. A length of the second field may be one bit. In this case, the second field may be located in a first bit, a second bit, or a third bit of an octet of the second field. Optionally, the length of the second field may alternatively be more bits. For example, the length of the second field may alternatively be two bits. In this case, the second field may use any two bits (for example, first two bits) of the octet of the second field.

It may be understood that when the second field indicates that there is a candidate beam resource meeting the quality requirement in the candidate beam resource group corresponding to the octet of the second field, another remaining field in the octet of the second field carries further beam failure recovery information. When the second field indicates that there is no candidate beam resource meeting the quality requirement in the candidate beam resource group corresponding to the octet of the second field, a remaining field in the octet of the second field is reserved, that is, there is no beam failure recovery information, and the terminal device may ignore the remaining field.

With reference to the first aspect, in some implementations of the first aspect, each of the M octets further includes one third field.

The third field indicates information about the candidate beam resource that meets the quality requirement and that is determined in the candidate beam resource group corresponding to each octet.

In this embodiment of this application, the candidate beam resource group and the TRP may be equivalent to each other. In other words, the third field may alternatively indicate whether there is information about the candidate beam resource meeting the quality requirement in the TRP corresponding to each octet. A length of the third field may be six bits or five bits. For example, when the length of the third field is six bits, the third field may be specifically last six bits of the octet of the field. For example, when the length of the third field is five bits, the third field may be specifically last five bits of the octet of the field. Optionally, the length of the third field may alternatively be another value. This is not specifically limited herein.

In the foregoing technical solution, a type of first MAC CE is provided, and is denoted as a first type of first MAC CE. It may be understood that, in some implementations, one bit in a bitmap included in the first type of first MAC CE corresponds to one field, and the one field corresponds to one cell. In some other implementations, the first type of first MAC CE includes a plurality of fields, each of the plurality of fields corresponds to one cell, and each of the plurality of fields uses a plurality of bits (two bits or more than two bits). In this case, the plurality of fields may be considered as one entire bitmap. In other words, one field in the bitmap included in the first MAC CE includes a plurality of bits, and the one field corresponds to one cell. A first field included in the first type of first MAC CE indicates whether a beam failure occurs in a beam failure detection resource group corresponding to an octet of the field. A second field included in the first type of first MAC CE indicates whether there is a candidate beam resource meeting the quality requirement in a candidate beam resource group corresponding to a beam failure detection resource group corresponding to an octet of the field. A third field included in the first type of first MAC CE indicates information about a candidate beam resource meeting the quality requirement in a candidate beam resource group corresponding to an octet of the field. It may be understood that the first type of first MAC CE may include any one of the following fields: the first field, the second field, and the third field. After the network device receives the first type of first MAC CE sent by the terminal device, the network device may determine a beam failure recovery policy by using the first type of first MAC CE, so that beam failure recovery can be implemented in a multi-TRP cell in time.

With reference to the first aspect, in some implementations of the first aspect, the any bit in the bitmap corresponds to one or more octets.

With reference to the first aspect, in some implementations of the first aspect, a $1^{st}$ octet in the one or more octets includes one fourth field.

The fourth field indicates a quantity of octets corresponding to the any bit.

The any bit corresponds to the one or more octets. A cell corresponding to the any bit may be understood as a multi-TRP cell in which the beam failure occurs. A specific quantity of octets corresponding to the any bit is equal to a quantity of TRPs in which the beam failure occurs in the multi-TRP cell corresponding to the any bit. Specifically, when the beam failure occurs in only one TRP in the multi-TRP cell corresponding to the any bit, the any bit corresponds to only one octet, in other words, the second type of first MAC CE includes only one octet corresponding to the any bit. For example, there are two TRPs in the multi-TRP cell in total. When the beam failure occurs in only one of the two TRPs, a bit corresponding to the multi-TRP cell in the bitmap corresponds to only one octet, and the one octet corresponds to the TRP in which the beam failure occurs. In this case, the second type of first MAC CE includes only one octet corresponding to the any bit. When the beam failure occurs in only a plurality of TRPs in the multi-TRP cell corresponding to any bit, the any bit corresponds to only a plurality of octets, in other words, the bitmap includes the plurality of octets corresponding to the any bit. For example, there are two TRPs in the multi-TRP cell in total. When the beam failure occurs in the two TRPs, a bit corresponding to the multi-TRP cell in the bitmap corresponds to only two octets, and the two octets correspond to the two TRPs in which the beam failure occurs. In this case, the second type of first MAC CE includes the two octets corresponding to the any bit. In the foregoing technical solution, a quantity of TRPs in which a beam failure occurs in a multi-TRP cell corresponding to any bit in the bitmap may be determined based on the fourth field, and a quantity of octets corresponding to the any bit is dynamically adjusted. This helps reduce resource overheads. In addition, it may be further determined, based on the fourth field, whether a next octet of the $1^{st}$ octet in a plurality of octets corresponding to any bit carries beam failure recovery information of a cell corresponding to the any bit. Optionally, the fourth field may also be understood as indicating the quantity of TRPs in which the beam failure occurs in the multi-TRP cell.

Optionally, the fourth field may also be understood as indicating a quantity of beam failure detection resource groups in which beam failure occurs in the multi-TRP cell. For example, it may be defined as follows: the fourth field set to 0 indicates that a beam failure occurs in a single TRP in the multi-TRP cell, and the fourth field set to 1 indicates that a beam failure occurs in a plurality of TRPs in the multi-TRP cell.

Optionally, the fourth field may also be understood as indicating a beam failure type. The beam failure type may include: a beam failure occurs in a single TRP in the multi-TRP cell, a beam failure occurs in a plurality of TRPs in the multi-TRP cell, or the beam failure occurs in all TRPs in the multi-TRP cell. For example, a cell #1 is a cell in which a plurality of TRP are used for transmission. The cell #1 includes four TRPs in total, and the four TRPs communicate with a same terminal device. In this case, the fourth field may indicate that a beam failure occurs in one TRP, two TRPs, three TRPs, or four TRPs in the cell #1.

With reference to the first aspect, in some implementations of the first aspect, the fourth field is one field in the $1^{st}$ octet in the one or more octets.

The fourth field indicates whether the next octet of the $1^{st}$ octet carries the beam failure recovery information corresponding to the cell.

The fourth field may be located in a first bit or a second bit in the $1^{st}$ octet. In this case, a length of the fourth field is one bit. Optionally, a length of the fourth field may alternatively be more bits. For example, the length of the fourth field may alternatively be two bits. In this case, the fourth field may use any two bits (for example, first two bits) of the octet of the fourth field.

That the fourth field indicates whether the next octet of the $1^{st}$ octet carries the beam failure recovery information corresponding to the cell may also be understood as that the fourth field may indicate whether the first MAC CE includes a $2^{nd}$ octet corresponding to the cell corresponding to the any bit. The fourth field may be located in a first bit or a second bit in the 1st octet. In this case, a length of the fourth field is one bit. Optionally, a length of the fourth field may alternatively be more bits. For example, the length of the fourth field may alternatively be two bits. In this case, the fourth field may use first two bits of the octet of the fourth field.

With reference to the first aspect, in some implementations of the first aspect, the 1st octet in the one or more octets further includes a fifth field.

The fifth field indicates information about a TRP in which a beam failure occurs.

In this embodiment of this application, a type of the information about the TRP in which the beam failure occurs is not limited. For example, the information about the TRP in which the beam failure occurs may be information about an index of the TRP in which the beam failure occurs. The index of the TRP may be an index of one beam failure detection resource group, namely, an index of a beam failure detection resource group corresponding to the TRP. Alternatively, the index of the TRP may be an index of one candidate beam resource group, namely, an index of a candidate beam resource group corresponding to the TRP. Alternatively, the index of the TRP may be an index of one CORESET group, namely, CORESETPoolIndex.

Optionally, the first MAC CE may further include a plurality of fifth fields. For example, the first MAC CE may include three fifth fields, which are denoted as a fifth field #1, a fifth field #2, and a fifth field #3. The fifth field #1 indicates an index of a beam failure detection resource group corresponding to the TRP in which the beam failure occurs. The fifth field #2 indicates an index of a candidate beam resource group corresponding to the TRP in which the beam failure occurs. The fifth field #2 indicates an index of a CORESET group corresponding to the TRP in which the beam failure occurs.

A length of the fifth field may be one bit, or a length of the fifth field may be more bits. For example, the length of the fifth field may alternatively be two bits. In this case, the fifth field may use any two bits (for example, first two bits) of an octet of the fifth field.

With reference to the first aspect, in some implementations of the first aspect, each of the one or more octets further includes one sixth field, and the sixth field indicates a beam failure detection resource group corresponding to each octet or a candidate beam resource group corresponding to each octet.

A length of the sixth field may be one bit, or a length of the sixth field may be more bits. This is not specifically limited herein.

With reference to the first aspect, in some implementations of the first aspect, each of the one or more octets further includes one seventh field, and the seventh field indicates whether there is a candidate beam or candidate beam resource meeting a quality requirement in the candidate beam resource group corresponding to each octet. Alternatively, the seventh field indicates whether there is information about a candidate beam resource in each octet. In this embodiment of this application, the candidate beam resource group and the TRP may be equivalent to each other. In other words, the seventh field may alternatively indicate whether there is a candidate beam resource meeting the quality requirement in a TRP corresponding to each octet. A length of the seventh field may be one bit, and the seventh field may be located in a first bit, a second bit, or a third bit in the corresponding octet. For example, if any bit corresponds to a plurality of octets, a seventh field in a 1st octet in the plurality of octets may be located in a 3rd bit in the 1st octet, and a seventh field in a 2nd octet in the plurality of octets may also be located in a 3rd bit in the 2nd octet, or the seventh field in the 2nd octet may be located in a 1st bit in the 2nd octet. Optionally, a length of the seventh field may alternatively be more bits. This is not specifically limited herein.

With reference to the first aspect, in some implementations of the first aspect, each of the one or more octets further includes one eighth field, and the eighth field indicates information about the candidate beam or candidate beam resource that meets the quality requirement and that is determined in the candidate beam resource group corresponding to each octet. In this embodiment of this application, the candidate beam resource group and the TRP may be equivalent to each other. In other words, the eighth field may alternatively indicate information about the candidate beam resource meeting the quality requirement in the TRP corresponding to each octet. A length of the eighth field may be six bits or five bits. For example, when the length of the eighth field is six bits, the eighth field may be specifically last six bits of the octet of the field. For example, when the length of the eighth field is five bits, the eighth field may be specifically last five bits of the octet of the field. Optionally, the length of the eighth field may alternatively be another value. This is not specifically limited herein. It may be understood that in this embodiment of this application, there are two definition manners for the eighth field. The eighth field indicates the information about the candidate beam resource that meets the quality requirement and that is determined in the candidate beam resource group corresponding to each octet. This is a first definition manner for the eighth field provided in this embodiment of this application.

In the foregoing technical solution, another type of first MAC CE is provided, and is denoted as a second type of first MAC CE. It may be understood that, in some implementations, one bit in a bitmap included in the second type of first MAC CE corresponds to one field, and the one field corresponds to one cell. In some other implementations, the second type of first MAC CE includes a plurality of fields, each of the plurality of fields corresponds to one cell, and each of the plurality of fields uses a plurality of bits (two bits or more than two bits). In this case, the plurality of fields may be considered as one entire bitmap. In other words, one field in the bitmap included in the first MAC CE includes a plurality of bits, and the one field corresponds to one cell.

The second type of first MAC CE may include any one of the following fields: the fourth field, the fifth field, the seventh field, and the eighth field.

After the network device receives the second type of first MAC CE sent by the terminal device, the network device may determine a beam failure recovery policy by using the second type of first MAC CE, so that beam failure recovery can be implemented in a multi-TRP cell in time.

In some implementations, each of the one or more octets includes the fourth field, the sixth field, the seventh field, and the eighth field.

In the foregoing technical solution, another type of first MAC CE is provided, and is denoted as a third type of first MAC CE. It may be understood that, in some implementations, one bit in a bitmap included in the third type of first MAC CE corresponds to one field, and the one field corresponds to one cell. In some other implementations, the third type of first MAC CE includes a plurality of fields, each of the plurality of fields corresponds to one cell, and each of the plurality of fields uses a plurality of bits (two bits or more than two bits). In this case, the plurality of fields corresponding to a cell may be considered as one entire bitmap.

In other words, one field in the bitmap included in the first MAC CE includes a plurality of bits, and the one field corresponds to one cell. The third type of first MAC CE may include the fourth field, the sixth field, the seventh field, and the eighth field. After the network device receives the third type of first MAC CE sent by the terminal device, the network device may determine a beam failure recovery policy by using the third type of first MAC CE, so that beam failure recovery can be implemented in a multi-TRP cell in time. It may be understood that specific formats of the foregoing three types of first MAC CEs provided in this embodiment of this application are merely examples, and do not constitute any limitation on the specific format of the first MAC CE provided in this embodiment of this application. Optionally, in some implementations, the first MAC CE provided in this embodiment of this application may include any one or more of the plurality of fields (the plurality of fields include the first field, the second field, the third field, the fourth field, the fifth field, the sixth field, the seventh field, and the eighth field). For example, in some implementations, the first MAC CE may include only the first field. For example, in some implementations, the first MAC CE may include the fourth field. For example, in some implementations, the first MAC CE may include the sixth field. For example, in some implementations, the first MAC CE may include the first field and the second field. For example, in some implementations, the first MAC CE may alternatively include the first field, the second field, and the fourth field. For example, in some implementations, the first MAC CE may alternatively include the fourth field and the fifth field.

With reference to the first aspect, in some implementations of the first aspect, each of the one or more octets further includes one eighth field. A value of the eighth field includes a plurality of field values. One of the plurality of field values indicates that there is no candidate beam resource meeting the quality requirement in the candidate beam resource group corresponding to each octet. Each field value that is different from the one field value and that is in the plurality of field values indicates information about one candidate beam resource meeting the quality requirement.

The eighth field is a second definition manner provided in this embodiment of this application. The eighth field may include a plurality of bits. For example, the eighth field includes four bits, five bits, six bits, seven bits, or the like.

With reference to the first aspect, in some implementations of the first aspect, the first MAC CE further includes one tenth field.

The tenth field indicates a beam failure type. When M is equal to 2, the beam failure type includes: a beam failure occurs in a 1$^{st}$ beam failure detection resource group in the M beam failure detection resource groups, a beam failure occurs in a 2$^{nd}$ beam failure detection resource group in the M beam failure detection resource groups, or a beam failure occurs in two of the M beam failure detection resource groups.

M may be equal to but is not limited to 2. M may alternatively be another integer greater than 1. For example, M may alternatively be equal to 3, 4, 5, or the like. Correspondingly, the tenth field indicates more beam failure types. For example, when M is equal to 3, the tenth field indicates that the beam failure type may include: a beam failure occurs in a 1$^{st}$ beam failure detection resource group in three beam failure detection resource groups, a beam failure occurs in a 2$^{nd}$ beam failure detection resource group in three beam failure detection resource groups, a beam failure occurs in a 3$^{rd}$ beam failure detection resource group in three beam failure detection resource groups, the beam failure occurs in any two of three beam failure detection resource groups, or the beam failure occurs in all three beam failure detection resource groups.

With reference to the first aspect, in some implementations of the first aspect, the tenth field includes two bits.

Each of the two bits corresponds to one of the M beam failure detection resource groups, and each bit indicates whether a beam failure occurs in one corresponding beam failure detection resource group.

With reference to the first aspect, in some implementations of the first aspect, when the tenth field indicates that the beam failure occurs in the two of the M beam failure detection resource groups, the any bit corresponds to two octets; or when the tenth field indicates that a beam failure occurs in one of the M beam failure detection resource groups, the any bit corresponds to one octet.

It should be understood that, in the foregoing technical solution, the description is provided by using an example in which M is equal to 2 and the tenth field includes two bits. Optionally, M may alternatively be another integer greater than 1 and not equal to 2. For example, when M may alternatively be equal to 3, the tenth field indicates that the beam failure type may specifically include: a beam failure occurs in a 1$^{st}$ beam failure detection resource group in the M beam failure detection resource groups, a beam failure occurs in a 2$^{nd}$ beam failure detection resource group in the M beam failure detection resource groups, a beam failure occurs in a 3$^{rd}$ beam failure detection resource group in the M beam failure detection resource groups, or the beam failure occurs in three of the M beam failure detection resource groups. Optionally, the tenth field may further include more bits (for example, three bits).

Based on the tenth field, another type of first MAC CE is further provided in this embodiment of this application, and is denoted as a fifth type of first MAC CE.

The fifth type of first MAC CE provided in this embodiment of this application includes one bitmap. It may be understood that a definition of one bitmap included in the fifth type of first MAC CE is the same as a definition of one bitmap included in the first type of first MAC CE. For content that is not described in detail herein, refer to the definition of the one bitmap included in the first type of first MAC CE. Alternatively, a definition of one bitmap included in the fifth type of first MAC CE is the same as a definition of one bitmap included in the fourth type of first MAC CE. For content that is not described in detail herein, refer to the definition of the one bitmap included in the fourth type of first MAC CE.

Optionally, any bit in the bitmap corresponds to one or more octets.

The fifth type of first MAC CE includes the tenth field. That is, the fifth type of first MAC CE provided in this embodiment of this application may be understood as a first MAC CE including the tenth field, and another field included in the fifth type of first MAC CE is not specifically limited. For example, the fifth type of first MAC CE may further include the seventh field and the eighth field in the first definition manner. For example, the fifth type of first MAC CE may further include the eighth field in the second definition manner. For example, the fifth type of first MAC CE may further include the seventh field and the eighth field in the second definition manner.

It may be understood that when a cell corresponding to any bit in a bitmap included in the first MAC CE is a multi-TRP cell, the first MAC CE provided in this embodiment of this application may further include any one or more of the following fields: a field 1, a field 2, a field 3, a field 4, a field 5, a field 6, a field 7, and a field 8.

The field 1 indicates a quantity of TRPs in which a beam failure occurs in a multi-TRP cell, or the field 1 indicates a quantity of beam failure detection resource groups in which a beam failure occurs in a multi-TRP cell.

The field 2 indicates a beam failure type of the beam failure in the multi-TRP cell, and the beam failure type may include one or more of the following: a beam failure occurs in a single TRP in the multi-TRP cell, the beam failure occurs in some TRPs in the multi-TRP cell, or the beam failure occurs in all TRPs in the multi-TRP cell. When two beam failure detection resource groups are configured for the multi-TRP cell, the beam failure type may alternatively include one or more of the following: a beam failure occurs in a $1^{st}$ TRP, a beam failure occurs in a $2^{nd}$ TRP, the beam failure occurs in the two TRPs, and no beam failure occurs in the two TRPs. For example, the field 2 includes two bits. The field 2 corresponds to four field values. Each field value corresponds to one of the foregoing types. The beam failure type may alternatively include one or more of the following: a beam failure occurs in a $1^{st}$ TRP, a beam failure occurs in a $2^{nd}$ TRP, or the beam failure occurs in the two TRPs. The field 2 includes two bits, and corresponds to four field values. Three field values respectively indicate that the beam failure occurs in the $1^{st}$ TRP, the beam failure occurs in the $2^{nd}$ TRP, and the beam failure occurs in the two TRPs.

The field 3 corresponds to one TRP. The field 3 indicates whether the beam failure occurs in the TRP corresponding to the field 3. Alternatively, the field 3 corresponds to one beam failure detection resource group, and the field 3 indicates whether the beam failure is detected in the beam failure detection resource group corresponding to the field 3. When one of the foregoing fields indicates that no beam failure occurs, a remaining field in an octet of the field may have no specific meaning, and the terminal device may ignore the remaining field. There may be M fields 3, which respectively correspond to M TRPs, respectively correspond to M beam failure detection resource groups, respectively correspond to M TRPs, or respectively correspond to M CORESET groups.

The field 4 indicates information about a TRP in which a beam failure occurs, for example, an index of the TRP. The index of the TRP may be an index of one beam failure detection resource group, namely, an index of a beam failure detection resource group corresponding to the TRP, may be an index of a candidate beam resource group, namely, an index of a candidate beam resource group corresponding to the TRP, or may be an index of one CORESET group, namely, CORESETPoolIndex. Alternatively, a plurality of fields in the foregoing fields may be included, to indicate a plurality of TRPs in which the beam failure occurs, or indexes of beam failure detection resource groups/candidate beam resource groups/CORESET groups corresponding to the TRPs.

In this embodiment of this application, a type of the information about the TRP in which the beam failure occurs is not limited. For example, the information about the TRP in which the beam failure occurs may be information about an index of the TRP in which the beam failure occurs. The index of the TRP may be an index of one beam failure detection resource group, namely, an index of a beam failure detection resource group corresponding to the TRP. Alternatively, the index of the TRP may be an index of one candidate beam resource group, namely, an index of a candidate beam resource group corresponding to the TRP. Alternatively, the index of the TRP may be an index of one CORESET group, namely, CORESETPoolIndex.

Optionally, the first MAC CE may further include a plurality of fields 4. For example, the first MAC CE may include three fields 4. A $1^{st}$ field 4 indicates an index of a beam failure detection resource group corresponding to the TRP in which the beam failure occurs. A $2^{nd}$ field 4 indicates an index of a candidate beam resource group corresponding to the TRP in which the beam failure occurs. A $3^{rd}$ field 4 indicates an index of a CORESET group corresponding to the TRP in which the beam failure occurs.

The field 5 indicates a quantity of candidate beam resources reported by the terminal device.

The field 6 corresponds to one TRP, and the field 6 indicates whether there is a candidate beam resource meeting the quality requirement in one TRP corresponding to the field 6. Alternatively, the field 6 corresponds to one candidate beam resource group, and the field 6 indicates whether there is a candidate beam resource meeting the quality requirement in the candidate beam resource group corresponding to the field 6. Alternatively, when one of the foregoing fields indicates that there is no candidate beam resource meeting the quality requirement, a remaining field in an octet of the field has no specific meaning, and the terminal device may ignore the remaining field. There may be M fields 6, which respectively correspond to M TRPs, respectively correspond to M beam failure detection resource groups, respectively correspond to M TRPs, or respectively correspond to M CORESET groups.

The field 7 indicates information about a candidate beam resource. There may be M fields 7, which respectively correspond to M TRPs, respectively correspond to M beam failure detection resource groups, respectively correspond to M TRPs, or respectively correspond to M CORESET groups. One field value of the field 7 may be reserved to indicate that there is no candidate beam resource meeting the quality requirement. For example, when values of all bits corresponding to the field 7 are all 0 or all 1, it indicates that there is no candidate beam resource meeting the quality requirement. Other field values indicate information about one candidate beam resource meeting the quality requirement.

It may be understood that when the first MAC CE includes the plurality of fields 7, a plurality of candidate beam resources indicated by the plurality of fields 7 may be understood as resources in a plurality of candidate beam resource groups. That is, the plurality of candidate beam resources are in a one-to-one correspondence with the plurality of candidate beam resource groups. In this case, the plurality of candidate beam resources may be sorted in the first MAC CE in an order (for example, an index order or a configuration order) of candidate beam resource groups corresponding to the plurality of candidate beam resources. The information about the candidate beam resource may be but is not limited to an index of the candidate beam resource.

The field 8 indicates a TRP to which one reported candidate beam resource belongs, or the field 8 indicates a candidate beam resource group to which one reported candidate beam resource belongs.

It may be understood that when the terminal device needs to report a plurality of candidate beam resources, the first MAC CE may include a plurality of fields 8. The plurality of fields 8 indicate TRPs to which the plurality of reported candidate beam resources respectively belong, or the plurality of fields 8 indicate candidate beam resource groups to which the plurality of candidate beam resources respectively belong.

In a case, when a beam failure occurs in one beam failure detection resource group, the terminal device sends the first MAC CE, and then the beam failure also occurs in another beam failure detection resource group. To be specific, beam failure recovery of one TRP is being performed, and the beam failure occurs in another TRP. In this case, the terminal device may use the following method. Method 1: The terminal device sends another first MAC CE, to notify the network device that the beam failure also occurs in another beam failure detection resource group, and report information about a candidate beam resource corresponding to the beam failure detection resource group, for example, information about whether there is a candidate beam resource meeting the quality requirement and specific information about the candidate beam resource. Method 2: The terminal device may send another first MAC CE, to notify the network device that a beam failure occurs in two beam failure detection resource groups, and report information about candidate beam resources corresponding to the two beam failure detection resource groups, for example, information about whether there is a candidate beam resource meeting the quality requirement and specific information about the candidate beam resource. Alternatively, it may be specified that the terminal device does not send another first MAC CE before a previous beam failure recovery procedure is completed. In other words, the terminal device can send another first MAC CE only after receiving a response message of a previous first MAC CE or after receiving the response message for a specific time period, for example, a time period corresponding to 28 symbols, to notify the network device that the beam failure also occurs in another beam failure detection resource group.

Optionally, which one of the foregoing method 1 and method 2 is specifically used by the terminal device may also be determined based on a condition. Specifically, when a first condition is met, the method 1 is used. When a second condition is met, the second method is used.

The first condition may be one or a combination of the following.

After sending the previous first MAC CE, the terminal device has received the corresponding response message.

A time period from a current time point to a time point at which the response message of the previous first MAC CE is received is less than the specific time period, for example, the time period corresponding to the 28 symbols.

The second condition may be one or a combination of the following.

After sending the previous first MAC CE, the terminal device has not received the corresponding response message.

With reference to the first aspect, in some implementations of the first aspect, the method further includes the following steps.

When M is equal to 1, and the beam failure occurs in the M beam failure detection resource groups, the terminal device sends, by using a second MAC CE, the beam failure recovery information corresponding to the cell.

In the foregoing technical solution, a type of second MAC CE is provided, and is denoted as a first type of second MAC CE.

When M is equal to 1, the cell is a single-TRP cell, and the terminal device may report, by using the first type of second MAC CE, beam failure recovery information corresponding to the single-TRP cell in which the beam failure occurs, so that beam failure recovery can be implemented in the single-TRP cell in time.

With reference to the first aspect, in some implementations of the first aspect, the second MAC CE includes one bitmap, and one bit in the bitmap corresponds to one octet.

Optionally, the one octet further includes one seventh field, and the seventh field indicates whether there is a candidate beam or candidate beam resource meeting a quality requirement in a candidate beam resource group corresponding to the one octet. Alternatively, the seventh field indicates whether there is information about a candidate beam resource in the one octet. In this embodiment of this application, the candidate beam resource group and the TRP may be equivalent to each other. In other words, the seventh field may alternatively indicate whether there is a candidate beam resource meeting a quality requirement in a TRP corresponding to the one octet. A length of the seventh field is one bit, and the seventh field may be located in a first bit, a second bit, or a third bit in the corresponding octet. For example, if any bit corresponds to a plurality of octets, a seventh field in a $1^{st}$ octet in the plurality of octets may be located in a $3^{rd}$ bit in the $1^{st}$ octet, and a seventh field in a $2^{nd}$ octet in the plurality of octets may also be located in a $3^{rd}$ bit in the $2^{nd}$ octet, or the seventh field in the $2^{nd}$ octet may be located in a $1^{st}$ bit in the $2^{nd}$ octet.

Optionally, the one octet further includes one eighth field, and the eighth field indicates information about the candidate beam or candidate beam resource that meets the quality requirement and that is determined in the candidate beam resource group corresponding to the one octet. In this embodiment of this application, the candidate beam resource group and the TRP may be equivalent to each other. In other words, the eighth field may alternatively indicate information about the candidate beam resource meeting the quality requirement in the TRP corresponding to the one octet. A length of the eighth field may be six bits or five bits.

With reference to the first aspect, in some implementations of the first aspect, the second MAC CE includes one bitmap.

If configuration information of a cell corresponding to any bit in the bitmap includes M beam failure detection resource groups and M candidate beam resource groups, M is an integer greater than 1, and a value of the any bit is a second value by default, the second value indicates that no beam failure occurs in the cell corresponding to the any bit.

For example, if configuration information of a cell corresponding to any bit in one bitmap included in the second MAC CE includes M beam failure detection resource groups and M candidate beam resource groups, M is an integer greater than 1, and a value of the any bit is 0 or 1 by default, the value of the any bit indicates that no beam failure occurs in the cell corresponding to the any bit. That is, if the value of the any bit is 0 or 1, it indicates that no beam failure occurs in the cell corresponding to the any bit.

In the foregoing technical solution, when a cell corresponding to one bit in one bitmap included in the first type of second MAC CE is a multi-TRP cell, regardless of whether the beam failure occurs in the multi-TRP cell, the first type of second MAC CE is not used to report beam failure recovery information corresponding to the multi-TRP cell.

With reference to the first aspect, in some implementations of the first aspect, the second MAC CE includes one bitmap, and any bit in the one bitmap corresponds to one multi-TRP cell.

A value of the any bit may be 0 or 1. For example, it may be defined as follows: the value of the any bit being 0 indicates that a beam failure occurs in one TRP in the one multi-TRP cell corresponding to the any bit, and the value of the any bit being 1 indicates that a beam failure occurs in a plurality of TRPs in the one multi-TRP cell corresponding to the any bit.

In the foregoing technical solution, another type of second MAC CE is provided, and is denoted as a second type of second MAC CE.

The terminal device may report, by using the second type of second MAC CE, beam failure recovery information corresponding to a multi-TRP cell in which the beam failure occurs, so that beam failure recovery can be implemented in the multi-TRP cell in time.

With reference to the first aspect, in some implementations of the first aspect, when a beam failure occurs in a multi-TRP cell corresponding to any bit in one bitmap included in the second MAC CE, the second MAC CE includes one octet, and the one octet corresponds to the any bit.

With reference to the first aspect, in some implementations of the first aspect, the one octet includes one ninth field.

When a cell corresponding to a bit corresponding to the octet of the ninth field is a multi-TRP cell, a definition of the ninth field may be any one of the following:

The ninth field indicates information about a TRP in which a beam failure occurs, the ninth field indicates information about a beam failure detection resource group in which the beam failure is detected, or the ninth field indicates information about a candidate beam resource group corresponding to a reported candidate beam resource.

That the ninth field indicates the information about the TRP in which the beam failure occurs may be understood as that the ninth field indicates beam failure recovery information corresponding to a multi-TRP cell corresponding to the octet of the ninth field.

With reference to the first aspect, in some implementations of the first aspect, the ninth field indicates a quantity of TRPs in which the beam failure occurs, or the ninth field indicates a beam failure type. The beam failure type includes: a beam failure occurs in a single TRP in a multi-TRP cell, or the beam failure occurs in some or all TRPs in a multi-TRP cell.

In the foregoing technical solution, the network device needs to configure a candidate beam resource in a candidate beam resource group in a cell in a cross-resource-group numbering manner. Based on this, the terminal device may determine, by using an index of the reported candidate beam resource, a TRP to which the candidate beam resource specifically belongs.

For example, when M is equal to 2, the configuration information of the cell includes two candidate beam resource groups, and each candidate beam resource group includes four candidate beam resources. Numbers of four resources in a 1$^{st}$ candidate beam resource group may be {#0, #1, #2, #3}, and numbers of four resources in a 2$^{nd}$ candidate beam resource group may be {#4, #5, #6, #7}. In this case, it may be considered that candidate beam resources in the candidate beam resource group configured by the network device for the cell are configured in a cross-resource-group numbering manner.

When a cell corresponding to a bit corresponding to the octet of the ninth field is a single-TRP cell, the ninth field indicates a reserved field, to be specific, the ninth field is reserved and has no specific meaning. With reference to the first aspect, in some implementations of the first aspect, the one octet includes one eighth field.

The eighth field indicates information about the candidate beam or candidate beam resource that meets the quality requirement and that is determined in the candidate beam resource group corresponding to the one octet.

In this embodiment of this application, the candidate beam resource group and the TRP may be equivalent to each other. In other words, the eighth field may alternatively indicate information about the candidate beam resource meeting the quality requirement in the TRP corresponding to the one octet. A length of the eighth field may be six bits or five bits.

In the foregoing technical solution, the terminal device may report, by using the second type of second MAC CE, beam failure recovery information corresponding to a single-TRP cell and a multi-TRP cell in which the beam failure occurs, so that beam failure recovery can be implemented in the single-TRP cell and multi-TRP cell in time. It may be understood that, if a cell corresponding to any bit in one bitmap included in the second type of second MAC CE is a single-TRP cell, an R field corresponding to the any bit has no specific meaning. If a cell corresponding to any bit in one bitmap included in the second type of second MAC CE is a multi-TRP cell, an R field corresponding to the any bit indicates beam failure recovery information corresponding to the cell corresponding to an octet of the R field, indicate a quantity of TRPs in which the beam failure occurs, or indicate a beam failure type.

With reference to the first aspect, in some implementations of the first aspect, a first logical channel identifier (LCID) corresponding to the first MAC CE is different from a second LCID corresponding to the second MAC CE.

With reference to the first aspect, in some implementations of the first aspect, the second LCID is 50 or 51.

The first LCID is any one of the following logical channel identifiers: 35, 36, 37, 38, 39, 40, 41, 42, 43, 44, or 47.

It may be understood that a specific value of the first LCID and a specific value of the second LCID are merely examples, and do not constitute any limitation. To be specific, when it is ensured that a value of the first LCID is different from a value of the second LCID, the value of the first LCID may alternatively be another value, and the value of the second LCID may alternatively be another value.

It may be understood that the specific format of the first MAC CE and the specific format of the second MAC CE that are described in the first aspect are merely examples, and do not constitute any limitation. For example, the first MAC CE or the second MAC CE may further include another field (for example, a reserved field). It should be further understood that MAC CEs obtained by combining the foregoing plurality of fields (the first field, the second field, the third field, the fourth field, the fifth field, the sixth field, the seventh field, the eighth field, and the ninth field) based on a correspondence between an octet and any bit in a bitmap included in each MAC CE all belong to the formats of the MAC CE claimed in this embodiment of this application.

According to a second aspect, a beam failure recovery method is provided. The method includes the following steps.

A network device sends configuration information of a cell, where the configuration information of the cell includes M beam failure detection resource groups and M candidate beam resource groups, the M beam failure detection resource groups are in a one-to-one correspondence with the M candidate beam resource groups, and M is an integer.

The network device receives a first medium access control control element (MAC CE), where the first MAC CE carries beam failure recovery information corresponding to the cell, the first MAC CE is sent by a terminal device when a beam failure occurs in at least one of the M beam failure detection resource groups, and M is an integer greater than 1.

The network device determines, by using the first MAC CE, whether to switch a first beam to a second beam, where the first beam is a beam used to transmit the at least one beam failure detection resource group, the second beam is a beam used to transmit at least one candidate beam resource group in the M candidate beam resource groups, and the at least one candidate beam resource group is in a one-to-one correspondence with the at least one beam failure detection resource group.

That the network device receives the first medium access control control element (MAC CE) may be understood as: When the terminal device determines that M is the integer greater than 1 and the beam failure occurs in the at least one of the M beam failure detection resource groups, the terminal device sends, by using the first MAC CE, a beam failure detection resource corresponding to the cell, and correspondingly, the network device communicating with the terminal device receives the first MAC CE.

It should be understood that the first MAC CE in the second aspect is the same as the first MAC CE in the first aspect. Therefore, for a format of the first MAC CE that is not described in detail in the second aspect, refer to the description in the first aspect.

In the foregoing technical solution, the network device may determine, by using the received first MAC CE, a TRP in which a beam failure occurs in a multi-TRP cell and a candidate beam resource corresponding to the TRP in which the beam failure occurs. When the network device determines that there is a candidate beam resource corresponding to the TRP in which the beam failure occurs, the network device may switch the TRP in which the beam failure occurs from a current beam (namely, the first beam) to a beam (namely, the second beam) used to transmit the candidate beam resource, so that beam failure recovery can be implemented in the multi-TRP cell in time.

With reference to the second aspect, in some implementations of the second aspect, that the network device determines, by using the first MAC CE, whether to switch a first beam to a second beam includes:

The network device determines, by using the first MAC CE, that there is a first candidate beam resource meeting a quality requirement in a candidate beam resource group corresponding to the at least one beam failure detection resource group, and determines information about the first candidate beam resource meeting the quality requirement.

The network device switches the first beam to the second beam.

With reference to the second aspect, in some implementations of the second aspect, the method further includes the following steps.

The network device receives a second MAC CE, where the second MAC CE carries beam failure recovery information corresponding to the cell, the second MAC CE is sent by the terminal device when the beam failure occurs in the M beam failure detection resource groups, and M is an integer equal to 1.

The network device determines, by using the second MAC CE, whether to switch a third beam to a fourth beam, where the third beam is a beam used to transmit the M beam failure detection resource groups, the fourth beam is a beam used to transmit the M candidate beam resource groups, and the M beam failure detection resource groups correspond to the M candidate beam resource groups.

It may be understood that the second MAC CE in the second aspect is the same as the first type of second MAC CE in the first aspect. Therefore, for a format of the second MAC CE that is not described in detail in the second aspect, refer to related descriptions in the first aspect.

In the foregoing technical solution, the network device may determine, by using the received second MAC CE (namely, the first type of second MAC CE), a TRP in which a beam failure occurs in a single-TRP cell and a candidate beam resource corresponding to the TRP in which the beam failure occurs. When the network device determines that there is a candidate beam resource corresponding to the TRP in which the beam failure occurs, the network device may switch the TRP in which the beam failure occurs from a current beam (namely, the third beam) to a beam (namely, the fourth beam) used to transmit the candidate beam resource, so that beam failure recovery can be implemented in the single-TRP cell in time.

With reference to the second aspect, in some implementations of the second aspect, that the network device determines, by using the second MAC CE, whether to switch a third beam to a fourth beam includes:

The network device determines, by using the second MAC CE, that there is a second candidate beam resource meeting a quality requirement in candidate beam resource groups corresponding to the M beam failure detection resource groups, and determines information about the second candidate beam resource meeting the quality requirement.

The network device switches the third beam to the fourth beam.

With reference to the second aspect, in some implementations of the second aspect, a first logical channel identifier (LCID) corresponding to the first MAC CE is different from a second LCID corresponding to the second MAC CE.

With reference to the second aspect, in some implementations of the second aspect, the second LCID is 50 or 51.

The first LCID is any one of the following logical channel identifiers: 35, 36, 37, 38, 39, 40, 41, 42, 43, 44, or 47.

It should be understood that the first MAC CE in the second aspect is the same as the first MAC CE in the first aspect, and the second MAC CE in the second aspect is the same as the second MAC CE in the first aspect. Therefore, for the formats of the first MAC CE and the second MAC CE that are not described in detail in the second aspect, refer to the descriptions in the first aspect.

According to a third aspect, a communication apparatus is provided. The communication apparatus includes modules or units configured to perform the method according to any one of the first aspect and the possible implementations of the first aspect.

According to a fourth aspect, a communication apparatus is provided. The communication apparatus includes a processor. The processor is coupled to a memory, and may be configured to execute instructions in the memory, to implement the foregoing method according to any one of the first aspect and the possible implementations of the first aspect. Optionally, the communication apparatus further includes the memory. Optionally, the communication apparatus further includes a communication interface, and the processor is coupled to the communication interface.

In an implementation, the communication apparatus is a terminal device. When the communication apparatus is the terminal device, the communication interface may be a transceiver or an input/output interface.

In another implementation, the communication apparatus is a chip disposed in a terminal device. When the communication apparatus is the chip disposed in the terminal device, the communication interface may be an input/output interface.

Optionally, the transceiver may be a transceiver circuit. Optionally, the input/output interface may be an input/output circuit.

According to a fifth aspect, a communication apparatus is provided. The communication apparatus includes modules or units configured to perform the method according to any one of the second aspect and the possible implementations of the second aspect.

According to a sixth aspect, a communication apparatus is provided. The communication apparatus includes a processor. The processor is coupled to a memory, and may be configured to execute instructions in the memory, to implement the method according to any one of the second aspect and the possible implementations of the second aspect. Optionally, the communication apparatus further includes the memory. Optionally, the communication apparatus further includes a communication interface, and the processor is coupled to the communication interface.

In an implementation, the communication apparatus is a network device. When the communication apparatus is the network device, the communication interface may be a transceiver or an input/output interface.

In another implementation, the communication apparatus is a chip disposed in the network device. When the communication apparatus is the chip disposed in the network device, the communication interface may be an input/output interface.

Optionally, the transceiver may be a transceiver circuit. Optionally, the input/output interface may be an input/output circuit.

According to a seventh aspect, a processor is provided. The processor includes an input circuit, an output circuit, and a processing circuit. The processing circuit is configured to: receive a signal through the input circuit, and transmit a signal through the output circuit, to enable the processor to perform the method according to any one of the first aspect and the second aspect and the possible implementations of the first aspect and the second aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to an eighth aspect, a processing apparatus is provided. The processing apparatus includes a processor and a memory. The processor is configured to read instructions stored the memory, and may receive a signal by using a receiver, and transmit a signal by using a transmitter, to perform the method according to any one of the first aspect and the second aspect and the possible implementations of the first aspect and the second aspect.

Optionally, there are one or more processors, and there are one or more memories.

Optionally, the memory may be integrated with the processor, or the memory and the processor are separately disposed.

In a specific implementation process, the memory may be a non-transitory (non-transitory) memory, such as a read-only memory (ROM). The memory and the processor may be integrated into a same chip, or may be separately disposed in different chips. A type of the memory and a manner in which the memory and the processor are disposed are not limited in this embodiment of this application.

It should be understood that a related data exchange procedure, for example, sending measurement configuration information, may be a procedure of outputting the measurement configuration information from the processor, and receiving the information may be a procedure of receiving the information by the processor. Specifically, data output by the processor may be output to a transmitter, and input data received by the processor may be from a receiver. The transmitter and the receiver may be collectively referred to as a transceiver.

The processing apparatus in the eighth aspect may be a chip. The processor may be implemented by using hardware or software. When the processor is implemented by using hardware, the processor may be a logic circuit, an integrated circuit, or the like. When the processor is implemented by using software, the processor may be a general-purpose processor, and may be implemented by reading software code stored in the memory. The memory may be integrated into the processor, or may be located outside the processor and exist independently.

According to a ninth aspect, a computer program product is provided. The computer program product includes a computer program (which may also be referred to as code or instructions). When the computer program is run, a computer is enabled to perform the method according to any one of the first aspect and the second aspect and the possible implementations of the first aspect and the second aspect.

According to a tenth aspect, a computer-readable medium is provided. The computer-readable medium stores a computer program (which may also be referred to as code or instructions). When the computer program is run on a computer, the computer is enabled to perform the method according to any one of the first aspect and the second aspect and the possible implementations of the first aspect and the second aspect.

According to an eleventh aspect, a communication system is provided. The communication system includes the foregoing network device and terminal device.

BRIEF DESCRIPTION OF DRAWINGS

FIG. 4 is a schematic diagram of a format of a MAC CE applicable to a beam failure recovery method;

FIG. 5 is a schematic diagram of a beam failure recovery method 500 according to an embodiment of this application;

DESCRIPTION OF EMBODIMENTS

Figure 1:
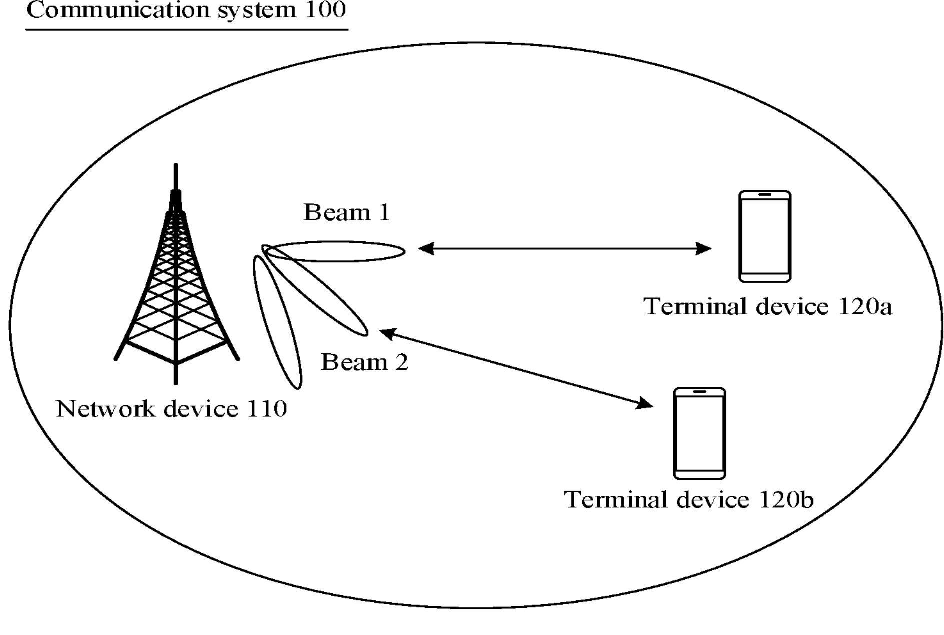
FIG. 1 is a schematic diagram of a communication system 100 to which an embodiment of this application is applicable.

The following describes technical solutions of this application with reference to accompanying drawings.

In descriptions of this application, unless otherwise specified, "/" means "or". For example, A/B may indicate A or B. "And/or" in this application describes only an association relation between associated objects and represents that three relations may exist. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

It should be noted that in this application, the word such as "example" or "for example" is used to represent giving an example, an illustration, or a description. Any embodiment or design scheme described as an "example" or "for example" in this application should not be explained as having more advantages than another embodiment or design scheme. Exactly, use of the word "example" or "for example" or the like is intended to present a relative concept in a specific manner.

In the descriptions of this application, the "indication" may include a direct indication and an indirect indication, or may include an explicit indication and an implicit indication. For example, information indicated by a field (a first field, a second field, or the like described below) is referred to as to-be-indicated information. In a specific implementation process, the to-be-indicated information is indicated in a plurality of manners. For example, the to-be-indicated information may be directly indicated, where the to-be-indicated information, an index of the to-be-indicated information, or the like is indicated. For another example, the to-be-indicated information may be indirectly indicated by indicating other information. There is an association relation between the other information and the to-be-indicated information. For another example, only a part of the to-be-indicated information may be indicated, and the other part of the to-be-indicated information is already known or pre-agreed on. In addition, specific information may also be indicated by using a pre-agreed (for example, stipulated in a protocol) arrangement sequence of various pieces of information, to reduce indication overheads to some extent.

In the descriptions of this application, "TRP" may be replaced with "beam failure detection resource group", "candidate beam resource group", or "CORESET group", and expressed meanings are consistent when differences between the terms are not emphasized. In the descriptions of this application, that a beam failure occurs in a TRP means that a beam failure occurs in a beam failure detection resource group corresponding to the TRP, or the beam failure is detected in the beam failure detection resource group corresponding to the TRP. Therefore, "a beam failure occurs in one TRP" may be replaced with "a beam failure is detected in one beam failure detection resource group corresponding to the one TRP", and expressed meanings are consistent when a difference is not emphasized. A specific meaning of detecting a beam failure in a beam failure detection resource group is that quality of a resource in the beam failure detection resource group is lower than a first threshold. In the descriptions of this application, one TRP is in a one-to-one correspondence with one beam failure detection resource group and one candidate beam resource group. A TRP index may be specifically represented as an index of the one beam failure detection resource group, an index of the one candidate beam resource group, or another associated index, for example, an index of a CORESET group (for example, CORESETPoolIndex). In the descriptions of this application, "TRP" may be replaced with "network device". Expressed meanings are consistent when a difference is not emphasized. In embodiments of this application, "cell" and "serving cell" may be used alternatively, and expressed meanings are consistent when a difference is not emphasized.

To facilitate understanding of embodiments of this application, the following first briefly describes terms in embodiments of this application.

1. Beam

The beam may be represented in an NR protocol as a spatial domain filter, a spatial filter, a spatial domain parameter, a spatial parameter, a spatial domain setting, a spatial setting, quasi-colocation (QCL) information, a QCL assumption, a QCL indication, or the like. The beam may also be indicated by a transmission configuration indication state (TCI-state) parameter or a spatial relation parameter. Therefore, in embodiments of this application, the beam may be replaced with the spatial domain filter, the spatial filter, the spatial domain parameter, the spatial parameter, the spatial setting, the spatial setting, the QCL information, the QCL assumption, the QCL indication, the TCI-state (for example, a downlink (DL) TCI-state, or an uplink (UL) TCI-state), a spatial relation, or the like. The foregoing terms are equivalent to each other. It should be understood that the beam may be alternatively replaced with another term indicating the beam. This is not specifically limited in embodiments of this application.

A beam for sending a signal may be referred to as a transmit beam (Tx beam), a spatial domain transmission filter, a spatial transmission filter, a spatial domain transmission parameter, a spatial transmission parameter, a spatial domain transmission setting, or a spatial transmission setting. A downlink transmit beam may be indicated by the TCI-state.

The transmit beam may mean signal strength distribution formed in different directions in space after a signal is transmitted through an antenna, and a receive beam may mean signal strength distribution that is of a radio signal received through an antenna and that is in different directions in space.

In addition, the beam may be a wide beam, a narrow beam, or another type of beam. A technology for forming the beam may be a beamforming technology or another technology. The beamforming technology may be specifically a digital beamforming technology, an analog beamforming technology, a hybrid digital/analog beamforming technology, or the like.

The beam usually corresponds to a resource. For example, during beam measurement, a network device measures different beams by using different resources, a terminal device feeds back measured quality of the resource, and the network device learns of quality of a corresponding beam. During data transmission, beam information is also indicated by a resource corresponding to the beam information. For example, the network device indicates information about a physical downlink shared channel (PDSCH) beam of the terminal device by using a transmission configuration indicator (TCI) resource in downlink control information (DCI).

Optionally, a plurality of beams that have same or similar communication features may be considered as one beam. One beam may include one or more antenna ports, and is used to transmit a data channel, a control channel, a sounding signal, and the like. The one or more antenna ports forming the one beam may also be considered as one antenna port set.

In embodiments of this application, unless otherwise specified, the beam is a transmit beam of the network device. During beam measurement, each beam of the network device corresponds to one resource. Therefore, an index of the resource may be used to uniquely identify a beam corresponding to the resource.

2. Beam Failure Detection Resource

A network device configures one or more beam failure detection resources (RadioLinkMonitoringRS) for a terminal device by using radio resource control (RRC) signaling, to detect whether a beam failure occurs. RadioLinkMonitoringRS includes a plurality of parameters. The parameters are described as follows:

Configurations related to beam failure detection are included in RadioLinkMonitoringConfig IE.

```
RadioLinkMonitoringConfig ::=          SEQUENCE {
  configuring a group of RadioLinkMonitoringRS resources
  failureDetectionResourcesToAddModList                              SEQUENCE
(SIZE(1..maxNrofFailureDetectionResources)) OF RadioLinkMonitoringRS
  failureDetectionResourcesToReleaseList                             SEQUENCE
(SIZE(1 .. maxNrofFailureDetectionResources)) OF RadioLinkMonitoringRS-Id
  counter related to beam failure detection
  beamFailureInstanceMaxCount       ENUMERATED {n1, n2, n3, n4, n5, n6, n8, n10}
  timer related to beam failure detection
  beamFailureDetectionTimer         ENUMERATED {pbfd1, pbfd2, pbfd3, pbfd4, pbfd5,
pbfd6, pbfd8, pbfd10}
  }
  RadioLinkMonitoringRS ::=         SEQUENCE {
  Index of RadioLinkMonitoringRS, for identifying the resource
  radioLinkMonitoringRS-Id             RadioLinkMonitoringRS-Id,
  resource purpose: indicating that the resource is a beam failure detection resource when
this parameter is set to beamFailure,
  purpose                           ENUMERATED {beamFailure, rlf, both },
  resource type: indicating a resource is an SSB resource or a CSI-RS resource,
  detectionResource                    CHOICE {
    ssb-Index                       SSB-Index,
    csi-RS-Index                       NZP-CSI-RS-ResourceId
  },
  ...
  }
```

A network device configures a beam failure recovery configuration (BeamFailureRecoveryConfig) for a terminal device by using RRC signaling, where the beam failure recovery configuration includes a parameter related to beam failure recovery of a cell, for example, a resource used for new beam discovery. Specific parameters are explained as follows (some parameters irrelevant to this patent are omitted).

```
  BeamFailureRecoveryConfig ::=          SEQUENCE {
  candidate beam decision threshold, for determining whether a beam can be used as a
candidate beam,
  rsrp-ThresholdSSB                   RSRP-Range
  one or more resources used for new beam discovery, from which a new available beam
is found,
```

-continued

```
  candidateBeamRSList              SEQUENCE (SIZE(1..maxNrofCandidateBeams)
OF PRACH-
                                  ResourceDedicatedBFR
  DCI search space for listening to a BFR response message
  recoverySearch SpaceId          SearchSpaceId
  BFR timer, where if BFR does not succeed within time specified by the timer, the BFR
stops,
  beamFailureRecoveryTimer         ENUMERATED {ms10, ms20, ms40, ms60,
                                 ms80,
ms100, ms150, ms200}
  }
```

4. Quasi Co-Location (QCL)

The QCL is also referred to as quasi-colocation. Signals corresponding to antenna ports that have a QCL relation have a same parameter, a parameter of one antenna port may be used to determine a parameter of the other antenna port that has a QCL relation with the antenna port, the two antenna ports have a same parameter, or a parameter difference between the two antenna ports is less than a threshold. The parameter may include one or more of the following: a delay spread, a Doppler spread, a Doppler shift, an average delay, an average gain, and a spatial receive parameter (spatial Rx parameter). The spatial receive parameter may include one or more of the following: an angle of arrival (AOA), an average AOA, an AOA spread, an angle of departure (AOD), an average angle of departure AOD, an AOD spread, a receive antenna spatial correlation parameter, a transmit antenna spatial correlation parameter, a transmit beam, a receive beam, and a resource identifier.

The foregoing angles may be decomposition values at different dimensions or a combination of the decomposition values at different dimensions. The antenna ports are antenna ports having different antenna port numbers, antenna ports that have a same antenna port number and that are used to send or receive information at different time, on different frequencies, and/or on different code domain resources, and/or antenna ports that have different antenna port numbers and that are used to send or receive information at different time, on different frequencies, and/or on different code domain resources. The resource identifier may include: a CSI-RS resource identifier, an SRS resource identifier, an SSB resource identifier, a resource identifier of a preamble sequence transmitted on a physical random access channel (PRACH), or a resource identifier of a demodulation reference signal (DMRS), and indicates a beam on a resource.

In an NR protocol, the QCL relation may be classified into the following four types based on different parameters:

type A (type A): a Doppler shift, a Doppler spread, an average delay, and a delay spread;

type B (type B): the Doppler shift and the Doppler spread;

type C (type C): the Doppler shift and the average delay; and type D (type D): a spatial receive parameter.

The QCL in embodiments of this application is QCL of the type D. Unless otherwise specified in the following, the QCL may be understood as the QCL of the type D, namely, QCL defined based on the spatial receive parameter.

When the QCL relation is a QCL relation of the type D, the QCL relation may be considered as a spatial domain QCL relation. When the antenna ports meet the spatial domain QCL relation, a QCL relation between ports for downlink signals or between ports for uplink signals may be that the two signals have a same AOA or AOD, and indicates that the two signals have a same receive beam or transmit beam. For another example, a QCL relation between a downlink signal and an uplink signal or between a port for an uplink signal and a port for a downlink signal may be that there is a correspondence between AOAs and AODs of the two signals, or that there is a correspondence between AODs and AOAs of the two signals. To be specific, beam reciprocity may be used to determine an uplink transmit beam based on a downlink receive beam or determine a downlink receive beam based on an uplink transmit beam.

From a perspective of a transmit end, if two antenna ports meet a spatial domain QCL relation, it may indicate that corresponding beam directions of the two antenna ports are consistent in space. From a perspective of a receive end, if two antenna ports meet a spatial domain QCL relation, it may indicate that the receive end can receive, in a same beam direction, signals sent through the two antenna ports.

Signals transmitted through ports having a spatial domain QCL relation may further have corresponding beams. The corresponding beams include at least one of the following: a same receive beam, a same transmit beam, a transmit beam corresponding to a receive beam (corresponding to a reciprocity scenario), and a receive beam corresponding to a transmit beam (corresponding to a reciprocity scenario).

Signals transmitted through ports having a spatial domain QCL relation may be alternatively understood as signals received or sent by using a same spatial filter (spatial filter). The spatial filter may be at least one of the following: precoding, a weight of an antenna port, a phase deflection of the antenna port, or an amplitude gain of the antenna port.

Signals transmitted through ports having a spatial domain QCL relation may alternatively be understood as having corresponding beam pair links (BPLs). The corresponding BPLs include at least one of the following: a same downlink BPL, a same uplink BPL, an uplink BPL corresponding to a downlink BPL, or a downlink BPL corresponding to an uplink BPL.

Therefore, the spatial receive parameter (namely, the QCL of the type D) may be understood as a parameter indicating direction information of a receive beam.

5. Spatial Relation (SR)

The spatial relation may also be referred to as an uplink transmission configuration indicator (UL TCI). The spatial relation may be used to determine a transmit beam of an uplink signal. The spatial relation may be determined through beam training. A reference signal used for beam training may be, for example, an uplink reference signal such as an SRS, or may be a downlink reference signal such as an SSB or a CSI-RS.

In a communication process, a terminal device may determine a transmit beam based on a spatial relation indicated by a network device, and the network device may determine a receive beam based on the same spatial relation.

Optionally, the spatial relation may further include a parameter related to uplink transmit power control, including one or more of the following: a path loss estimation reference signal (Pathloss Reference RS), a reference power, a compensation coefficient (Alpha), an open-loop or closed-loop power control indication, a closed-loop power control index (closedLoopIndex), or the like.

The SR is configured by the network device for each terminal device. The following is a format of the SR.

```
SpatialRelationInfo ::= SEQUENCE
  SpatialRelationInfoId                SpatialRelationInfoId,
  servingCellId                        ServCellIndex
  referenceSignal                      CHOICE {
    ssb-Index                          SSB-Index,
    csi-RS-Index                       NZP-CSI-RS-ResourceId,
    srs                                SEQUENCE {
      resource                         SRS-ResourceId,
        uplinkBWP                          BWP-Id
          }
                                         },
  PathlossReferenceRS-Id               PathlossReferenceRS-Id,
  p0-Id              P0-Id,
  closedLoopIndex                    ENUMERATED { i0, i1 }
}
```

6. Control Resource Set (CORESET)

The CORESET is a resource set used to transmit downlink control information, and may also be referred to as a control resource area or a physical downlink control channel resource set. Each CORESET may be a set of a group of resource element groups (REGs). A REG is a basic unit for allocating physical resources by using downlink control signaling, and is used to define mapping from downlink control signaling to a RE. For example, one REG may include four consecutive resource elements (REs) of a non-reference signal (RS) in frequency domain. It should be understood that the REG is merely a unit used for resource allocation, and should not constitute any limitation on this application. This application does not exclude that a new resource allocation unit is defined in a future protocol to implement a same or similar function.

For a network device, a CORESET may be understood as a set of resources that may be used to send a PDCCH. For a terminal device, a resource corresponding to a PDCCH search space of each terminal device belongs to the CORESET. In other words, the network device may determine, in the CORESET, the resource used to send the PDCCH, and the terminal device may determine the PDCCH search space based on the CORESET.

The CORESET may include a time-frequency resource. For example, in frequency domain, the time-frequency resource may be a bandwidth segment, or one or more sub-bands. In time domain, the time-frequency resource may be one or more symbols. In time-frequency domain, a control resource set may be consecutive or inconsecutive resource units, for example, consecutive resource blocks (RB) or inconsecutive RBs.

In addition, the CORESET may further include a TCI-state (TCI-state). The CORESET may include a plurality of TCI-states, and an activated TCI-state may be one of the plurality of TCI-states. In other words, the resource used to transmit the PDCCH may specifically use one of the plurality of TCI-states, and a specific TCI-state to be used is specified by the network device. For example, the network device sends a MAC CE to the terminal device, where the MAC CE carries an index of one TCI-state, and the index of the TCI-state indicates that a PDCCH corresponding to the CORESET uses the TCI-state. In addition, the network device may also modify the TCI-state of the PDCCH by using the MAC CE. The network device may configure one or more CORESETs for the terminal device, to transmit different types of PDCCHs.

The CORESET may be configured, for example, by using a ControlResourceSet information element (control resource set information element) in a higher-layer parameter. The higher-layer parameter may include, for example, an identifier (ID) of the CORESET, a frequency domain resource, and a quantity of symbols included in duration (duration). A specific parameter used to configure the CORESET is not limited in this application.

7. TCI-State

The TCI-state is configured by a network device for each terminal device. The TCI-state may indicate a QCL relation between two reference signals. Each TCI-state may include a serving cell index (ServeCellIndex), a bandwidth part (BWP) identifier (ID), and a reference signal resource identifier. The reference signal resource identifier may be, for example, at least one of the following: a non-zero power (NZP) CSI-RS reference signal resource identifier (NZP-CSI-RS-ResourceId), a non-zero power CSI-RS reference signal resource set identifier (NZP-CSI-RS-ResourceSetId), or an SSB index (SSB-Index).

Information about a transmit beam (namely, a transmit beam of a network device or a receive beam of a terminal device) may be indicated by using a TCI-state. Each TCI-state includes one index (tci-StateId) of the TCI-state and two pieces of QCI information (QCl-Info). Each QCl-Info may include one reference signal resource (referenceSignal), representing that a resource in the TCI-state and a reference signal resource included in the QCL-Info form a QCL relation. For example, if one TCI-state is configured for a resource 1, and a resource included in QCL-Info included in the TCI-state is a resource 2, it represents that the resource 1 and the resource 2 meet a QCL relation.

TCI-states are configured by the network device for terminal devices. The following is a format of the TCI-state.

```
TCI-State ::=                SEQUENCE {
  tci-StateId                  TCI-StateId,
qcl-Type1                    QCI-Info,
qcl-Type2                    QCI-Info
...
}
QCI-Info ::=                 SEQUENCE {
  cell                       ServCellIndex
bwp-Id                     BWP-Id,
referenceSignal                CHOICE{
csi-rs                     NZP-CSI-RS-ResourceSetId
ssb                      SSB-Index
}
qcl-Type                     ENUMERATED{typeA, TypeB, TypeC, TypeD},
...
}
```

In a subsequent communication process, the terminal device may determine a receive beam based on a TCI-state indicated by the network device, and the network device may determine a transmit beam based on the same TCI-state.

In addition, the TCI-state may be globally configured. In TCI-states configured for different cells (cells) and different BWPs, if indexes of the TCI-states are the same, configurations of the corresponding TCI-states are also the same. The cell is described by a higher layer from a perspective of resource management, mobility management, or a service unit. Coverage of each network device may be divided into one or more serving cells, and the serving cell may be considered as including a specific frequency domain resource. In embodiments of this application, “cell” and “serving cell” may be used alternatively, and expressed meanings are consistent when a difference is not emphasized.

8. TCI

The TCI may indicate a TCI-state. In an implementation, a network device may configure a TCI-state list (list) for a terminal device by using higher layer signaling (for example, radio resource control (RRC)). For example, the network device may configure the TCI-state list for the terminal device by using a TCI-state to add mode list (tci-StatesToAddModList) in an RRC message. The TCI-state list may include a plurality of TCI-states. For example, the network device may configure a maximum of 64 TCI-states for each BWP in each cell.

Then, the network device may activate one or more TCI-states by using higher layer signaling (for example, medium access control control element (MAC CE) signaling). An activated TCI-state is a subset of the TCI-state list configured by using the RRC message. For example, the network device may activate a maximum of eight TCI-states for each BWP in each cell.

Then, the network device may further indicate a selected TCI-state by using a TCI field in physical layer signaling (for example, downlink control information (DCI)). The DCI may be, for example, DCI applicable to scheduling a physical downlink resource.

Configuration information of one TCI-state may include one or two reference signal resource identifiers and a QCL type associated with the reference signal resource identifier. When a QCL relation is configured to be of one of a type A, a type B, or a type C, the terminal device may demodulate a physical downlink control channel (PDCCH) or a physical downlink shared channel (PDSCH) based on an indication of a TCI-state. When a QCL relation is configured to be of a type D, the terminal device may learn of a transmit beam used by the network device to send a signal, and may further determine, based on a beam pairing relation determined through the channel measurement, a receive beam used to receive a signal. The terminal device may determine, based on a TCI field in DCI on the PDCCH, the receive beam for receiving the PDSCH.

9. Single-TRP Cell

The single-TRP cell is also referred to as a cell in which a single TRP is used for transmission. The single-TRP cell includes only one TRP, and a network side implements data transmission of the cell by using the one TRP. The network side may configure one or more single-TRP cells for the terminal device. Each single-TRP cell corresponds to one group of configuration information, including one beam failure detection resource group and one candidate beam resource group. It may be understood that in the single-TRP cell, only a single beam failure detection resource group and a single candidate beam resource group are needed to implement beam failure recovery of the cell. It should be understood that the TRP is a network device.

For example, a cell #1 is a cell in which a single TRP (TRP #1) is used for transmission, and the network side transmits data of the cell #1 to a terminal device by using the TRP #1. In this case, it may be considered that the cell #1 is a single-TRP cell. In this case, one beam failure detection resource group and one candidate beam resource group are configured for the terminal device.

10. Multi-TRP Cell

The multi-TRP cell is also referred to as a cell in which a plurality of TRPs used for transmission. The multi-TRP cell includes a plurality of TRPs, and a network side implements data transmission of the cell by using the plurality of TRPs. The network side may configure one or more multi-TRP cells for a terminal device. Each multi-TRP cell corresponds to one group of configuration information, including a plurality of beam failure detection resource groups and a plurality of candidate beam resource groups. It may be understood that in the multi-TRP cell, a plurality of beam failure detection resource groups and a plurality of candidate beam resource groups are needed to implement beam failure recovery of the cell.

For example, a cell #1 uses two TRPs (a TRP #1 and a TRP #2), and the network side transmits data of the cell #1 to a terminal device by using the TRP #1 and the TRP #2. In this case, it may be considered that the cell #1 is a multi-TRP cell. In this case, two beam failure detection resource groups and two candidate beam resource groups are configured for the terminal device.

Embodiments of this application may be applied to a beam-based communication system, for example, a 5th generation (5G) system, a new radio (NR) system, a long term evolution (LTE) system, an LTE frequency division duplex (FDD) system, an LTE time division duplex (TDD) system, a universal mobile telecommunication system (UMTS), or another evolved communication system.

A communication system to which embodiments of this application are applied may include one or more network devices and one or more terminal devices. One network device may transmit data or control signaling to one or more terminal devices. Alternatively, a plurality of network devices may simultaneously transmit data or control signaling to one terminal device.

By way of example and not limitation, FIG. 1 is a schematic diagram of a communication system 100 to which an embodiment of this application is applicable.

As shown in FIG. 1, the communication system 100 includes one network device 110 and a plurality of terminal devices 120 (for example, a terminal device 120*a* and a terminal device 120*b* shown in FIG. 1). The network device 110 may simultaneously send a plurality of analog beams on a plurality of radio frequency channels, to transmit data or control signaling to a plurality of terminal devices. As shown in FIG. 1, the network device simultaneously sends a beam 1 and a beam 2, where the beam 1 is used to transmit data or control signaling to the terminal device 120*a*, and the beam 2 is used to transmit data or control signaling to the terminal device 120*b*. The beam 1 may be referred to as a serving beam of the terminal device 120*a*, and the beam 2 may be referred to as a serving beam of the terminal device 120*b*. The terminal device 120*a* and the terminal device 120*b* may belong to a same cell. It may be understood that the communication system 100 is a single-TRP transmission scenario.

Figure 2:
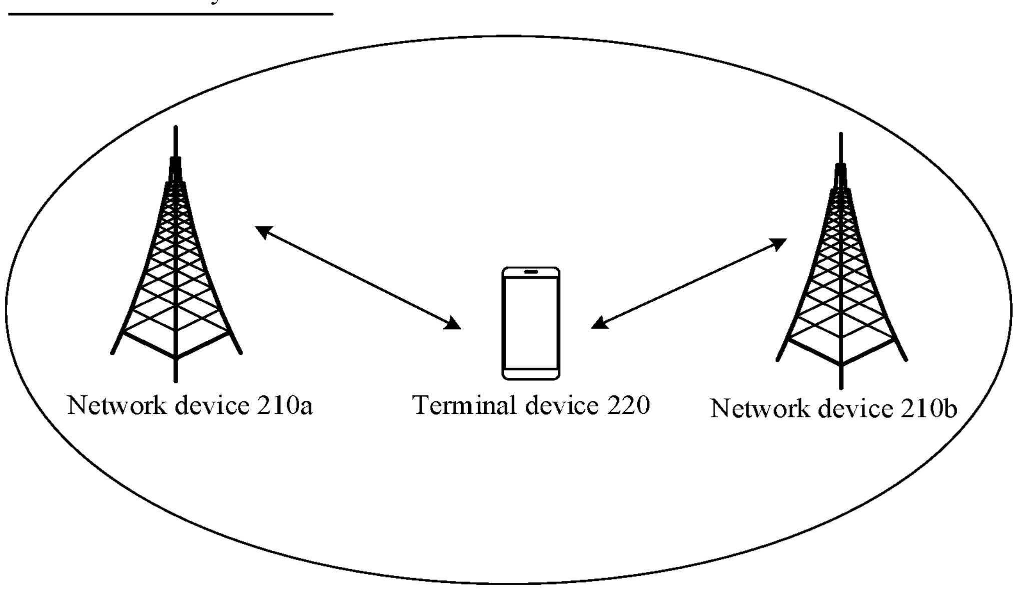
FIG. 2 is a schematic diagram of a communication system 200 to which an embodiment of this application is applicable.

By way of example and not limitation, FIG. 2 is a schematic diagram of a communication system 200 to which an embodiment of this application is applicable.

As shown in FIG. 2, the communication system 200 may include at least two network devices (for example, a network device 210*a* and a network device 210*b* shown in FIG. 2). The communication system 200 may further include at least one terminal device, for example, a terminal device 220 shown in FIG. 2. The terminal device 220 may establish radio links with the network device 210*a* and the network device 210*b* by using a dual connectivity (DC) technology or a multi-connectivity technology. The network device 210_a_ may be, for example, a primary base station, and the network device 210_b_ may be, for example, a secondary base station. In this case, the network device 210_a_ is a network device initially accessed by the terminal device 220, and is responsible for radio resource control (RRC) communication with the terminal device 220. The network device 210_b_ may be added during RRC reconfiguration, and is configured to provide an additional radio resource. It may be understood that the communication system 200 is a multi-TRP transmission scenario.

It should be understood that FIG. 1 and FIG. 2 are merely examples, and do not constitute any limitation on the communication system to which embodiments of this application are applicable.

The terminal device in this embodiment of this application may also be referred to as user equipment (UE), a mobile station (MS), a mobile terminal (MT), an access terminal, a subscriber unit, a subscriber station, a mobile station, a remote station, a remote terminal, a mobile device, a user terminal, a terminal, a wireless communication device, a user agent, a user apparatus, or the like.

The terminal device may be a device that provides voice/data connectivity for a user, for example, a handheld device or a vehicle-mounted device that has a wireless connection function. Currently, some terminals are, for example, a mobile phone (mobile phone), a tablet computer, a notebook computer, a palmtop computer, a mobile internet device (MID), a wearable device, a virtual reality (VR) device, an augmented reality (AR) device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a cellular phone (cellular phone), a cordless phone, a session initiation protocol (SIP) phone, a wireless local loop (WLL) station, a personal digital assistant (PDA), a handheld device or a computing device that has a wireless communication function or another processing device connected to a wireless modem, a vehicle-mounted device, a wearable device, a terminal device in a 5G network, and a terminal device in a future evolved public land mobile network (PLMN). This is not limited in embodiments of this application.

By way of example and not limitation, in this embodiment of this application, the terminal device may alternatively be a wearable device. The wearable device may also be referred to as a wearable intelligent device, and is a general term of a wearable device that is intelligently designed and developed for daily wear by using a wearable technology, for example, glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, or smart jewelry for monitoring physical signs.

In addition, in embodiments of this application, the terminal device may alternatively be a terminal device in an internet of things (IoT) system. IoT is an important part of future development of information technologies. A main technical feature of the IoT is to connect a thing to a network by using a communication technology, to implement an intelligent network for human-machine interconnection and thing-thing interconnection.

In addition, the network device in embodiments of this application may be a device configured to communicate with the terminal device, and the network device may also be referred to as an access network device or a radio access network device. In systems using different radio access technologies, names of network devices may be different. For example, the network device may be a transmission reception point (TRP), may be an evolved NodeB (eNB or eNodeB) in an LTE system, may be a home NodeB (for example, a home evolved NodeB, or a home NodeB, HNB) or a baseband unit (BBU), may be a radio controller in a cloud radio access network (CRAN) scenario, may be a base transceiver station (BTS) in a global system for mobile communication (GSM) or a code division multiple access (CDMA) network. Alternatively, the network device may be a relay station, an access point, a vehicle-mounted device, a wearable device, a network device in a 5G network, a network device in a future evolved PLMN network, or the like, may be an access point (AP) in a WLAN, or may be a gNB in a new radio (NR) system. This is not limited in embodiments of this application.

In a network structure, the network device may include a central unit (CU) node, a distributed unit (DU) node, a RAN device including a CU node and a DU node, or a RAN device including a CU control plane node (CU-CP node), a CU user plane node (CU-UP node), and a DU node.

The network device serves a cell, and the terminal device communicates with the cell by using a transmission resource (for example, a frequency domain resource or a spectrum resource) allocated by the network device. The cell may belong to a macro base station (for example, a macro eNB or a macro gNB), or may belong to a base station corresponding to a small cell. The small cell herein may include a metro cell, a micro cell, a pico cell, a femto cell, and the like. These small cells have characteristics of small coverage and low transmit power, and are applicable to providing a high-rate data transmission service.

In addition, a network architecture and a service scenario described in embodiments of this application are intended to describe the technical solutions in embodiments of this application more clearly, and do not constitute a limitation on the technical solutions provided in embodiments of this application. A person of ordinary skill in the art may know: With the evolution of the network architecture and the emergence of a new service scenario, the technical solutions provided in embodiments of this application are also applicable to similar technical problems.

Figure 3:
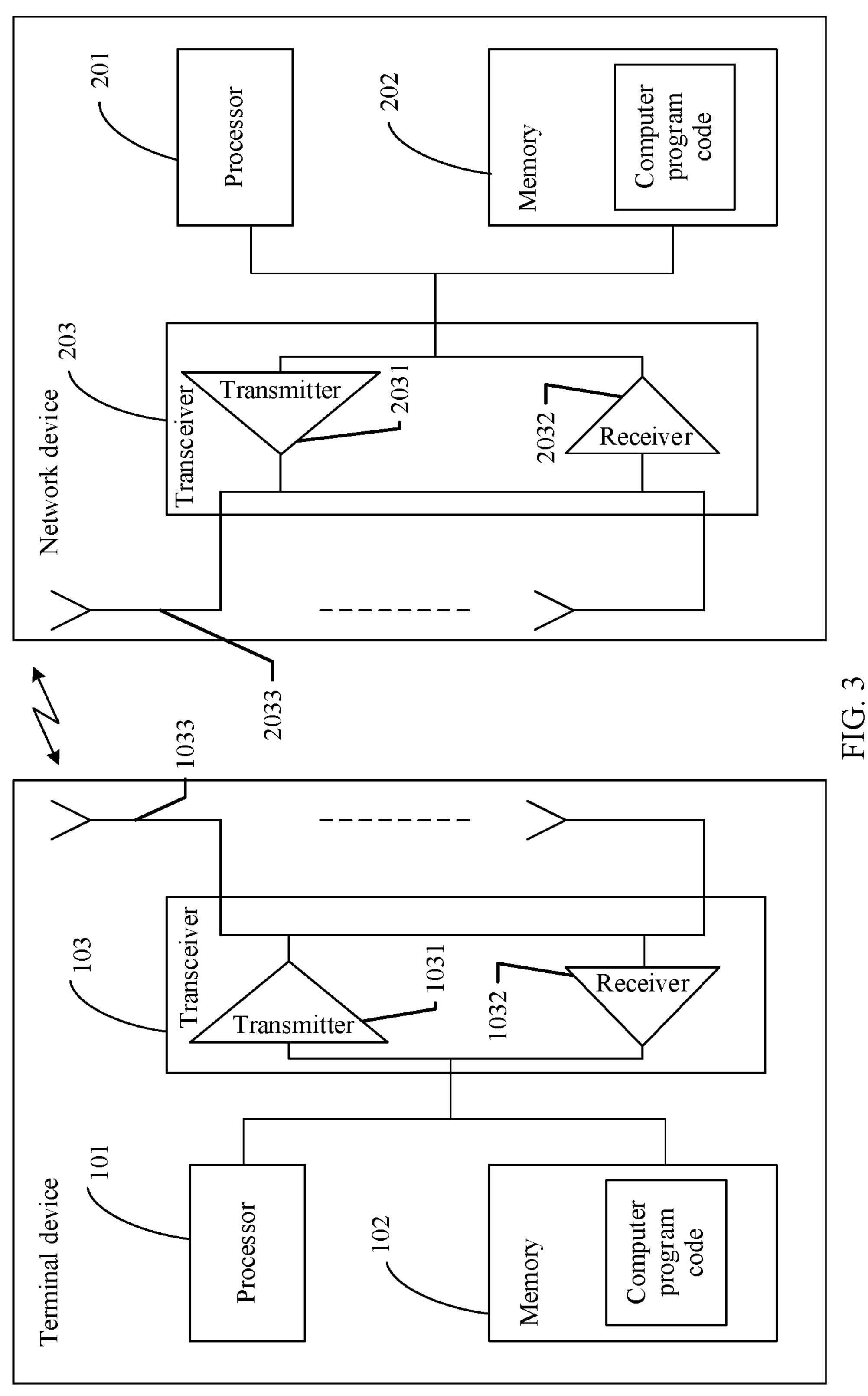
FIG. 3 is a schematic diagram of hardware structures of a network device and a terminal device according to an embodiment of this application.

By way of example and not limitation, FIG. 3 is a schematic diagram of hardware structures of a network device and a terminal device according to an embodiment of this application.

As shown in FIG. 3, the terminal device includes at least one processor 101, at least one memory 102, and at least one transceiver 103.

The processor 101, the memory 102, and the transceiver 103 are connected through a bus. The processor 101 may be a general-purpose central processing unit (CPU), a microprocessor, an application-specific integrated circuit (ASIC), or one or more integrated circuits configured to control program execution of the solutions of this application. The processor 101 may further include a plurality of CPUs, and the processor 101 may be a single-core (single-CPU) processor or a multi-core (multi-CPU) processor. The processor herein may be one or more devices, circuits, or processing cores configured to process data (for example, computer program instructions).

The memory 102 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. This is not limited in embodiments of this application. The memory 102 may exist independently, and is connected to the processor 101 through the bus. The memory 102 may alternatively be integrated with the processor 101. The memory 102 is configured to store application program code for performing the solutions of this application, and the processor 101 controls the execution. The processor 101 is configured to execute the computer program code stored in the memory 102, to implement the method provided in embodiments of this application.

The transceiver 103 includes a transmitter 1031 and a receiver 1032. The transceiver 103 may use any apparatus such as a transceiver, and is configured to communicate with another device or a communication network such as an ethernet, a radio access network (RAN), or a wireless local area network (WLAN).

Optionally, the terminal device may further include an output device and an input device (not shown in FIG. 3). The output device communicates with the processor 101, and may display information in a plurality of manners. For example, the output device may be a liquid crystal display (LCD), a light emitting diode (LED) display device, a cathode ray tube (CRT) display device, or a projector (projector). The input device communicates with the processor 101, and may receive an input from a user in a plurality of manners. For example, the input device may be a mouse, a keyboard, a touchscreen device, or a sensing device. An input and an output respectively correspond to receiving and sending in a method embodiment.

The network device includes at least one processor 201, at least one memory 202, and at least one transceiver 203. The processor 201, the memory 202, and the transceiver 203 are connected through a bus. In addition, for related descriptions of the processor 201, the memory 202, and the transceiver 203, refer to the descriptions of the processor 101, the memory 102, and the transceiver 103 in the terminal device. Details are not described herein again.

FIG. 4 is a schematic diagram of a format of a MAC CE applicable to a beam failure recovery method.

The following describes an existing MAC CE format by using an example in which a network device configures eight cells for one terminal device, and each cell is configured with one beam failure detection resource group and one candidate beam resource group. Each of the eight cells is configured with one beam failure detection resource group and one candidate beam resource group. In other words, the eight cells are all single-TRP cells.

The MAC CE shown in FIG. 4 includes one bitmap and eight bits in the one bitmap. The eight bits are respectively denoted as $C_0$, $C_1$, $C_2$, $C_3$, $C_4$, $C_5$, $C_6$, and $C_7$. The eight bits are in a one-to-one correspondence with the eight cells. If a cell corresponding to any bit is a single-TRP cell in which a beam failure occurs, the MAC CE includes one octet corresponding to the any bit. If a cell corresponding to any bit is a single-TRP cell in which no beam failure occurs, the MAC CE does not include one octet corresponding to the any bit. If the MAC CE includes one octet corresponding to the any bit, the one octet may include an AC field, an R field, and a candidate RS ID field. The AC field indicates whether there is a candidate beam resource meeting a quality requirement. The R field is a reserved field and has no specific meaning. The candidate RS ID field indicates an index of the candidate beam resource. It may be understood that when the AC field indicates that there is no candidate beam resource meeting the quality requirement, the candidate RS ID field is reserved. For example, when the AC field set to 0 indicates that there is no candidate beam resource meeting the quality requirement, the candidate RS ID field is reserved. When the AC field set to 1 indicates that there is a candidate beam resource, the candidate RS ID field indicates an identifier of a new available beam.

For example, it is defined as follows: any bit in the bitmap included in the MAC CE set to 1 indicates that a beam failure occurs in a single-TRP cell corresponding to the any bit, or any bit set to 0 indicates that no beam failure occurs in the single-TRP cell corresponding to the any bit. When the terminal device determines that a beam failure occurs in a single-TRP cell corresponding to a $2^{nd}$ bit $C_1$ in the eight bits, $C_1$ is 1, and the MAC CE includes one octet corresponding to the $2^{nd}$ bit $C_1$. The one octet may include an AC field, an R field, and a candidate RS ID field, or the one octet may include an AC field and an R field.

The MAC CE format shown in FIG. 4 is applicable to reporting only beam failure recovery information of a single-TRP cell, but is not applicable to reporting beam failure recovery information of a multi-TRP cell. In other words, if an existing beam failure recovery method and the existing MAC CE format are applied to a communication system including a multi-TRP cell, when a beam failure occurs in multi-TRP cells, related beam failure recovery information cannot be reported by using the existing method.

Embodiments of this application provide a beam failure recovery method. The method may be applied to a communication system including a multi-TRP cell and a single-TRP cell. Beam failure recovery can be performed in time by using the method.

The following describes the beam failure recovery method provided in embodiments of this application in detail with reference to FIG. 5 to FIG. 16. It should be noted that names of messages between network elements, names of parameters in messages, names of fields, or the like in embodiments of this application are merely examples, and there may be other names during specific implementation. This is not specifically limited in embodiments of this application.

FIG. 5 is a schematic diagram of a beam failure recovery method 500 according to an embodiment of this application.

As shown in FIG. 5, the method 500 includes step 510 to step 530. The following describes the step 510 to the step 530 in detail. The method 500 may be applied to but is not limited to the communication system shown in FIG. 2. When the method 500 is applied to the communication system shown in FIG. 2, the method 500 may be performed by the terminal device 220 in FIG. 2, and the network device 210*a* and the network device 210*b* in FIG. 2.

Step 510: A terminal device receives configuration information of a cell sent by a network device, where the configuration information of the cell includes M beam failure detection resource groups and M candidate beam resource groups, the M beam failure detection resource groups are in a one-to-one correspondence with the M candidate beam resource groups, and M is an integer.

In this embodiment of this application, the M beam failure detection resource groups and the M candidate beam resource groups may be understood as resources configured by the network device for a same terminal device in a cell. M is equal to 1. With reference to FIG. 1, for example, when the terminal device in the step 510 is the terminal device 120*b* in FIG. 1, one beam failure detection resource group and one candidate beam resource group in the configuration information of the cell may be understood as resources configured by the network device 110 for the terminal device 120*a*, and the one beam failure detection resource group is used to detect whether a beam failure occurs in the network device 110. M is greater than 1. For example, when M is equal to 2, with reference to FIG. 2, when the terminal device in the step 510 is the terminal device 220 in FIG. 2, the configuration information of the cell includes two beam failure detection resource groups (that is, a beam failure detection resource group #1 and a beam failure detection resource group #2) and two candidate beam resource groups (that is, a candidate beam resource group #1 and a candidate beam resource group #2). The beam failure detection resource group #1 and the candidate beam resource group #1 may correspond to the network device 210*a*, and the beam failure detection resource group #2 and the candidate beam resource group #2 may correspond to the network device 210*b*. The beam failure detection resource group #1 is used to detect whether a beam failure occurs in the network device 210*a*, and the beam failure detection resource group #2 is used to detect whether a beam failure occurs in the network device 210*b*. The two beam failure detection resource groups and the two candidate beam resource groups may be delivered to the terminal device 220 by using RRC signaling of the network device 210*a*, or may be delivered to the terminal device 220 by using RRC signaling of the network device 210*b*.

The configuration information of the cell includes M beam failure detection resource groups and M candidate beam resource groups. Each beam failure detection resource group may include S beam failure detection resources. Each candidate beam resource group may include Q candidate beam resources. Each beam failure detection resource is used for beam failure detection. Each candidate beam resource is used to identify a new available beam. S and Q are integers greater than or equal to 1. One candidate beam resource group and a beam failure detection resource group corresponding to the candidate beam resource group may be used for beam failure recovery of one TRP. Specific values of S and Q may be configured by the network device, or may be reported by the terminal device to the network device based on a terminal capability. This is not specifically limited herein.

In this embodiment of this application, a manner in which the M beam failure detection resource groups are in a one-to-one correspondence with the M candidate beam resource groups is not specifically limited. In an example, a beam failure detection resource group and a candidate beam resource group that have a same index may correspond to each other. In another example, a $k^{th}$ beam failure detection resource group may correspond to a $k^{th}$ candidate beam resource group according to a configuration sequence. Optionally, indexes of resources in the M candidate beam resource groups may be separately numbered in the resource groups. For example, when M is equal to 2, the configuration information of the cell includes two candidate beam resource groups, and each candidate beam resource group includes four resources. Numbers of the four candidate beam resources in each candidate beam resource group may be {#0, #1, #2, #3}. Optionally, indexes of resources in the M candidate beam resource groups are jointly numbered across resource groups. For example, when M is equal to 2, the configuration information of the cell includes two candidate beam resource groups, and each candidate beam resource group includes four candidate beam resources. Numbers of four resources in a $1^{st}$ candidate beam resource group may be {#0, #1, #2, #3}, and numbers of four resources in a $2^{nd}$ candidate beam resource group may be {#4, #5, #6, #7}. Optionally, it may be further specified that a maximum quantity of resources included in each candidate beam resource group is L, for example, L=64 or 32. Optionally, it may also be specified that a maximum quantity of resources in all candidate beam resource groups is T, for example, T=64 or 128. Further, it may be specified that quantities of resources in all candidate beam resource groups are equal. For example, when M=2, a total quantity of resources in two candidate beam resource groups is 64, and a quantity of resources in each candidate beam resource group is 32. For another example, when M=2, a total quantity of resources in two candidate beam resource groups is 128, and a quantity of resources in each candidate beam resource group is 64. Alternatively, it may not be specified that quantities of resources in all candidate beam resource groups are equal. For example, when M=2, a total quantity of resources in two candidate beam resource groups is 64, and a maximum quantity of resources in one candidate beam resource group is 63. For another example, when M=2, a total quantity of resources in two candidate beam resource groups is 128, and a maximum quantity of resources in one candidate beam resource group is 127.

In this embodiment of this application, the cell in the step 510 may be any one of the following two types of cells.

Cell type 1: a single-TRP cell. Only a single beam failure detection resource group and a single candidate beam resource group are needed to perform beam failure recovery for the single-TRP cell.

When M is equal to 1, the cell may be understood as a single-TRP cell. To be specific, if the network device configures only one beam failure detection resource group and one candidate beam resource group for a cell, it may be considered that the cell is the single-TRP cell. The cell is a cell serving the terminal device, and the cell includes only one TRP communicating with the terminal device.

In this embodiment of this application, descriptions, such as "a single-TRP cell" and "a cell configured with a single beam failure detection resource group", "a cell configured with a single candidate beam resource group", "configuring a single CORESET group", or "configuring a single beam failure detection timer/counter" are equivalent to each other.

Cell type 2: a multi-TRP cell. A plurality of (two and more than two) beam failure detection resource groups and a plurality of candidate beam resource groups are needed to perform beam failure recovery for the multi-TRP cell.

When M is greater than 1, the cell may be understood as a multi-TRP cell. To be specific, if the network device configures M beam failure detection resource groups and M candidate beam resource groups for a cell, and M is an integer greater than 1, it may be considered that the cell is a multi-TRP cell. The cell is a cell serving the terminal device, and the cell includes M TRPs communicating with the terminal device.

In the cell type 2, when the cell is the multi-TRP cell, a downlink signal in the cell is simultaneously sent to the terminal device by using a plurality of TRPs. In this case, the plurality of TRPs may be considered as one network device, or the plurality of TRPs may be considered as a plurality of transmitters of an entire network device.

In this embodiment of this application, descriptions, such as "using a plurality of TRPs", "a plurality of beam failure detection resource groups are configured", "a plurality of candidate beam resource groups are configured", "a plurality of CORESET groups are configured", or "a plurality of beam failure detection timers/counters are configured" are equivalent to each other.

In this embodiment of this application, the configuration information of the cell is a resource configured by the network device (for example, a base station) for the terminal device in the cell. If the network device configures only one cell for the terminal device, configuration information sent by the network device to the terminal device includes configuration information of the one cell. The configuration information of the cell may be understood as the configuration information of the one cell. In other words, that the terminal device receives the configuration information of the cell may be understood as that the terminal device receives the configuration information from the network device. In a carrier aggregation (CA) mode, the network device usually configures a plurality of cells (namely, serving cells) for the terminal device. If the network device configures K (K is an integer greater than 1) cells for the terminal device, configuration information sent by the network device to the terminal device includes configuration information of the K cells. The configuration information of the cell may be understood as configuration information of one cell in the configuration information of the K cells. In this case, that the terminal device receives the configuration information of the cell may be understood as that the terminal device receives the configuration information from the network device, and obtains the configuration information of the cell from the configuration information. In the K cells, some cells are single-TRP cells, and some cells are multi-TRP cells. This is not specifically limited herein. If one of the K cells is a single-TRP cell, the network device only needs to configure a single beam failure detection resource group and a single candidate beam resource group for the one cell. If one of the K cells is a multi-TRP cell, the network device needs to configure a plurality of beam failure detection resource groups and a plurality of candidate beam resource groups for the one cell.

For example, the network device (for example, a base station) configures eight cells (refer to Table 1 below) for a same terminal device. For ease of description, the eight cells are respectively denoted as a cell 1, a cell 2, a cell 3, a cell 4, a cell 5, a cell 6, a cell 7, and a cell 8. Each of the cell 1, the cell 2, the cell 3, and the cell 4 is a cell (that is, an example of a multi-TRP cell) in which two TRPs are used for transmission, and the TRP needs to configure two beam failure detection resource groups and two candidate beam resource groups for each of the four cells. The cell 1 is used as an example to describe how TRPs in the multi-TRP cell configure resources. The cell 1 includes two TRPs that communicate with the same terminal device. The two TRPs respectively configure one beam failure detection resource group and one candidate beam resource group for the terminal device. Therefore, a quantity of beam failure detection resource groups configured for the terminal device is 2, and a quantity of candidate beam resource groups configured for the terminal device is also 2. The cell 5, the cell 6, the cell 7, and the cell 8 are all single-TRP cells, and the network device needs to configure a single beam failure detection resource group and a single candidate beam resource group for each of the four cells. The cell 5 is used as an example to describe how a TRP in the single-TRP cell configures a resource. The cell 5 includes one TRP that communicates with the same terminal device, and the one TRP configures one beam failure detection resource group and one candidate beam resource group for the terminal device.

TABLE 1

| | Beam failure detection resource configuration information | Candidate beam resource configuration information |
|---|---|---|
| Cell 1 (Multi-TRP cell) | Beam failure detection resource group #1 | Candidate beam resource group #1 |
| | Beam failure detection resource group #2 | Candidate beam resource group #2 |
| Cell 2 (Multi-TRP cell) | Beam failure detection resource group #1 | Candidate beam resource group #1 |
| | Beam failure detection resource group #2 | Candidate beam resource group #2 |
| Cell 3 (Multi-TRP cell) | Beam failure detection resource group #1 | Candidate beam resource group #1 |
| | Beam failure detection resource group #2 | Candidate beam resource group #2 |
| Cell 4 (Multi-TRP cell) | Beam failure detection resource group #1 | Candidate beam resource group #1 |
| | Beam failure detection resource group #2 | Candidate beam resource group #2 |
| Cell 5 (Single-TRP cell) | Beam failure detection resource group #1 | Candidate beam resource group #1 |
| Cell 6 (Single-TRP cell) | Beam failure detection resource group #1 | Candidate beam resource group #1 |
| Cell 7 (Single-TRP cell) | Beam failure detection resource group #1 | Candidate beam resource group #1 |
| Cell 8 (Single-TRP cell) | Beam failure detection resource group #1 | Candidate beam resource group #1 |

Optionally, the configuration information of the cell may further include a scheduling request (SR) resource. If the network device configures a plurality of cells for one terminal device, and at least one of the plurality of cells is a multi-TRP cell (for example, the cell 1 in Table 1), the network device needs to configure a plurality of SR resources for the one terminal device, and the plurality of SR resources are in a one-to-one correspondence with a plurality of TRPs, or the network device configures one SR resource, but the one SR resource has a plurality of spatial relation parameters (that is, uplink transmit beams). If all cells configured by the network device for the terminal device are single-TRP cells (for example, the cell 6 in Table 1), the network device needs to configure only one SR resource, and the one SR resource has only a single spatial relation parameter.

In this embodiment of this application, a manner in which the network device configures the configuration information of the cell for the terminal device is not specifically limited. For example, the network device may configure the information for the terminal device in an explicit manner. For example, the network device may alternatively configure the information for the terminal device in an implicit manner.

The following uses an example in which the network device configures the beam failure detection resource group for the terminal device for description.

Manner 1: The configuration information includes the M beam failure detection resource groups, and each of the M beam failure detection resource groups includes one or more beam failure detection resources. Manner 1 may be understood as that the network device configures the beam failure detection resource group for the terminal device in an explicit manner.

For example, each beam failure detection resource group in the configuration information may be configured in the following form:

a beam failure detection resource group (for example, RadioLinkMonitoringRSSet);

a beam failure detection resource group index (for example, RadioLinkMonitoringRSSetID); and a beam failure detection resource list (for example, RadioLinkMonitoringRSList).

The beam failure detection resource group index is used to identify the beam failure detection resource group, and the beam failure detection resource list includes M beam failure detection resources.

Manner 2: The configuration information includes M CORESET groups or K CORESETs constituting the M CORESET groups, where K is a positive integer greater than or equal to M. Manner 2 may be understood as that the network device configures the beam failure detection resource group for the terminal device in an implicit manner.

In Manner 2, a QCL resource of a CORESET in each CORESET group is used as a beam failure detection resource group. QCL resources of all CORESETs in one CORESET group may be used as a beam failure detection resource group. Alternatively, only QCL resources of K (for example, K=1 or K=2) CORESETs in one CORESET group are limited as a beam failure detection resource group, to reduce resource overheads. Specifically, K CORESETs with smallest or largest indexes may be used, or the first K CORESETs or the last K CORESETs may be used in a CORESET configuration sequence. The QCL resource may be a QCL resource of a type A, a type B, a type C, or a type D. Optionally, a total quantity M of CORESETs in which QCL resources are used as beam failure detection resources may alternatively be limited in each CORESET group, and M is a positive integer (for example, M=1, M=2, M=3, or M=4). Values of K and M may be configured by the network device, or may be reported by the terminal device to the network device based on a terminal capability.

It should be noted that, in this embodiment of this application, for example, a resource used for beam failure detection is referred to as a beam failure detection resource, and a resource used to identify a new available beam is referred to as a candidate beam resource. The resource used for beam failure detection and/or the resource used to identify a new available beam may also have other names during specific implementation. Names of the two types of resources are not specifically limited in this embodiment of this application.

Step 520: The terminal device performs beam failure detection.

The following describes in detail beam failure detection performed by the terminal device by using an example in which the terminal device measures the beam failure detection resource group #1. The beam failure detection resource group #1 may be understood as any one of the M beam failure detection resource groups in the step 510, and a candidate beam resource group corresponding to the beam failure detection resource group #1 in the M candidate beam resource groups is the candidate beam resource group #1.

Optionally, the terminal device may measure each beam failure detection resource in the beam failure detection resource group #1. When quality of each beam failure detection resource is lower than a first threshold, the terminal device determines that the beam failure occurs in the beam failure detection resource group #1.

In an example, the configuration information of the cell includes the M beam failure detection resource groups and the M candidate beam resource groups, and M is an integer greater than 1. After performing the beam failure detection on each of the M beam failure detection resource groups, the terminal device determines that the beam failure is detected in at least one of the M beam failure detection resource groups. It may be understood that when M is greater than 1, the cell is a multi-TRP cell. In this case, if the beam failure is detected in only one of the M beam failure detection resource groups, the terminal device may determine that the beam failure occurs in the cell.

In another example, the configuration information of the cell includes the M beam failure detection resource groups and the M candidate beam resource groups, and M is equal to 1. After performing the beam failure detection on each of the M beam failure detection resource groups, the terminal device determines that the beam failure is detected in the M beam failure detection resource groups. It may be understood that when M is equal to 1, the cell is a single-TRP cell, and the beam failure is detected in the M beam failure detection resource groups, that is, the terminal device detects that a beam failure occurs in one beam failure detection resource group configured for the cell.

It should be understood that the M beam failure detection resource groups correspond to M TRPs, and are respectively used to detect whether the beam failure occurs in the M TRPs. Therefore, detecting that a beam failure occurs in a beam failure detection resource group is equivalent to detecting that a beam failure occurs in a TRP corresponding to the beam failure detection resource group. For example, the beam failure detection resource group #1 corresponds to a TRP #1, and detecting that the beam failure occurs in the beam failure detection resource group #1 is equivalent to that the beam failure occurs in the TRP #1.

Step 530: When M is an integer greater than 1, and the beam failure occurs in at least one of the M beam failure detection resource groups, the terminal device sends, by using a first MAC CE, beam failure recovery information corresponding to the cell.

In the step 530, M is an integer greater than 1, and the cell may be understood as a multi-TRP cell. As long as the beam failure occurs in the at least one beam failure detection resource group configured for the cell, the terminal device may send, by using the first MAC CE, the beam failure recovery information corresponding to the cell.

For example, when M is equal to 2, the configuration information of the cell includes two beam failure detection resource groups and two candidate beam resource groups. If the terminal device detects that a beam failure occurs in one of the two beam failure detection resource groups, the terminal device may send, by using the first MAC CE, the beam failure recovery information corresponding to the cell. Alternatively, if the terminal device detects that the beam failure occurs in the two beam failure detection resource groups, the terminal device may send, by using the first MAC CE, the beam failure recovery information corresponding to the cell.

That a beam failure occurs in one beam failure detection resource group may be understood as that quality of all resources in the beam failure detection resource group is lower than a preset threshold. For example, the beam failure detection resource group #1 includes k resources in total. When the k resources are all lower than the preset threshold, it may be considered that the beam failure occurs in the beam failure detection resource group #1. k is an integer.

Optionally, in some implementations, that a beam failure occurs in one beam failure detection resource group may alternatively be understood as that quality of some resources in the beam failure detection resource group is lower than the preset threshold. For example, the beam failure detection resource group #1 includes six resources in total. When four of the six resources are all lower than the preset threshold, it may be considered that the beam failure occurs in the beam failure detection resource group #1.

In the step 530, when M is greater than 1, that the beam failure is detected in at least one beam failure detection resource group may be classified into the following two cases.

Case 1: In the M (M>1) beam failure detection resource groups of the cell, the beam failure is detected in some beam failure detection resource groups. In this case, the beam failure recovery information corresponding to the cell may be sent by using the first MAC CE. This method is applicable to but is not limited to the following cells: a cell is a primary cell (PCell), a cell is a primary cell in a secondary cell group (PSCell), and a cell is a secondary cell (SCell). An SCG (secondary cell group) may be a secondary cell group in two configured cell groups. The other cell group is a master cell group (MCG).

Case 2: In the M (M>1) beam failure detection resource groups of the cell, the beam failure is detected in all the beam failure detection resource groups. In this case, how the beam failure recovery information is sent depends on a type of the cell. If the cell is an SCell, the beam failure recovery information corresponding to the cell may be sent by using the first MAC CE. If the cell is a PCell, the beam failure recovery information corresponding to the cell may be sent by using a random access process. If the cell is a PSCell, the beam failure recovery information corresponding to the cell may be sent by using the first MAC CE, or the beam failure recovery information corresponding to the cell may be sent by using a random access process. In this embodiment of this application, when the cell is a multi-TRP cell, the terminal device sends, by using the first MAC CE, the beam failure recovery information corresponding to the cell. The beam failure recovery information corresponding to the cell may include the following information: beam failure recovery information corresponding to a beam failure detection resource group in which the beam failure is detected in the M beam failure detection resource groups, and information about a beam failure detection resource group in which no beam failure is detected in the M beam failure detection resource groups. The beam failure recovery information corresponding to the beam failure detection resource group in which the beam failure is detected in the M beam failure detection resource groups includes at least information about the beam failure detection resource group in which the beam failure is detected in the M beam failure detection resource groups. Optionally, the beam failure recovery information corresponding to the beam failure detection resource group in which the beam failure is detected in the M beam failure detection resource groups may alternatively include: whether there is a candidate beam resource meeting the quality requirement. Optionally, the beam failure recovery information corresponding to the beam failure detection resource group in which the beam failure is detected in the M beam failure detection resource groups may alternatively include information about a candidate beam resource group corresponding to the beam failure detection resource group in which the beam failure is detected in the M beam failure detection resource groups.

A format of a first type of first MAC CE provided in this embodiment of this application is described below by using an example in which "the beam failure recovery information corresponding to the cell may include the following information: beam failure recovery information corresponding to a beam failure detection resource group in which the beam failure is detected in the M beam failure detection resource groups, and information about a beam failure detection resource group in which no beam failure is detected in the M beam failure detection resource groups".

Format of the First Type of First MAC CE

The first type of first MAC CE provided in this embodiment of this application includes one bitmap. The one bitmap may include P bits (bits). At least one bit (that is, at least one field in the bitmap) in the bitmap corresponds to a cell configured by the network device for the terminal device, and a value of the bit may be 0 or 1. In other words, some bits in the P bits may not correspond to any cell. A bit that does not correspond to any cell is not specially designed in this application. In some implementations, when the one bitmap includes eight bits, P may be a positive integer not greater than 8. For example, the one bitmap may include eight bits (that is, P is equal to 8), and the eight bits are in a one-to-one correspondence with eight cells. For example, the one bitmap may include eight bits (that is, P is equal to 8), only three bits in the eight bits are in a one-to-one correspondence with three cells, and the remaining five bits in the eight bits do not correspond to any cell. For example, the one bitmap may include five bits (that is, P is equal to 5), only three bits in the five bits are in a one-to-one correspondence with three cells, and the remaining two bits in the five bits do not correspond to any cell. A bit that does not correspond to any cell is not specially designed in this application.

The following describes a corresponding manner between a bit in the bitmap and a cell. The corresponding manner includes a corresponding manner 1 and a corresponding manner 2. It should be understood that the two corresponding manners are only applicable to a bit corresponding to a specific cell, that is, a bit in the following description represents only the bit corresponding to the specific cell.

Corresponding Manner 1

In the manner 1, one bit in the bitmap corresponds to one configured cell, a value of the one bit indicates whether a beam failure occurs in the cell corresponding to the one bit, and the cell corresponding to the one bit may be a single-TRP cell or a multi-TRP cell.

When the cell corresponding to the one bit is a single-TRP cell, a value of the one bit is null, and the terminal device ignores the value of the bit, and considers the one bit as a reserved field without information. It may also be understood as that when the cell corresponding to the one bit is the single-TRP cell, the value of the one bit is a first value by default, and the network device cannot set the value of the one bit to another value, or the terminal device considers the value of the one bit as a first value regardless of the value of the bit set by the network device. The first value indicates that no beam failure occurs in the cell corresponding to the one bit. For example, the first value may be 0 or 1. It may be understood that, when a quantity of beam failure detection resource groups or candidate beam resource groups configured for the cell corresponding to the one bit is 0, the foregoing method may also be used. In other words, a value of the one bit corresponding to the cell is null, or is the first value by default.

When the cell corresponding to the one bit is a multi-TRP cell, the value of the bit indicates whether the beam failure occurs in the cell. For example, the value of the one bit being 1 indicates that the beam failure occurs in at least one TRP in the cell corresponding to the one bit, that is, the beam failure is detected in at least one beam failure detection resource group. In this case, the first MAC CE further includes one or more octets. The one or more octets include a field indicating beam failure recovery information corresponding to the cell corresponding to the one or more octets. For example, it may be defined as follows: the value of the one bit being 0 indicates that no beam failure occurs in the cell corresponding to the one bit, that is, no beam failure is detected in all beam failure detection resource groups. In this case, the first MAC CE does not include the foregoing one or more octets. For another example, it may be defined as follows: the value of the one bit being 0 indicates that the beam failure occurs in at least one TRP in the cell corresponding to the one bit, and the value of the one bit being 1 indicates that no beam failure occurs in the cell corresponding to the one bit. Whether a beam failure occurs in one multi-TRP cell may be understood as whether the beam failure is detected in at least one beam failure detection resource group configured for the one multi-TRP cell. A correspondence between a bit and a cell includes but is not limited to: an $i^{th}$ bit or a bit whose name is C, in the bitmap corresponds to a cell whose index is i, where i is an integer greater than or equal to 0.

Corresponding Manner 2

In the manner 2, the bit in the bitmap can correspond to only a multi-TRP cell, and a value of the bit indicates whether the beam failure occurs in the cell corresponding to the bit. For example, the value of the bit being 1 indicates that the beam failure occurs in at least one TRP in the cell corresponding to the bit, that is, the beam failure is detected in at least one beam failure detection resource group. In this case, the first MAC CE further includes one or more octets. The one or more octets include beam failure recovery information corresponding to the cell corresponding to the bit. The value of the bit being 0 indicates that no beam failure occurs in the cell corresponding to the bit, that is, no beam failure is detected in all beam failure detection resource groups. In this case, the first MAC CE does not include the foregoing one or more octets. For another example, the value of the bit being 0 indicates that the beam failure occurs in at least one TRP in the cell corresponding to the bit, and the value of the bit being 1 indicates that no beam failure occurs in the cell corresponding to the bit. Whether a beam failure occurs in one multi-TRP cell may be understood as whether the beam failure is detected in at least one beam failure detection resource group configured for the one multi-TRP cell. A correspondence between a bit and a cell includes but is not limited to: an $i^{th}$ bit or a bit whose name is C; in the bitmap corresponds to an $i^{th}$ multi-TRP cell or a multi-TRP cell with an $i^{th}$ smallest index or an $i^{th}$ largest index in the configured multi-TRP cells, where i is an integer greater than or equal to 0. For example, if the network device configures eight cells for one terminal device, and a cell 1, a cell 3, a cell 5, and a cell 7 are multi-TRP cells, $C_0$, $C_1$, $C_2$, and $C_3$ in the bitmap respectively correspond to the cell 1, the cell 3, the cell 5, and the cell 7.

It may be understood that the first type of first MAC CE is only used to report beam failure recovery information of a multi-TRP cell. For a single-TRP cell, even if the beam failure occurs in the single-TRP cell, the first type of first MAC CE is not used to report beam failure recovery information of the single-TRP cell.

Optionally, in some implementations, one bit in one bitmap included in the first type of first MAC CE corresponds to M octets (octets or bytes).

The M octets are in a one-to-one correspondence with the M beam failure detection resource groups;

- the M octets are in a one-to-one correspondence with the M candidate beam resource groups;
- the M octets are in a one-to-one correspondence with the M transmission reception points TRPs; or
- the M octets are in a one-to-one correspondence with the M CORESET groups.

That one bit corresponds to M octets may be understood as: If a value of the one bit is a second value, the first MAC CE includes the M octets used to carry beam failure recovery information of a cell corresponding to the one bit; otherwise, the M octets are not included. The second value indicates that the beam failure occurs in the cell corresponding to the one bit. In the M beam failure detection resource groups and the M candidate beam resource groups, each beam failure detection resource group and a candidate beam resource group associated with the candidate beam resource group correspond to one TRP, to perform beam failure detection and recovery on the TRP.

That the M octets are in a one-to-one correspondence with the M beam failure detection resource groups may be specifically: A $j^{th}$ octet in the M octets corresponds to a $j^{th}$ beam failure detection resource group in the M beam failure detection resource groups. The $j^{th}$ beam failure detection resource group may be a $j^{th}$ beam failure detection resource group sorted in a configuration order or an index order. Similarly, that the M octets are in a one-to-one correspondence with the M candidate beam resource groups may be specifically: A j, octet in the M octets corresponds to a $j^{th}$ candidate beam resource group in the M candidate beam resource groups. The $j^{th}$ candidate beam resource group may be a $j^{th}$ candidate beam resource group sorted in a configuration order or an index order. Similarly, that the M octets are in a one-to-one correspondence with the M CORESET groups may be specifically: A $j^{th}$ octet in the M octets corresponds to a $j^{th}$ CORESET group in the M CORESET groups. The $j^{th}$ CORESET group may be a $j^{th}$ CORESET group sorted in a configuration order or an index order, and j is a positive integer less than or equal to M.

It may be understood that, in this embodiment of this application, descriptions, such as "TRP", "beam failure detection resource group", "candidate beam resource group", and "CORESET group" are equivalent to each other. Meanings indicated by the descriptions are consistent when a difference is not emphasized.

The one bit corresponds to the M octets. The one bit may be understood as one bit corresponding to one cell configured by the network device for the terminal device, and the cell corresponding to the one bit is a multi-TRP cell in which the beam failure occurs. For example, the beam failure may occur in one TRP in the multi-TRP cell. Alternatively, the beam failure may occur in some or all TRPs in the multi-TRP cell. That a beam failure occurs in one cell may be understood as that the terminal device detects that the beam failure occurs in at least one of the M beam failure detection resource groups included in configuration information of the one cell.

For example, a $1^{st}$ bit $C_0$ in one bitmap included in the first type of first MAC CE corresponds to a cell 1, the network device configures M beam failure detection resource groups and M candidate beam resource groups for the cell 1, and M is an integer greater than 1. If the beam failure occurs in at least one of the M beam failure detection resource groups, the first MAC CE includes M octets corresponding to the $1^{st}$ bit $C_0$, and the M octets may be in a one-to-one correspondence with the M beam failure detection resource groups, the M octets are in a one-to-one correspondence with the M candidate beam resource groups, or the M octets are in a one-to-one correspondence with M transmission reception points TRPs.

Optionally, each of the M octets includes one first field (field), and the first field indicates whether a beam failure is detected in a beam failure detection resource group corresponding to each octet. In this embodiment of this application, the beam failure detection resource group and the TRP may be equivalent to each other. In other words, the first field may also indicate whether a beam failure occurs in a TRP corresponding to each octet. A length of the first field may be one bit. In this case, the first field may be located in a first bit or a second bit of an octet of the first field. When the first field indicates that a beam failure is detected in a beam failure detection resource group corresponding to the octet of the first field, another remaining field in the octet of the first field carries further beam failure recovery information. When the first field indicates that no beam failure is detected in a beam failure detection resource group corresponding to the octet of the first field, a remaining field in the octet of the first field is reserved, that is, there is no beam failure recovery information, and the terminal device may ignore the remaining field. Optionally, the length of the first field may alternatively be more bits. For example, the length of the first field may alternatively be two bits. In this case, the first field may use first two bits of the octet of the first field. Optionally, each of the M octets further includes one second field, and the second field indicates whether there is a candidate beam resource meeting a quality requirement in a candidate beam resource group corresponding to each octet. Alternatively, the second field indicates whether there is information about a candidate beam resource in each octet. In this embodiment of this application, the candidate beam resource group and the TRP may be equivalent to each other. In other words, the second field may alternatively indicate whether there is a candidate beam resource meeting a quality requirement in a TRP corresponding to each octet. A length of the second field may be one bit. In this case, the second field may be located in a first bit, a second bit, or a third bit of an octet of the second field. When the second field indicates that there is a candidate beam resource meeting a quality requirement in a candidate beam resource group corresponding to the octet of the second field, another remaining field in the octet of the second field carries further beam failure recovery information. When the second field indicates that there is no candidate beam resource meeting a quality requirement in a candidate beam resource group corresponding to the octet of the second field, a remaining field in the octet of the second field is reserved, that is, there is no beam failure recovery information, and the terminal device may ignore the remaining field. Optionally, the length of the second field may alternatively be more bits. For example, the length of the second field may alternatively be two bits. In this case, the second field may use first two bits of the octet of the second field.

Optionally, each of the M octets further includes one third field, and the third field indicates information about the candidate beam resource that meets the quality requirement and that is determined in the candidate beam resource group corresponding to each octet. In this embodiment of this application, the candidate beam resource group and the TRP may be equivalent to each other. In other words, the third field may alternatively indicate whether there is information about the candidate beam resource meeting the quality requirement in the TRP corresponding to each octet. A length of the third field may be six bits or five bits. For example, when the length of the third field is six bits, the third field may be specifically last six bits of an octet of the field. For example, when the length of the third field is five bits, the third field may be specifically last five bits of an octet of the field. Optionally, the length of the third field may alternatively be another value. This is not specifically limited herein.

Optionally, the third field may alternatively indicate whether there is a candidate beam resource meeting the quality requirement in the candidate beam resource group corresponding to each octet. For example, a field value of the third field indicates that there is no candidate beam resource meeting the quality requirement, and a remaining field value indicates information about a specific candidate beam resource meeting the quality requirement. For example, a length of the third field is six bits, a field value 000000 indicates that there is no candidate beam resource meeting the quality requirement, and a remaining field value indicates information about a specific candidate beam resource meeting the quality requirement. Alternatively, a field value 111111 indicates that there is no candidate beam resource meeting the quality requirement, and a remaining field value indicates information about a specific candidate beam resource meeting the quality requirement. In other words, remaining 63 field values may separately indicate one of 63 candidate beam resources. It may be specified that the candidate beam resource group configured by the network device for the terminal device includes a maximum of 63 candidate beam resources. Alternatively, it is specified that two candidate beam resource groups configured by the network device for the terminal device include a maximum of 63 candidate beam resources in total. For another example, a length of the third field is five bits, a field value 00000 indicates that there is no candidate beam resource meeting the quality requirement, and a remaining field value indicates information about a specific candidate beam resource meeting the quality requirement. Alternatively, a field value 11111 indicates that there is no candidate beam resource meeting the quality requirement, and a remaining field value indicates information about a specific candidate beam resource meeting the quality requirement. In other words, remaining 31 field values may separately indicate one of 31 candidate beam resources. It may be specified that the candidate beam resource group configured by the network device for the terminal device includes a maximum of 31 candidate beam resources. Alternatively, it is specified that two candidate beam resource groups configured by the network device for the terminal device include a maximum of 31 candidate beam resources in total. For another example, a length of the third field is seven bits, a field value 0000000 indicates that there is no candidate beam resource meeting the quality requirement, and a remaining field value indicates information about a specific candidate beam resource meeting the quality requirement. Alternatively, a field value 1111111 indicates that there is no candidate beam resource meeting the quality requirement, and a remaining field value indicates information about a specific candidate beam resource meeting the quality requirement. In other words, remaining 127 field values may separately indicate one of 127 candidate beam resources. It may be specified that the candidate beam resource group configured by the network device for the terminal device includes a maximum of 127 candidate beam resources. Alternatively, it is specified that two candidate beam resource groups configured by the network device for the terminal device include a maximum of 127 candidate beam resources in total.

Each of the M octets may include only any one of the foregoing fields. To be specific, each of the M octets may include only the one first field. Alternatively, each of the M octets may include only the one second field. Alternatively, each of the M octets may include only the one third field.

Optionally, each of the M octets may include any several fields in the foregoing fields. For example, each of the M octets may include one first field and one second field. For example, each of the M octets may include one first field, one second field, and one third field. For example, each of the M octets may include one first field and one third field.

Optionally, if the first field in any one of the M octets indicates that no beam failure is detected in a beam failure detection resource group corresponding to the any octet, a remaining field in the any octet is reserved.

For example, if any one of the M octets includes a first field and a second field, and the first field in the any octet indicates that no beam failure is detected in a beam failure detection resource group corresponding to the any octet, the second field in the any octet is reserved. Correspondingly, after the network device receives the first MAC CE, the network device may determine that no beam failure occurs in the beam failure detection resource group corresponding to the any octet. If any one of the M octets includes a first field, a second field, and a third field, and the first field in the any octet indicates that no beam failure is detected in the beam failure detection resource group corresponding to the any octet, the second field and the third field in the any octet are reserved. If any one of the M octets includes a first field, a second field, and a third field, the first field in the any octet indicates that a beam failure is detected in a beam failure detection resource group corresponding to the any octet, and the second field in the any octet indicates that there is no candidate beam resource meeting the quality requirement in a candidate beam resource group corresponding to the any octet, the third field in the any octet is reserved. Correspondingly, after the network device receives the first MAC CE, the network device may determine that the beam failure occurs in the beam failure detection resource group corresponding to the any octet, and that there is no candidate beam resource corresponding to the beam failure detection resource group.

It may be understood that the first type of first MAC CE is used to report beam failure recovery information of a multi-TRP cell. For a single-TRP cell, even if the beam failure occurs in the single-TRP cell, the first MAC CE is not used to report beam failure recovery information of the single-TRP cell to the network device.

For example, if the network device configures only one beam failure detection resource group #1 and one candidate beam resource group #1 for a terminal device #1, in other words, a cell in which the terminal device #1 communicates with the network device is a single-TRP cell, regardless of a value of a bit that is in the bitmap and that corresponds to the cell (in other words, regardless of whether a beam failure occurs in a single-TRP cell corresponding to the bit), the terminal device considers by default that no beam failure occurs in the single-TRP cell corresponding to the bit. Therefore, the first MAC CE does not include an octet corresponding to the bit, and the terminal device does not send, by using the first MAC CE, beam failure recovery information of the single-TRP cell corresponding to the bit.

It should be further understood that descriptions are provided above by using an example in which "one bit in the bitmap included in the first type of first MAC CE corresponds to one field, and the one field corresponds to one cell". Optionally, the first type of first MAC CE includes a plurality of fields, each of the plurality of fields corresponds to one cell, and each field uses a plurality of bits (two bits or more than two bits). In this case, the plurality of fields may be considered as one entire bitmap, one "bit" in the one bitmap is equal to one "field", and the field includes a plurality of bits.

It should be understood that, based on the format of the first type of first MAC CE provided in this embodiment of this application, if the terminal device needs to send, by using the first MAC CE, the beam failure recovery information corresponding to the cell, it needs to be ensured that one bit in one bitmap included in the first MAC CE corresponds to the cell, the terminal device detects that the beam failure occurs in the cell, and the configuration information of the cell includes the M beam failure detection resource groups and the M candidate beam resource groups, where M is an integer greater than 1 (in other words, the cell is a multi-TRP cell). That is, the terminal device can send, by using the first MAC CE, the beam failure recovery information corresponding to the cell only in the foregoing case.

Optionally, the network device may further allocate another cell different from the foregoing cell to the terminal device. For ease of description, the another cell different from the foregoing cell is used. For example, the another cell may be a single-TRP cell, in other words, configuration information of the another cell includes one beam failure detection resource group and one candidate beam resource group. In this case, one bit in one bitmap included in the first MAC CE corresponds to the another cell, and the terminal device considers by default that no beam failure occurs in the another cell regardless of a value of the one bit. In this case, the first MAC CE does not include one octet corresponding to the one bit. For example, the another cell may alternatively be a multi-TRP cell, in other words, configuration information of the another cell includes a plurality of (for example, "a plurality of" means S, S is an integer greater than 1, and S may be equal to M, or S may not be equal to M) beam failure detection resource groups and a plurality of candidate beam resource groups. In this case, one bit in one bitmap included in the first MAC CE corresponds to the another cell. When the beam failure occurs in at least one of the plurality of beam failure detection resource groups, the first MAC CE further includes a plurality of octets corresponding to the one bit, and the plurality of octets are in a one-to-one correspondence with the plurality of beam failure detection resource groups configured for the another cell.

The foregoing describes the format of the first type of first MAC CE provided in this embodiment of this application in detail with reference to text. The following describes the formats of the first type of first MAC CE with reference to FIG. 6 and FIG. 7.

For example, a schematic diagram of the format of the first type of first MAC CE provided in this embodiment of this application is described by using an example in which the network device configures eight cells for one terminal device, and configures M (M is an integer greater than 1) beam failure detection resource groups and M candidate beam resource groups for each cell. It may be understood that the eight cells are all multi-TRP cells.

Figure 6:
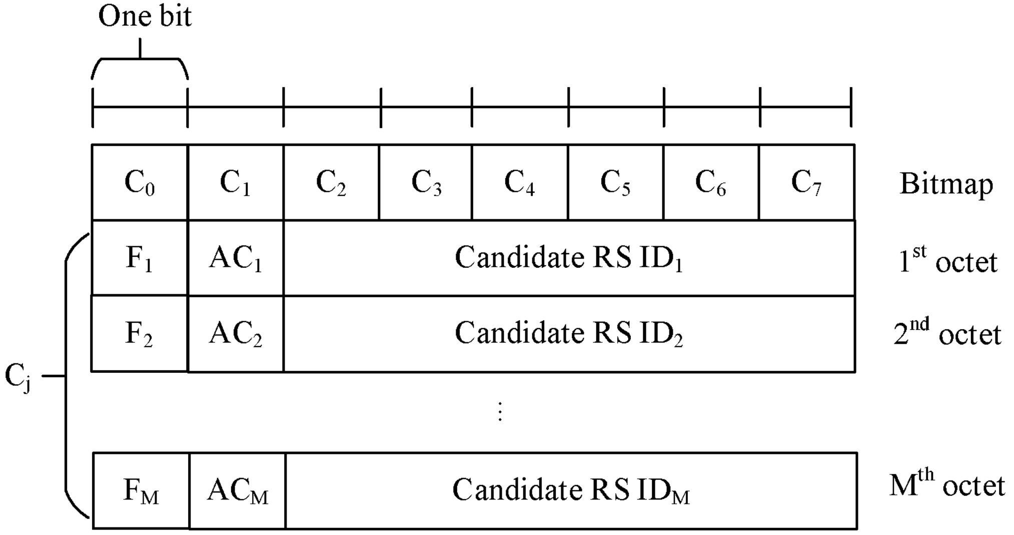
FIG. 6 is a schematic diagram of a format of a first type of first MAC CE according to an embodiment of this application.

As shown in FIG. 6, the first type of first MAC CE provided in this embodiment of this application includes one bitmap (the one bitmap includes eight bits (that is, eight fields, where each field uses one bit), and the eight bits are respectively denoted as $C_0$, $C_1$, $C_2$, $C_3$, $C_4$, $C_5$, $C_6$, and $C_7$, and are in a one-to-one correspondence with the eight cells) and M octets (i is an integer greater than or equal to 0 and less than or equal to 7) corresponding to an $i^{th}$ bit $C_i$ in the one bitmap. In addition, a cell corresponding to the $i^{th}$ bit $C_i$ is a multi-TRP cell in which the beam failure occurs. A quantity of octets corresponding to the $i^{th}$ bit $C_i$ is the same as a quantity of beam failure detection resource groups or candidate beam resource groups included in the cell corresponding to the $i^{th}$ bit $C_i$. The M octets corresponding to the $i^{th}$ bit $C_i$ may be in a one-to-one correspondence with the M beam failure detection resource groups, the M octets corresponding to the $i^{th}$ bit $C_i$ may be in a one-to-one correspondence with the M candidate beam resource groups, or the M octets corresponding to the $i^{th}$ bit $C_i$ may be in a one-to-one correspondence with the M TRPs. It may be understood that when one bit in the one bitmap corresponds to a multi-TRP cell in which no beam failure occurs, or when one bit in the one bitmap corresponds to a single-TRP cell, the first MAC CE does not include an octet corresponding to the one bit.

For example, if a beam failure occurs in a multi-TRP cell (configuration information of the cell includes M beam failure detection resource groups and M candidate beam resources, and M is an integer greater than 1) corresponding to a $1^{st}$ bit $C_0$ in one bitmap included in the first MAC CE, the first MAC CE includes M octets corresponding to the $1^{st}$ bit $C_0$, and the M octets may be in a one-to-one correspondence with the M beam failure detection resource groups. If the beam failure is detected in only one of the M beam failure detection resource groups, and the one beam failure detection resource group corresponds to a $1^{st}$ octet in the M octets, the $1^{st}$ octet in the M octets may include an $F_1$ field (that is, an example of the first field), an $AC_1$ field (that is, an example of the second field), and a candidate RS $ID_1$ field (that is, an example of the third field). A value of the $F_1$ field indicates that a beam failure occurs in a beam failure detection resource group corresponding to the $1^{st}$ octet, a value of the $AC_1$ field indicates that there is a candidate beam resource meeting the quality requirement in a candidate beam resource group corresponding to the octet of the field, and a value of the RS $ID_1$ candidate field indicates information about the candidate beam resource meeting the quality requirement. Alternatively, the $1^{st}$ octet in the M octets may include only an $F_1$ field (that is, an example of the first field) and an $AC_1$ field (that is, an example of the second field). A value of the $F_1$ field indicates that the beam failure occurs on a beam failure detection resource group corresponding to the $1^{st}$ octet, and a value of the $AC_1$ field indicates that there is no candidate beam resource meeting the quality requirement in a candidate beam resource group corresponding to the octet of the field. In this case, a value of a candidate RS $ID_1$ field is null, that is, the candidate RS $ID_1$ has no specific meaning. In addition, each of the M octets except the $1^{st}$ octet includes only an $F_1$ field (that is, an example of the first field), and a value of the $F_1$ field indicates that no beam failure occurs in a beam failure detection resource group corresponding to the octet of the field.

Optionally, in some implementations, an $F_M$ field in FIG. 6 may be located in a second bit of each octet, and an $AC_M$ field in FIG. 6 may be located in a first bit of each octet. In this case, locations of the $F_M$ field and the $AC_M$ field in FIG. 6 need to be exchanged. Optionally, in some implementations, a length of a candidate RS $ID_M$ field in FIG. 6 may alternatively be five bits. Optionally, in some implementations, a length of a candidate RS ID field in one octet in FIG. 6 may be fewer bits (for example, five bits), and a length of an AC field may be more bits (for example, two bits). For example, a length of an R field may be one bit, a length of the AC field may be two bits, and the candidate RS ID field may be five bits. In this case, it may be defined as follows: a value of the AC field being 11 indicates that there is a candidate beam resource meeting the quality requirement in a candidate beam resource group corresponding to an octet of the AC field.

It should be understood that in FIG. 6, a specific format of the first type of first MAC CE provided in this embodiment of this application is described by using an example in which "the network device configures eight cells for one terminal device, M beam failure detection resource groups and M candidate beam resource groups are configured for each cell, and M is an integer greater than 1". That is, FIG. 6 is merely an example, and does not constitute any limitation on the format of the first type of first MAC CE provided in this embodiment of this application.

The following uses the format of the first type of first MAC CE shown in FIG. 6 as an example for description.

For example, the network device configures three cells for one terminal device: a cell 0, a cell 1, and a cell 2. The cell 0 is a cell configured with three beam failure detection resource groups and three candidate beam resource groups, the cell 1 is a cell configured with two beam failure detection resource groups and two candidate beam resource groups, and the cell 2 is a cell configured with one beam failure detection resource group and one candidate beam resource group. The cell 0 corresponds to a first bit $C_0$ in a bitmap included in the first MAC CE, the cell 1 corresponds to a second bit $C_1$ in the bitmap included in the first MAC CE, and the cell 2 corresponds to a third bit $C_2$ in the bitmap included in the first MAC CE.

The terminal device detects that a beam failure occurs in two beam failure detection resource groups (a beam failure detection resource group #1 and a beam failure detection resource group #3) in the three beam failure detection resource groups (the beam failure detection resource group #1, a beam failure detection resource group #2, and the beam failure detection resource group #3) configured for the cell 0, and there is only a candidate beam resource corresponding to the beam failure detection resource group #1 in the three candidate beam resource groups. The beam failure detection resource group #1 corresponds to a $1^{st}$ octet in three octets corresponding to the first bit $C_0$, the beam failure detection resource group #2 corresponds to a $2^{nd}$ octet in the three octets corresponding to the first bit $C_0$, and the beam failure detection resource group #3 corresponds to a $3^{rd}$ octet in the three octets corresponding to the first bit $C_0$.

The terminal device detects that a beam failure occurs in one beam failure detection resource group (namely, a beam failure detection resource group #2) in the two beam failure detection resource groups (a beam failure detection resource group #1 and the beam failure detection resource group #2) configured for the cell 1, and there is only a candidate beam resource corresponding to the beam failure detection resource group #1 and a candidate beam resource corresponding to the beam failure detection resource group #3 in the three candidate beam resource groups. The beam failure detection resource group #1 corresponds to a $1^{st}$ octet in two octets corresponding to a second bit $C_1$, and the beam failure detection resource group #2 corresponds to a $2^{nd}$ octet in the two octets corresponding to the second bit $C_1$.

The terminal device detects that quantities of beam failure detection resource groups and candidate beam resource groups configured for the cell 2 are 1. Therefore, the first MAC CE does not include an octet corresponding to the third bit $C_2$, and a value of the third bit $C_2$ is 0 or 1 by default.

In an example, it is defined as follows: a value of one bit in a bitmap corresponding to a multi-TRP cell being 1 indicates that the beam failure occurs in the multi-TRP cell, and a value of one bit in a bitmap corresponding to the multi-TRP cell being 0 indicates that no beam failure occurs in the multi-TRP cell. It is defined as follows: a value of a $1^{st}$ field in each of a plurality of octets corresponding to the one bit being 1 indicates that a beam failure occurs in a beam failure detection resource group corresponding to each octet, and a value of a $1^{st}$ field in each of a plurality of octets corresponding to the one bit being 0 indicates that no beam failure occurs in a beam failure detection resource group corresponding to each octet. In this case, for specific content of the three octets corresponding to the first bit $C_0$ and the two octets corresponding to the second bit $C_1$, refer to FIG. 7. An octet corresponding to the first bit $C_0$ is used as an example. If a field in the octet corresponding to $C_0$ is reserved, it indicates that the field has no specific meaning. For example, if an $F_2$ field in a $2^{nd}$ octet corresponding to the first bit $C_0$ is set to 0, it indicates that no beam failure occurs in a beam failure detection resource group corresponding to the $2^{nd}$ octet. Therefore, a remaining field in the $2^{nd}$ octet is reserved.

Figure 7:
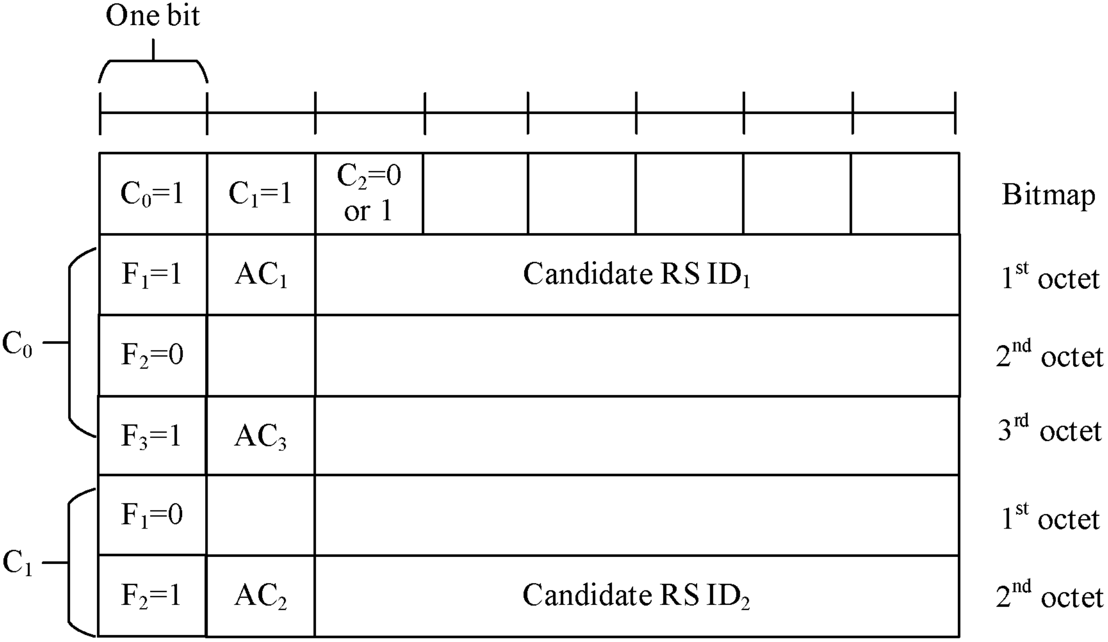
FIG. 7 is a schematic diagram of a format of a first type of first MAC CE according to an embodiment of this application.

It should be understood that FIG. 6 and FIG. 7 are merely examples, and do not constitute any limitation on the format of the first type of first MAC CE provided in this embodiment of this application. All formats of the first MAC CE obtained based on a definition of the format of the first type of first MAC CE provided in this embodiment of this application belong to the formats of the MAC CE claimed in this embodiment of this application.

The format of the first type of first MAC CE provided in this embodiment of this application is described above by using an example in which "the beam failure recovery information corresponding to the cell may include the following information: beam failure recovery information corresponding to a beam failure detection resource group in which the beam failure is detected in the M beam failure detection resource groups, and information about a beam failure detection resource group in which no beam failure is detected in the M beam failure detection resource groups". The following describes a format of a second type of first MAC CE, a format of a third type of first MAC CE, a format of a fourth type of first MAC CE, and a format of a fifth type of first MAC CE provided in this embodiment of this application by using an example in which "the beam failure recovery information corresponding to the cell may include beam failure recovery information corresponding to a beam failure detection resource group in which the beam failure is detected in the M beam failure detection resource groups".

Format of the Second Type of First MAC CE

The second type of first MAC CE provided in this embodiment of this application includes one bitmap. It may be understood that a definition of one bitmap included in the second type of first MAC CE is the same as a definition of one bitmap included in the first type of first MAC CE. For content that is not described in detail herein, refer to the definition of the one bitmap included in the first type of first MAC CE.

Optionally, one bit in the bitmap corresponds to one or more octets. The first MAC CE further includes one fourth field, and the fourth field indicates a quantity of octets corresponding to one bit.

A cell corresponding to the one bit may be understood as a multi-TRP cell in which the beam failure occurs. A specific quantity of octets corresponding to the one bit is equal to a quantity of TRPs in which the beam failure occurs in the multi-TRP cell corresponding to the one bit, or is equal to a quantity of beam failure detection resource groups in which the beam failure occurs in the multi-TRP cell corresponding to the one bit. Specifically, when the beam failure occurs in only one TRP in a multi-TRP cell corresponding to one bit, the one bit corresponds to only one octet, in other words, the second type of first MAC CE includes only one octet corresponding to the one bit. For example, there are two TRPs in the multi-TRP cell in total. When the beam failure occurs in only one of the two TRPs, a bit corresponding to the multi-TRP cell in the bitmap corresponds to only one octet, and the one octet corresponds to the TRP in which the beam failure occurs or corresponds to a beam failure detection resource group in which the beam failure is detected. In this case, the second type of first MAC CE includes only one octet corresponding to the one bit. When the beam failure occurs in only a plurality of TRPs in a multi-TRP cell corresponding to one bit, the one bit corresponds to only a plurality of octets, in other words, the bitmap includes the plurality of octets corresponding to the one bit. For example, there are two TRPs in the multi-TRP cell in total. When the beam failure occurs in the two TRPs, a bit corresponding to the multi-TRP cell in the bitmap correspond to two octets, and the two octets correspond to the two TRPs in which the beam failure occurs, or correspond to two beam failure detection resource groups in which the beam failure is detected in the multi-TRP cell. In this case, the second type of first MAC CE includes two octets corresponding to the bit. Optionally, the fourth field may also be understood as indicating the quantity of TRPs in which the beam failure occurs in the multi-TRP cell, or the fourth field may also be understood as indicating a quantity of beam failure detection resource groups in which the beam failure occurs in the multi-TRP cell. For example, it may be defined as follows: the fourth field set to 0 indicates that a beam failure occurs in a single TRP in the multi-TRP cell, and the fourth field set to 1 indicates that a beam failure occurs in a plurality of TRPs in the multi-TRP cell. Alternatively, it may be defined as follows: the fourth field set to 1 indicates that a beam failure occurs in a single TRP in the multi-TRP cell, and the fourth field set to 0 indicates that a beam failure occurs in a plurality of TRPs in the multi-TRP cell.

In the second type of first MAC CE provided in this embodiment of this application, the first MAC CE includes one or more octets corresponding to any bit only when a cell corresponding to the bit in a bitmap included in the first MAC CE is a multi-TRP cell in which the beam failure occurs, and a beam failure detection resource group corresponding to the one or more octets is a beam failure detection resource group in which a beam failure occurs.

Optionally, the fourth field may be a field in a $1^{st}$ octet in one or more octets corresponding to the cell, and the fourth field indicates whether a next octet of the $1^{st}$ octet carries beam failure recovery information corresponding to the cell, or the fourth field indicates whether the first MAC CE includes a $2^{nd}$ octet according to the cell. The fourth field may be located in a first bit or a second bit in the $1^{st}$ octet. In this case, a length of the fourth field is one bit. Optionally, a length of the fourth field may alternatively be more bits. For example, the length of the fourth field may alternatively be two bits. In this case, the fourth field may use first two bits of the octet of the fourth field.

Optionally, the $1^{st}$ octet in the one or more octets further includes a fifth field, and the fifth field indicates information about a TRP in which a beam failure occurs. For example, the information about the TRP in which the beam failure occurs includes but is not limited to an index of the TRP in which the beam failure occurs, or an index of a beam failure detection resource group in which the beam failure is detected. It should be understood that descriptions of the index of the TRP, the index of the beam failure detection resource group corresponding to the TRP, an index of a candidate beam resource group index corresponding to the TRP, and an index of a CORESET group are equivalent, that is, meanings indicated by these descriptions are consistent.

Further, it may be specified that only when the fourth field indicates that there is only one octet, the fifth field indicates the information about the TRP in which the beam failure occurs or information about the beam failure detection resource group in which the beam failure is detected. When the fourth field indicates that there are M octets, a value of the fifth field may be null, that is, there is no specific information, and the terminal device may ignore the fifth field. In this case, the M octets are in a one-to-one correspondence with the M beam failure detection resource groups, the M octets are in a one-to-one correspondence with the M candidate beam resource groups, the M octets are in a one-to-one correspondence with M TRPs, or the M octets are in a one-to-one correspondence with M CORESET groups. For a specific correspondence, refer to the format of the first type of first MAC CE.

A length of the fifth field may be one bit, or a length of the fifth field may be more bits. This is not specifically limited herein. For example, the length of the fifth field may alternatively be two bits. In this case, the fifth field may use first two bits of the octet of the fifth field.

Optionally, each of the one or more octets further includes one seventh field, and the seventh field indicates whether there is a candidate beam or candidate beam resource meeting the quality requirement in a candidate beam resource group corresponding to each octet. Alternatively, the seventh field indicates whether there is information about a candidate beam resource in each octet. In this embodiment of this application, the candidate beam resource group and the TRP may be equivalent to each other. In other words, the seventh field may alternatively indicate whether there is a candidate beam resource meeting the quality requirement in a TRP corresponding to each octet. A length of the seventh field is one bit, and the seventh field may be located in a first bit, a second bit, or a third bit in the corresponding octet. For example, if any bit corresponds to a plurality of octets, a seventh field in a $1^{st}$ octet in the plurality of octets may be located in a $3^{rd}$ bit in the $1^{st}$ octet, and a seventh field in a $2^{nd}$ octet in the plurality of octets may also be located in a $3^{rd}$ bit in the $2^{nd}$ octet, or the seventh field in the $2^{nd}$ octet may be located in a $1^{st}$ bit or a $2^{nd}$ bit in the $2^{nd}$ octet. In this case, the seventh field uses one bit. Optionally, a length of the seventh field may alternatively be more bits. This is not specifically limited herein.

Optionally, each of the one or more octets further includes one eighth field. Further, this embodiment of this application further provides two definition manners of the eighth field. The following specifically describes the two definition manners of the eighth field. In a first definition manner, the eighth field indicates information about the candidate beam or candidate beam resource that meets the quality requirement and that is determined in the candidate beam resource group corresponding to each octet. In this embodiment of this application, the candidate beam resource group and the TRP may be equivalent to each other. In other words, the eighth field may alternatively indicate information about the candidate beam resource meeting the quality requirement in the TRP corresponding to each octet. A length of the eighth field may be six bits or five bits. For example, when the length of the eighth field is six bits, the eighth field may be specifically last six bits of the octet of the field. For example, when the length of the eighth field is five bits, the eighth field may be specifically last five bits of the octet of the field. Optionally, the length of the eighth field may alternatively be another value. This is not specifically limited herein.

In a second definition manner, a value of the eighth field may include a plurality of field values. One of the plurality of field values indicates that there is no candidate beam resource meeting the quality requirement in the candidate beam resource group corresponding to each octet, and each of remaining field values that are different from the one field value and that are in the plurality of field values indicates information about a candidate beam resource meeting the quality requirement. Optionally, some of the remaining field values may not indicate the information about the candidate beam resource meeting the quality requirement, that is, not all of the remaining field values indicate the information about the candidate beam resource meeting the quality requirement. For example, a length of the eighth field is six bits, a field value 000000 indicates that there is no candidate beam resource meeting the quality requirement, and a remaining field value (for example, 111100) indicates information about a specific candidate beam resource meeting the quality requirement. Alternatively, a field value 111111 indicates that there is no candidate beam resource meeting the quality requirement, and a remaining field value (for example, 111000) indicates information about a specific candidate beam resource meeting the quality requirement. In other words, remaining 63 field values may separately indicate one of 63 candidate beam resources. It may be specified that the candidate beam resource group configured by the network device for the terminal device includes a maximum of 63 candidate beam resources. Alternatively, it is specified that two candidate beam resource groups configured by the network device for the terminal device include a maximum of 63 candidate beam resources in total. For another example, a length of the eighth field is five bits, a field value 00000 indicates that there is no candidate beam resource meeting the quality requirement, and a remaining field value indicates information about a specific candidate beam resource meeting the quality requirement. Alternatively, a field value 11111 indicates that there is no candidate beam resource meeting the quality requirement, and a remaining field value indicates information about a specific candidate beam resource meeting the quality requirement. In other words, remaining 31 field values may separately indicate one of 31 candidate beam resources. It may be specified that the candidate beam resource group configured by the network device for the terminal device includes a maximum of 31 candidate beam resources. Alternatively, it is specified that two candidate beam resource groups configured by the network device for the terminal device include a maximum of 31 candidate beam resources in total. For another example, a length of the eighth field is seven bits, a field value 0000000 indicates that there is no candidate beam resource meeting the quality requirement, and a remaining field value indicates information about a specific candidate beam resource meeting the quality requirement. Alternatively, a field value 1111111 indicates that there is no candidate beam resource meeting the quality requirement, and a remaining value indicates information about a specific candidate beam resource meeting the quality requirement. In other words, remaining 127 field values may separately indicate one of 127 candidate beam resources. It may be specified that the candidate beam resource group configured by the network device for the terminal device includes a maximum of 127 candidate beam resources. Alternatively, it is specified that two candidate beam resource groups configured by the network device for the terminal device include a maximum of 127 candidate beam resources in total.

Each of the one or more octets corresponding to the one bit may include only any one of the foregoing fields. To be specific, each of the one or more octets corresponding to the one bit may include only the one fourth field. Each of the one or more octets corresponding to the one bit may include only the one fifth field. Each of the one or more octets corresponding to the one bit may include only the one seventh field. Each of the one or more octets corresponding to the one bit may include only the one eighth field (for example, the eighth field in the first definition manner or the eighth field in the second definition manner).

Optionally, each of the one or more octets corresponding to the one bit may include a plurality of fields in the foregoing fields. For example, each of the one or more octets corresponding to the one bit may include one fourth field and one fifth field. For example, each of the one or more octets corresponding to the one bit may include one fourth field, one fifth field, one seventh field, and one eighth field (that is, the eighth field in the first definition manner). When the seventh field indicates that there is no candidate beam resource meeting the quality requirement in a TRP corresponding to the octet of the seventh field, a value of the eighth field may be null.

The foregoing describes the format of the second type of first MAC CE provided in this embodiment of this application in detail with reference to text. The following describes the format of the second type of first MAC CE with reference to FIG. 8 and FIG. 9.

For example, a schematic diagram of the format of the second type of first MAC CE provided in this embodiment of this application is described by using an example in which the network device configures eight cells for one terminal device, and configures M (M is an integer greater than 1) beam failure detection resource groups and M candidate beam resource groups for each cell. The eight cells may be understood as multi-TRP cells.

Figure 8:
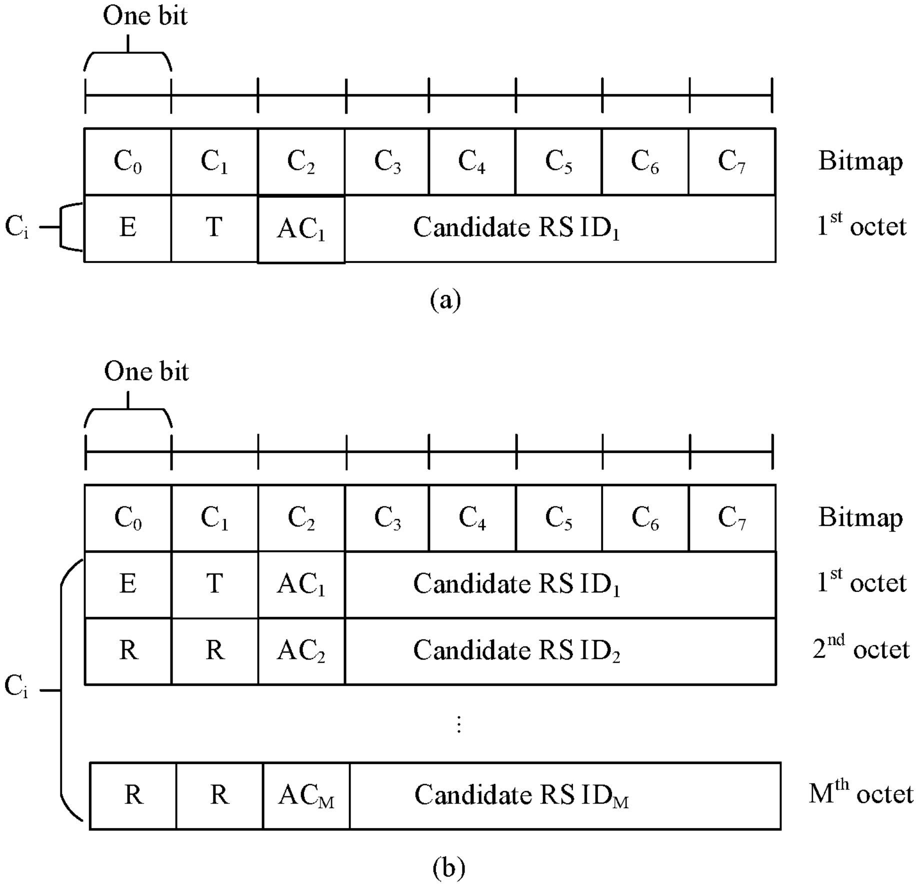
FIG. 8 is a schematic diagram of a format of a second type of first MAC CE according to an embodiment of this application.

As shown in FIG. 8, the second type of first MAC CE provided in this embodiment of this application includes one bitmap (the one bitmap includes eight bits (that is, eight fields, where each field uses one bit), and the eight bits are respectively denoted as $C_0$, $C_1$, $C_2$, $C_3$, $C_4$, $C_5$, $C_6$, and $C_7$, and are in a one-to-one correspondence with the eight cells) and one or more octets corresponding to any bit $C_i$ (i is an integer greater than or equal to 0 and less than or equal to 7) in the one bitmap. A cell corresponding to the any bit $C_i$ is a multi-TRP cell in which the beam failure occurs. A quantity of octets corresponding to the any bit $C_i$ is the same as a quantity of TRPs in which the beam failure occurs in a multi-TRP cell corresponding to the any bit $C_i$.

As shown in (a) in FIG. 8, if the quantity of TRPs in which the beam failure occurs in the multi-TRP cell corresponding to the any bit $C_i$ is 1, the any bit $C_i$ corresponds to one octet, and the one octet may include an E field (that is, an example of the fourth field), a T field (that is, an example of the fifth field), an $AC_1$ field (that is, an example of the seventh field), and a candidate RS $ID_1$ field (that is, an example of the eighth field). The E field indicates that the beam failure occurs in only one TRP in the multi-TRP cell corresponding to the any bit $C_1$. The T field indicates information about one TRP (for example, an index of the TRP) in which the beam failure occurs. The $AC_1$ field indicates that there is a candidate beam or candidate beam resource meeting the quality requirement in a candidate beam resource group corresponding to the one octet. The candidate RS $ID_1$ field indicates information about the candidate beam or candidate beam resource that meets the quality requirement and that is determined in the candidate beam resource group corresponding to the one octet. Optionally, the one octet may alternatively include an E field (that is, an example of the fourth field), a T field (that is, an example of the fifth field), and an $AC_1$ field (that is, an example of the seventh field). In this case, the $AC_1$ field indicates that there is no candidate beam or candidate beam resource meeting the quality requirement in a candidate beam resource group corresponding to the one octet. In this case, it may also be understood that a value of the candidate RS $ID_1$ field corresponding to the one octet is null.

As shown in (b) in FIG. 8, if the quantity of TRPs in which the beam failure occurs in the multi-TRP cell corresponding to the any bit $C_i$ is M (M is an integer greater than 1), the any bit $C_i$ corresponds to M octets, and a $1^{st}$ octet in the M octets may include an E field (that is, an example of the fourth field), a T field (that is, an example of the fifth field), an $AC_1$ field (that is, an example of the seventh field), and a candidate RS $ID_1$ field (that is, an example of the eighth field). The E field indicates that the beam failure occurs in all multi-TRP cells corresponding to the any bit $C_i$, and a value of the T field is null. The $AC_1$ field indicates that there is a candidate beam or candidate beam resource meeting the quality requirement in a candidate beam resource group corresponding to the one octet. The candidate RS $ID_1$ field indicates information about the candidate beam or candidate beam resource that meets the quality requirement and that is determined in the candidate beam resource group corresponding to the one octet. Each of the M octets except the $1^{st}$ octet may include an R field, an AC field, and a candidate RS ID field. A $2^{nd}$ octet in the M octets is used as an example. The $2^{nd}$ octet may include: an R field, an $AC_2$ field, and a candidate RS $ID_2$ field. The R field is a reserved field and has no specific meaning. The $AC_2$ field indicates that there is a candidate beam or candidate beam resource meeting the quality requirement in a candidate beam resource group corresponding to the $2^{nd}$ octets. The candidate RS $ID_2$ field indicates information about the candidate beam or candidate beam resource that meets the quality requirement and that is determined in the candidate beam resource group corresponding to the $2^{nd}$ octet. Optionally, the $2^{nd}$ octet may alternatively include an R field and an $AC_2$ field. The R field is a reserved field and has no specific meaning. The $AC_2$ field indicates that there is no candidate beam or candidate beam resource meeting the quality requirement in a candidate beam resource group corresponding to the $2^{nd}$ octet. In this case, it may also be understood that the $2^{nd}$ octet also includes a candidate RS $ID_2$ field, but a value of the candidate RS $ID_2$ field is null.

Optionally, the E field shown in (b) in FIG. 8 may alternatively be a field in another octet in the M octets corresponding to the any bit $C_i$. In FIG. 8, descriptions are provided by using an example in which an E field, a T field, an AC field, and an R field each use one bit, and a candidate RS ID field uses five bits. In some other implementations, a quantity of bits used in the foregoing fields may alternatively be another value. This is not specifically limited herein.

Optionally, in different octets included in the MAC CE in FIG. 8, quantities of bits used in same fields (for example, AC fields) may be different.

The following uses the format of the second type of first MAC CE shown in FIG. 8 as an example for description.

For example, the network device configures three cells for one terminal device: a cell 0, a cell 1, and a cell 2. The cell 0 is a cell configured with three beam failure detection resource groups and three candidate beam resource groups, the cell 1 is a cell configured with two beam failure detection resource groups and two candidate beam resource groups, and the cell 2 is a cell configured with two beam failure detection resource groups and two candidate beam resource groups. The cell 0 corresponds to a first bit $C_0$ in a bitmap included in the first MAC CE, the cell 1 corresponds to a second bit $C_1$ in the bitmap included in the first MAC CE, and the cell 2 corresponds to a third bit $C_2$ in the bitmap included in the first MAC CE.

The terminal device detects that the beam failure occurs in all the three beam failure detection resource groups (a beam failure detection resource group #1, a beam failure detection resource group #2, and a beam failure detection resource group #3) configured for the cell 0, and there is only a candidate beam resource corresponding to the beam failure detection resource group #2 and a candidate beam resource corresponding to the beam failure detection resource group #3 in the three candidate beam resource groups. The beam failure detection resource group #1 corresponds to a $1^{st}$ octet in three octets corresponding to the first bit $C_0$, the beam failure detection resource group #2 corresponds to a $2^{nd}$ octet in the three octets corresponding to the first bit $C_0$, and the beam failure detection resource group #3 corresponds to a $3^{rd}$ octet in the three octets corresponding to the first bit $C_0$. The terminal device detects that a beam failure occurs in one beam failure detection resource group (namely, a beam failure detection resource group #2) in the two beam failure detection resource groups (a beam failure detection resource group #1 and the beam failure detection resource group #2) configured for the cell 1, and there is only a candidate beam resource corresponding to the beam failure detection resource group #1 and the candidate beam resource corresponding to the beam failure detection resource group #3 in the two candidate beam resource groups. The beam failure detection resource group #1 corresponds to one octet corresponding to the second bit $C_1$. The terminal device detects that no beam failure occurs in the two beam failure detection resource groups configured for the cell 2. Therefore, the first MAC CE does not include an octet corresponding to the third bit $C_2$.

In an example, it is defined as follows: a value of one bit in a bitmap corresponding to a multi-TRP cell being 1 indicates that the beam failure occurs in the multi-TRP cell, a value of one bit in a bitmap corresponding to the multi-TRP cell being 0 indicates that no beam failure occurs in the multi-TRP cell. It is defined as follows: a value of a fifth field in a $1^{st}$ octet in a plurality of octets corresponding to the one bit being 1 indicates that a beam failure occurs in a plurality of beam failure detection resource groups in a plurality of beam failure detection resource groups corresponding to the $1^{st}$ octet, and a value of a fifth field in a $1^{st}$ octet in a plurality of octets corresponding to the one bit being 0 indicates that the beam failure occurs in only one of a plurality of beam failure detection resource groups corresponding to the $1^{st}$ octet. In this case, for specific content of the three octets corresponding to the first bit $C_0$ and the two octets corresponding to the second bit $C_1$, refer to FIG. 9. An E field is an example of the fourth field, an $AC_1$ field, an $AC_2$ field, or an $AC_3$ field is an example of the seventh field, and a candidate RS $ID_1$ field or a candidate RS $ID_2$ field is an example of the eighth field.

Figure 9:
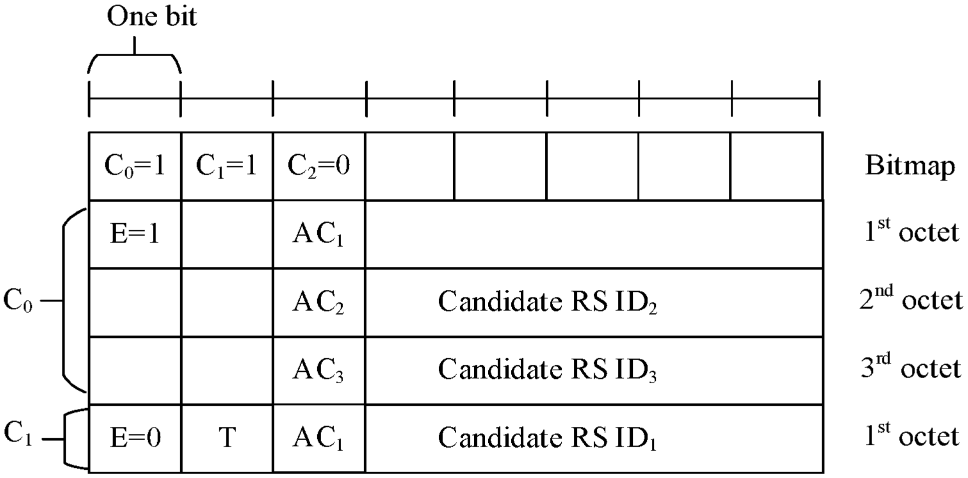
FIG. 9 is a schematic diagram of a format of a second type of first MAC CE according to an embodiment of this application.

It should be understood that descriptions are provided in FIG. 8 and FIG. 9 by using an example in which “one bit in a bitmap included in the second type of first MAC CE corresponds to one field, and the one field corresponds to one cell”. Optionally, in some implementations, the second type of first MAC CE in FIG. 8 and FIG. 9 may include a plurality of fields, each of the plurality of fields corresponds to one cell, and each field uses a plurality of bits (two bits or more than two bits). In this case, the plurality of fields may be considered as one entire bitmap, one “bit” in the one bitmap is equal to one “field”, and the field includes a plurality of bits. FIG. 8 and FIG. 9 are merely examples, and do not constitute any limitation on the format of the second type of first MAC CE provided in this embodiment of this application. All formats of the first MAC CE obtained based on a definition of the format of the second type of first MAC CE provided in this embodiment of this application belong to the formats of the MAC CE claimed in this embodiment of this application.

Format of the Third Type of First MAC CE

The third type of first MAC CE provided in this embodiment of this application includes one bitmap. It may be understood that a definition of one bitmap included in the third type of first MAC CE is the same as a definition of one bitmap included in the first type of first MAC CE. For content that is not described in detail herein, refer to the definition of the one bitmap included in the first type of first MAC CE.

Optionally, any bit in the bitmap corresponds to one or more octets.

The first MAC CE further includes one fourth field, and the fourth field indicates a quantity of octets corresponding to any bit.

Optionally, the fourth field is a field in a $1^{st}$ octet in one or more octets, and the fourth field indicates whether a next octet of the $1^{st}$ octet carries beam failure recovery information of a cell. The fourth field may be located in a first bit or a second bit in the $1^{st}$ octet. For a specific feature of the fourth field, refer to the format of the second type of first MAC CE.

Optionally, each of the one or more octets further includes one sixth field, and the sixth field indicates a beam failure detection resource group corresponding to each octet or a candidate beam resource group corresponding to each octet. A length of the sixth field may be one bit, or a length of the sixth field may be more bits. This is not specifically limited herein.

Optionally, each of the one or more octets further includes one seventh field, and the seventh field indicates whether there is a candidate beam or candidate beam resource meeting the quality requirement in a candidate beam resource group corresponding to each octet. For a specific feature of the seventh field, refer to the format of the second type of first MAC CE.

Optionally, each of the one or more octets further includes one eighth field, and the eighth field indicates information about the candidate beam or candidate beam resource that meets the quality requirement and that is determined in the candidate beam resource group corresponding to each octet. For a specific feature of the eighth field, refer to the format of the second type of first MAC CE.

Each of the one or more octets corresponding to the one bit may include only any one of the foregoing fields. To be specific, each of the one or more octets corresponding to the one bit may include only the one fourth field. Each of the one or more octets corresponding to the one bit may include only the one sixth field. Each of the one or more octets corresponding to the one bit may include only the one seventh field. Each of the one or more octets corresponding to the one bit may include only the one eighth field.

Optionally, each of the one or more octets corresponding to the one bit may include a plurality of fields in the foregoing fields. For example, each of the one or more octets corresponding to the one bit may include one fourth field and one sixth field. For example, each of the one or more octets corresponding to the one bit may include one fourth field, one sixth field, one seventh field, and one eighth field (that is, the eighth field in the first definition manner). When the seventh field indicates that there is no candidate beam resource meeting the quality requirement in a TRP corresponding to the octet of the seventh field, a value of the eighth field may be null.

It should be understood that specific definitions of the fourth field, the seventh field, and the eighth field in each octet in the format of the third type of first MAC CE are the same as those of the fourth field, the seventh field, and the eighth field in each octet in the format of the second type of first MAC CE. For specific content that is not described herein, refer to the foregoing descriptions about the format of the second type of first MAC CE.

The foregoing describes a definition of the format of the third type of first MAC CE provided in this embodiment of this application in detail with reference to text. The following describes the format of the third type of first MAC CE with reference to FIG. 10 and FIG. 11.

For example, a schematic diagram of the format of the third type of first MAC CE provided in this embodiment of this application is described by using an example in which the network device configures eight cells for one terminal device, and configures M (M is an integer greater than 1) beam failure detection resource groups and M candidate beam resource groups for each cell. The eight cells may be understood as multi-TRP cells.

Figure 10:
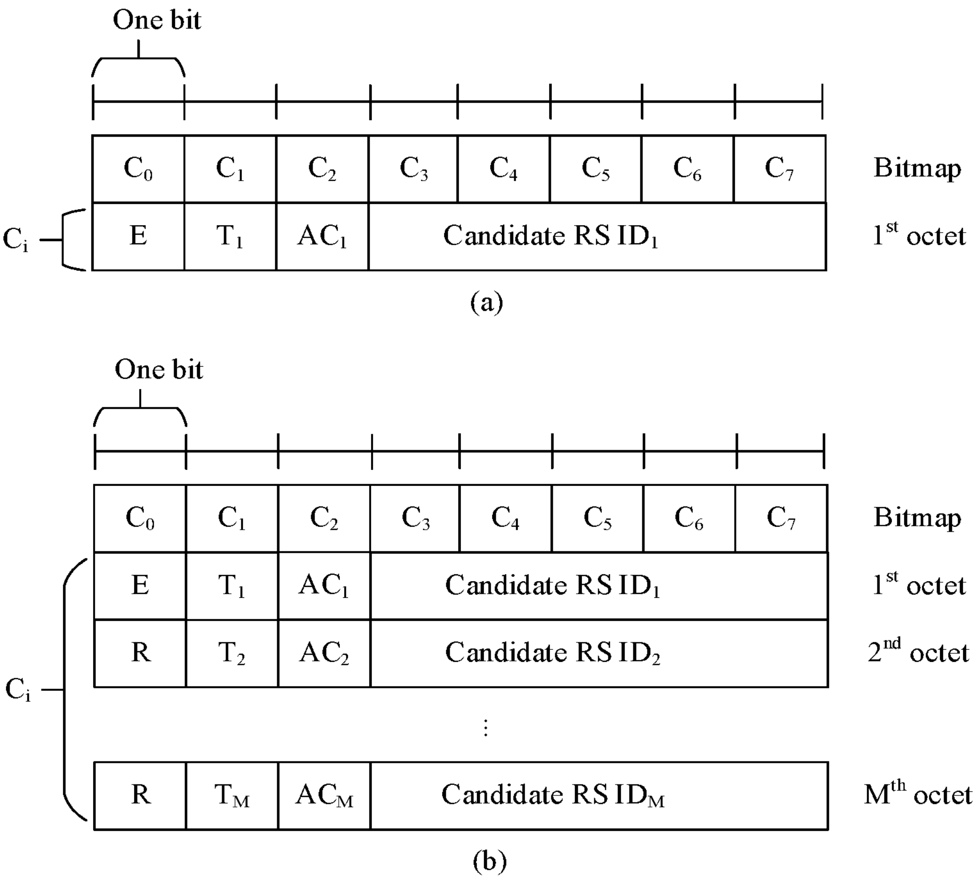
FIG. 10 is a schematic diagram of a format of a third type of first MAC CE according to an embodiment of this application.

As shown in FIG. 10, the third type of first MAC CE provided in this embodiment of this application includes one bitmap (the one bitmap includes eight bits (that is, eight fields, where each field uses one bit), and the eight bits are respectively denoted as $C_0$, $C_1$, $C_2$, $C_3$, $C_4$, $C_5$, $C_6$, and $C_7$, and are in a one-to-one correspondence with the eight cells) and one or more octets corresponding to any bit $C_i$ (i is an integer greater than or equal to 0 and less than or equal to 7) in the one bitmap. A cell corresponding to the any bit $C_i$ is a multi-TRP cell in which the beam failure occurs. A quantity of octets corresponding to the any bit $C_i$ is the same as a quantity of TRPs in which a beam failure occurs in a multi-TRP cell corresponding to the any bit $C_i$.

As shown in (a) in FIG. 10, if the quantity of TRPs in which the beam failure occurs in the multi-TRP cell corresponding to any bit $C_i$ is 1, the any bit $C_i$ corresponds to one octet, and the one octet may include an E field (that is, an example of the fourth field), a $T_1$ field (that is, an example of the sixth field), an $AC_1$ field (that is, an example of the seventh field), and a candidate RS $ID_1$ field (that is, an example of the eighth field). The E field indicates that the beam failure occurs in only one TRP in the multi-TRP cell corresponding to the any bit $C_i$. The $T_1$ field indicates a beam failure detection resource group corresponding to the one octet, or the $T_1$ field indicates a candidate beam resource group corresponding to the one octet. The $AC_1$ field indicates that there is a candidate beam or candidate beam resource meeting the quality requirement in the candidate beam resource group corresponding to the one octet. The candidate RS $ID_1$ field indicates information about the candidate beam or candidate beam resource that meets the quality requirement and that is determined in the candidate beam resource group corresponding to the one octet. Optionally, the one octet may alternatively include an E field (that is, an example of the fourth field), a T field (that is, an example of the fifth field), and an $AC_1$ field (that is, an example of the seventh field). In this case, the $AC_1$ field indicates that there is no candidate beam or candidate beam resource meeting the quality requirement in a candidate beam resource group corresponding to the one octet. In this case, it may also be understood that a value of the candidate RS $ID_1$ field corresponding to the one octet is null.

As shown in (b) in FIG. 10, if the quantity of TRPs in which the beam failure occurs in the multi-TRP cell corresponding to the any bit $C_i$ is M (M is an integer greater than 1), the any bit $C_i$ corresponds to M octets, and a $1^{st}$ octet in the M octets may include an E field (that is, an example of the fourth field), a $T_1$ field (that is, an example of the sixth field), an $AC_1$ field (that is, an example of the seventh field), and a candidate RS $ID_1$ field (that is, an example of the eighth field). The E field indicates that the beam failure occurs in only one TRP in the multi-TRP cell corresponding to the any bit $C_i$. The $T_1$ field indicates a beam failure detection resource group corresponding to the $1^{st}$ octet, or the $T_1$ field indicates a candidate beam resource group corresponding to the $1^{st}$ octet. The $AC_1$ field indicates that there is a candidate beam or candidate beam resource meeting the quality requirement in the candidate beam resource group corresponding to the $1^{st}$ octet. The candidate RS $ID_1$ field indicates information about the candidate beam or candidate beam resource that meets the quality requirement and that is determined in the candidate beam resource group corresponding to the $1^{st}$ octet. Each of the M octets except the $1^{st}$ octet may include an R field, a T field, an AC field, and a candidate RS ID field. A $2^{nd}$ octet in the M octets is used as an example. The $2^{nd}$ octet may include: an R field, a $T_2$ field, an $AC_2$ field, and a candidate RS $ID_2$ field. The R field is a reserved field and has no specific meaning. The $T_2$ field indicates a beam failure detection resource group corresponding to the $2^{nd}$ octet, or the $T_2$ field indicates a candidate beam resource group corresponding to the $2^{nd}$ octet. The $AC_2$ field indicates that there is a candidate beam or candidate beam resource meeting the quality requirement in the candidate beam resource group corresponding to the $2^{nd}$ octet. The candidate RS $ID_2$ field indicates information about the candidate beam or candidate beam resource that meets the quality requirement and that is determined in the candidate beam resource group corresponding to the $2^{nd}$ octet. Optionally, the $2^{nd}$ octet may alternatively include an R field, a $T_2$ field, and an $AC_2$ field. The R field is a reserved field and has no specific meaning. The $T_2$ field indicates a beam failure detection resource group corresponding to the $2^{nd}$ octet, or the $T_2$ field indicates a candidate beam resource group corresponding to the $2^{nd}$ octet. The $AC_2$ field indicates that there is no candidate beam or candidate beam resource meeting the quality requirement in the candidate beam resource group corresponding to the $2^{nd}$ octet. In this case, it may also be understood that the $2^{nd}$ octet also includes a candidate RS $ID_2$ field, but a value of the candidate RS $ID_2$ field is null.

Optionally, the E field shown in (b) in FIG. 10 may alternatively be a field in another octet in the M octets corresponding to the any bit $C_i$. In FIG. 10, descriptions are provided by using an example in which an E field, a T field, an AC field, and an R field each use one bit, and a candidate RS ID field uses five bits. In some other implementations, a quantity of bits used in the foregoing fields may alternatively be another value. This is not specifically limited herein. Optionally, in different octets included in the MAC CE in FIG. 10, quantities of bits used in same fields (for example, AC fields) may be different. The following uses the format of the third type of first MAC CE shown in FIG. 10 as an example for description.

For example, the network device configures three cells for one terminal device: a cell 0, a cell 1, and a cell 2. The cell 0 is a cell configured with three beam failure detection resource groups and three candidate beam resource groups, the cell 1 is a cell configured with two beam failure detection resource groups and two candidate beam resource groups, and the cell 2 is a cell configured with two beam failure detection resource groups and two candidate beam resource groups. The cell 0 corresponds to a first bit $C_0$ in a bitmap included in the first MAC CE, the cell 1 corresponds to a second bit $C_1$ in the bitmap included in the first MAC CE, and the cell 2 corresponds to a third bit $C_2$ in the bitmap included in the first MAC CE.

The terminal device detects that the beam failure occurs in all the three beam failure detection resource groups (a beam failure detection resource group #1, a beam failure detection resource group #2, and a beam failure detection resource group #3) configured for the cell 0, and there is only a candidate beam resource corresponding to the beam failure detection resource group #2 and a candidate beam resource corresponding to the beam failure detection resource group #3 in the three candidate beam resource groups. The beam failure detection resource group #1 corresponds to a $1^{st}$ octet in three octets corresponding to the first bit $C_0$, the beam failure detection resource group #2 corresponds to a $2^{nd}$ octet in the three octets corresponding to the first bit $C_0$, and the beam failure detection resource group #3 corresponds to a $3^{rd}$ octet in the three octets corresponding to the first bit $C_0$. The terminal device detects that a beam failure occurs in one beam failure detection resource group (namely, a beam failure detection resource group #2) in the two beam failure detection resource groups (a beam failure detection resource group #1 and the beam failure detection resource group #2) configured for the cell 1, and there is only a candidate beam resource corresponding to the beam failure detection resource group #1 and the candidate beam resource corresponding to the beam failure detection resource group #3 in the three candidate beam resource groups. The beam failure detection resource group #1 corresponds to one octet corresponding to the second bit $C_1$. The terminal device detects that no beam failure occurs in the two beam failure detection resource groups configured for the cell 2. Therefore, the first MAC CE does not include an octet corresponding to the third bit $C_2$.

In an example, it is defined as follows: a value of one bit in a bitmap corresponding to a multi-TRP cell being 1 indicates that the beam failure occurs in the multi-TRP cell, and a value of one bit in a bitmap corresponding to the multi-TRP cell being 0 indicates that no beam failure occurs in the multi-TRP cell. It is defined as follows: a value of a fifth field in a $1^{st}$ octet in a plurality of octets corresponding to the one bit being 1 indicates that a beam failure occurs in a plurality of beam failure detection resource groups in a plurality of beam failure detection resource groups corresponding to the $1^{st}$ octet, and a value of a fifth field in a $1^{st}$ octet in a plurality of octets corresponding to the one bit being 0 indicates that the beam failure occurs in only one of a plurality of beam failure detection resource groups corresponding to the $1^{st}$ octet. In this case, for specific content of the three octets corresponding to the first bit $C_0$ and the two octets corresponding to the second bit $C_1$, refer to FIG. 11. An E field is an example of the fourth field, a $T_1$ field, a $T_2$ field, or a $T_3$ field is an example of the seventh field, an $AC_1$ field, an $AC_2$ field, or an $AC_3$ field is an example of the seventh field, and a candidate RS $ID_1$ field or a candidate RS $ID_2$ field is an example of the eighth field. The candidate RS $ID_2$ field of the $1^{st}$ octet in the three octets corresponding to the first bit $C_0$ is reserved. In other words, an $AC_1$ field of the $1^{st}$ octet in the three octets corresponding to the first bit $C_0$ indicates that there is no candidate beam resource meeting the quality requirement in a candidate beam resource group corresponding to the octet of the field.

Figure 11:
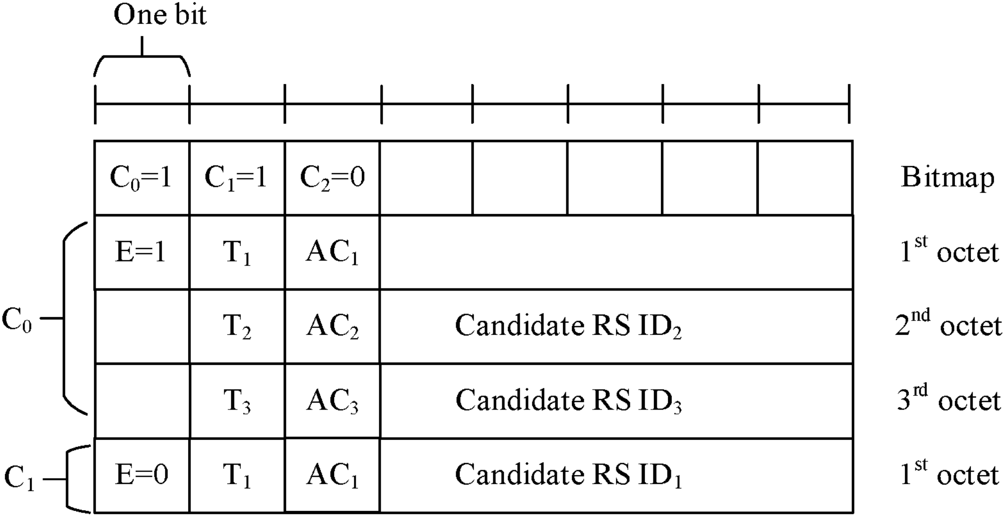
FIG. 11 is a schematic diagram of a format of a third type of first MAC CE according to an embodiment of this application.

It should be understood that descriptions are provided in FIG. 10 and FIG. 11 by using an example in which "one bit in a bitmap included in the third type of first MAC CE corresponds to one field, and the one field corresponds to one cell". Optionally, in some implementations, the third type of first MAC CE in FIG. 10 and FIG. 11 includes a plurality of fields, each of the plurality of fields corresponds to one cell, and each field uses a plurality of bits (two bits or more than two bits). In this case, the plurality of fields may be considered as one entire bitmap, one "bit" in the one bitmap is equal to one "field", and the field includes a plurality of bits. FIG. 10 and FIG. 11 are merely examples, and do not constitute any limitation on the format of the third type of first MAC CE provided in this embodiment of this application. All formats of the first MAC CE obtained based on a definition of the format of the third type of first MAC CE provided in this embodiment of this application belong to the formats of the MAC CE claimed in this embodiment of this application.

The foregoing describes in detail the format of the first type of first MAC CE, the format of the second type of first MAC CE, and the format of the third type of first MAC CE provided in this embodiment of this application. In addition, the foregoing description is provided by using an example in which "one bit in a bitmap included in a first MAC CE corresponds to one field, and the one field corresponds to one cell (for example, a multi-TRP cell or a single-TRP cell)".

Based on the format of the second type of first MAC CE and the format of the third type of first MAC CE, descriptions are provided below by using an example in which "a plurality of bits in a bitmap included in a first MAC CE correspond to one field, and a plurality of bits correspond to one cell (for example, a multi-TRP cell or a single-TRP cell)" for description. For ease of description, a first MAC CE in which "a plurality of bits in a bitmap included in a first MAC CE correspond to one field, and a plurality of fields correspond to one cell" is briefly denoted as a fourth type of first MAC CE.

In an implementation, the fourth type of first MAC CE includes one or more fields, and each field corresponds to one configured cell. The one or more fields may be considered as one entire bitmap (for example, the bitmap in the MAC CE format shown in FIG. 6), and a plurality of bits in the bitmap are used as one field. When a cell corresponding to the one field is a single-TRP cell, a value of the field is null, and the terminal device ignores the value of the field, and considers the field as a reserved field without information. Alternatively, when a cell corresponding to the one field is a single-TRP cell, a value of the field is a first value by default, and the network device cannot set the value of the field to another value, or the terminal device considers the value of the field as the first value regardless of the value of the field set by the network device. The first value indicates that no beam failure occurs in the cell corresponding to the bit. For example, the first value may be 00, 01, 10, or 11. When a quantity of beam failure detection resource groups or candidate beam resource groups configured for the cell corresponding to the one field is 0, the foregoing method may also be used. In other words, a value of the field corresponding to the cell is null, or is the first value by default. Optionally, when a cell corresponding to the one field is a multi-TRP cell, a value of the field indicates a quantity of TRPs in which the beam failure occurs in the cell, a value of the field indicates a quantity of beam failure detection resource groups in which the beam failure is detected in a plurality of beam failure detection resource groups of the cell, or a value of the field indicates a quantity of octets corresponding to the cell in the MAC CE. When the one field indicates that the quantity of TRPs in which the beam failure occurs in the cell is 2, the MAC CE includes two octets used to carry beam failure recovery information of two TRPs or two beam failure detection resource groups of the cell. A 1$^{st}$ octet corresponds to a 1$^{st}$ beam failure detection resource group, and a 2$^{nd}$ octet corresponds to a 2$^{nd}$ beam failure detection resource group. When the field indicates that the quantity of TRPs in which the beam failure occurs in the cell is 1, the MAC CE includes one octet used to carry beam failure recovery information of the TRP or beam failure detection resource group in which the beam failure occurs. When the field indicates that the quantity of TRPs in which the beam failure occurs in the cell is 0, the MAC CE does not include an octet used to carry beam failure recovery information corresponding to the cell. For example, a value of the field being 00 indicates that the quantity of TRPs in which the beam failure occurs in the cell is 0, the quantity of beam failure detection resource groups in which the beam failure is detected is 0, or the quantity of octets corresponding to the cell in the MAC CE is 0. A value of the field being 01 indicates that the quantity of TRPs in which the beam failure occurs in the cell is 1, the quantity of beam failure detection resource groups in which the beam failure is detected is 1, or the quantity of octets corresponding to the cell in the MAC CE is 1. A value of the field being 10 indicates that the quantity of TRPs in which the beam failure occurs in the cell is 2, the quantity of beam failure detection resource groups in which the beam failure is detected is 2, or the quantity of octets corresponding to the cell in the MAC CE is 2, and so on.

Optionally, the one field may also indicate a beam failure status in the corresponding cell. When a quantity of beam failure detection resource groups configured for the cell corresponding to the one field is 2, the beam failure status includes: no beam failure occurs in the two beam failure detection resource groups, a beam failure occurs in a 1$^{st}$ beam failure detection resource group, a beam failure occurs in a 2$^{nd}$ beam failure detection resource group, or the beam failure occurs in the two beam failure detection resource groups. Optionally, the one field may include two bits. A value of the one field may be one of 00, 01, 10, and 11, and each value indicates one of the foregoing four cases. For example, 00 indicates that no beam failure occurs in the two beam failure detection resource groups, 01 indicates that the beam failure occurs in the 1$^{st}$ beam failure detection resource group, 10 indicates that the beam failure occurs in the 2$^{nd}$ beam failure detection resource group, and 11 indicates that the beam failure occurs in the two beam failure detection resource groups. For another example, 00 indicates that no beam failure occurs in the two beam failure detection resource groups, 10 indicates that the beam failure occurs in the 1$^{st}$ beam failure detection resource group, 01 indicates that the beam failure occurs in the 2$^{nd}$ beam failure detection resource group, and 11 indicates that the beam failure occurs in the two beam failure detection resource groups. Optionally, the two bits of the one field may also be considered as two independent 1-bit fields. The two 1-bits may be two consecutive bits, or may be two inconsecutive bits. Each 1-bit field indicates whether a beam failure occurs in one corresponding beam failure detection resource group. For example, a 1$^{st}$ bit corresponds to the 1$^{st}$ beam failure detection resource group, and a 2$^{nd}$ bit corresponds to the 2$^{nd}$ beam failure detection resource group. Alternatively, a 1$^{st}$ bit corresponds to the 2$^{nd}$ beam failure detection resource group, and a 2$^{nd}$ bit corresponds to the 1$^{st}$ beam failure detection resource group. A bit value 0 indicates that no beam failure occurs in a corresponding beam failure detection resource group, or a bit value 1 indicates that a beam failure occurs in a corresponding beam failure detection resource group. Alternatively, a bit value 0 indicates that a beam failure occurs in a corresponding beam failure detection resource group, or a bit value 1 indicates that no beam failure occurs in a corresponding beam failure detection resource group. When the beam failure status indicated by the one field is that the beam failure occurs in the two beam failure detection resource groups, the MAC CE includes two octets used to carry beam failure recovery information of two TRPs or two beam failure detection resource groups of the cell. The 1$^{st}$ octet corresponds to the 1$^{st}$ beam failure detection resource group, and the 2$^{nd}$ octet corresponds to the 2$^{nd}$ beam failure detection resource group. When the field indicates that the quantity of TRPs in which the beam failure occurs in the cell is 1, for example, when the beam failure occurs in the 1$^{st}$ beam failure detection resource group or the beam failure occurs in the 2$^{nd}$ beam failure detection resource group, the MAC CE includes one octet used to carry the beam failure recovery information of the TRP or beam failure detection resource group in which the beam failure occurs. When no beam failure occurs in the two beam failure detection resource groups, the MAC CE includes does not include an octet used to carry the beam failure recovery information corresponding to the cell. The beam failure recovery information includes indication information indicating whether there is a candidate beam resource meeting the quality requirement, information about the candidate beam resource meeting the quality requirement, and the like. In another implementation, the format of the fourth type of first MAC CE includes one or more fields, and each field corresponds to one multi-TRP cell. The one or more fields may be considered as one entire bitmap, and a plurality of bits in the bitmap are used as one field. A correspondence between each field and each multi-TRP cell may be that an i$^{th}$ field corresponds to an i$^{th}$ multi-TRP cell, a multi-TRP cell with an i$^{th}$ smallest index, or a multi-TRP cell with an i$^{th}$ largest index. A value of each field indicates a quantity of TRPs in which beam failure occurs in a corresponding cell, indicates a quantity of beam failure detection resource groups in which the beam failure is detected in a plurality of beam failure detection resource groups in a corresponding cell, or indicates a quantity of octets corresponding to a corresponding cell in the MAC CE. For example, a value of the field being 00 indicates that a quantity of TRPs in which a beam failure occurs in a corresponding cell is 0, a quantity of beam failure detection resource groups in which the beam failure is detected is 0, or a quantity of octets corresponding to a corresponding cell in the MAC CE is 0. A value of the field being 01 indicates that a quantity of TRPs in which a beam failure occurs in a corresponding cell is 1, a quantity of beam failure detection resource groups in which the beam failure is detected is 1, or a quantity of octets corresponding to a corresponding cell in the MAC CE is 1. A value of the field being 10 indicates that a quantity of TRPs in which a beam failure occurs in a corresponding cell is 2, a quantity of beam failure detection resource groups in which the beam failure is detected is 2, or a quantity of octets corresponding to a corresponding cell in the MAC CE is 2, and so on.

Optionally, the first MAC CE may further include a fifth field.

Optionally, the first MAC CE may further include a sixth field.

Optionally, the first MAC CE further includes a seventh field.

Optionally, the first MAC CE further includes an eighth field.

The one field occupies a plurality of (two or more than two) bits in the bitmap.

It may be understood that the fourth type of first MAC CE may include any one or more of the foregoing fields. This is not specifically limited herein. For example, the fourth type of first MAC CE may include only the fifth field. For example, the fourth type of first MAC CE may include only the seventh field and the eighth field.

For specific functions of the fifth field, the sixth field, the seventh field, and the eighth field included in the fourth type of first MAC CE, refer to specific functions of the fifth field, the seventh field, and the eighth field included in the second type of first MAC CE, and refer to specific functions of the sixth field, the seventh field, and the eighth field included in the third type of first MAC CE. Details are not described herein again.

Figure 12:
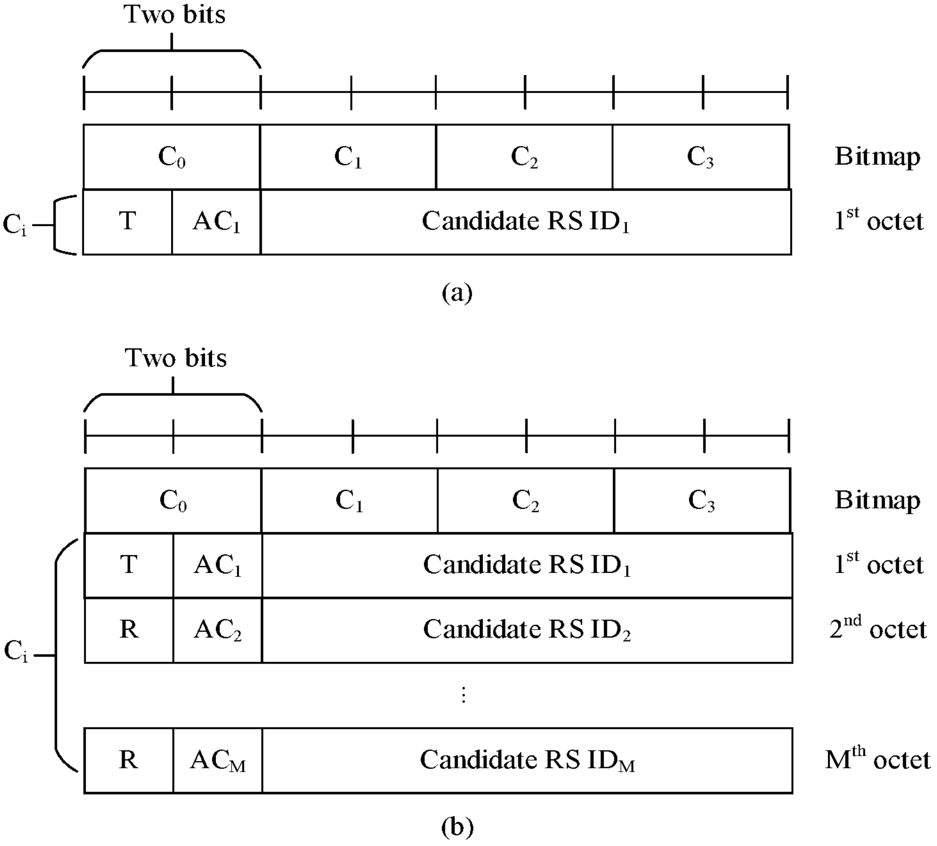
FIG. 12 is a schematic diagram of a format of a fourth type of first MAC CE according to an embodiment of this application.

The following describes a specific format of the fourth type of first MAC CE provided in this embodiment of this application with reference to FIG. 12.

For example, the format of the fourth type of first MAC CE provided in this embodiment of this application is described by using an example in which two bits in the bitmap included in the first MAC CE correspond to one field and the network device configures four cells for one terminal device, and configures M (M is an integer greater than 1) beam failure detection resource groups and M candidate beam resource groups for each cell. The four cells may be understood as multi-TRP cells.

As shown in FIG. 12, the fourth type of first MAC CE provided in this embodiment of this application may include four fields (the four fields are respectively denoted as $C_0$, $C_1$, $C_2$, and $C_3$, each field occupies two bits, and the four fields are in a one-to-one correspondence with four cells) and one or more octets corresponding to each field (i is an integer greater than or equal to 0 and less than or equal to 3). A cell corresponding to each field is a multi-TRP cell in which the beam failure occurs. A quantity of octets corresponding to each field is the same as a quantity of TRPs in which the beam failure occurs in the multi-TRP cell corresponding to each field. The four fields included in the fourth type of first MAC CE may be considered as one entire bitmap (for example, the bitmap included in the MAC CE shown in FIG. 6). As shown in (a) in FIG. 12, if the quantity of TRPs in which the beam failure occurs in the multi-TRP cell corresponding to each field $C_i$ is 1, the field $C_i$ corresponds to one octet, and the one octet may include a T field (that is, an example of the fifth field), an $AC_1$ field (that is, an example of the seventh field), and a candidate RS $ID_1$ field (that is, an example of the eighth field). The T field indicates information about one TRP (for example, an index of the TRP) in which the beam failure occurs. The $AC_1$ field indicates that there is a candidate beam or candidate beam resource meeting the quality requirement in a candidate beam resource group corresponding to the one octet. The candidate RS $ID_1$ field indicates information about the candidate beam or candidate beam resource that meets the quality requirement and that is determined in the candidate beam resource group corresponding to the one octet. Optionally, the one octet may alternatively include a T field (that is, an example of the fifth field), and an $AC_1$ field (that is, an example of the seventh field). In this case, the $AC_1$ field indicates that there is no candidate beam or candidate beam resource meeting the quality requirement in a candidate beam resource group corresponding to the one octet. In this case, it may also be understood that a value of the candidate RS $ID_1$ field corresponding to the one octet is null.

As shown in (b) in FIG. 12, if the quantity of TRPs in which the beam failure occurs in the multi-TRP cell corresponding to the field $C_i$ is M (M is an integer greater than 1), the field $C_i$ corresponds to M octets, and a $1^{st}$ octet in the M octets may include: a T field (that is, an example of the fifth field), an $AC_1$ field (that is, an example of the seventh field), and a candidate RS $ID_1$ field (that is, an example of the eighth field). A value of the T field is null. In this case, information about a beam failure detection resource group in which the beam failure is detected does not need to be determined by using the T field, but a beam failure detection resource group or candidate beam resource group corresponding to each octet is determined based on a correspondence between the M octets and M beam failure detection resource groups or between the M octets and M candidate beam resource groups. For a specific correspondence, refer to the foregoing description. The $AC_1$ field indicates that there is a candidate beam or candidate beam resource meeting the quality requirement in a candidate beam resource group corresponding to the one octet. The candidate RS $ID_1$ field indicates information about the candidate beam or candidate beam resource that meets the quality requirement and that is determined in the candidate beam resource group corresponding to the one octet. Each of the M octets except the 1st octet may include an R field, an AC field, and a candidate RS ID field. A $2^{nd}$ octet in the M octets is used as an example. The $2^{nd}$ octet may include: an R field, an $AC_2$ field, and a candidate RS $ID_2$ field. The R field is a reserved field and has no specific meaning. The $AC_2$ field indicates that there is a candidate beam or candidate beam resource meeting the quality requirement in a candidate beam resource group corresponding to the $2^{nd}$ octet. The candidate RS $ID_2$ field indicates information about the candidate beam or candidate beam resource that meets the quality requirement and that is determined in the candidate beam resource group corresponding to the $2^{nd}$ octet. Optionally, the $2^{nd}$ octet may alternatively include an R field and an $AC_2$ field. The R field is a reserved field and has no specific meaning. The $AC_2$ field indicates that there is no candidate beam or candidate beam resource meeting the quality requirement in a candidate beam resource group corresponding to the $2^{nd}$ octet. In this case, it may also be understood that the $2^{nd}$ octet also includes a candidate RS $ID_2$ field, but a value of the candidate RS $ID_2$ field is null.

Optionally, the T field may be further located in an octet other than the $1^{st}$ octet in the M octets. For example, the T field in the $1^{st}$ octet in the M octets may be exchanged with the R field in the $2^{nd}$ octet in the M octets. In this case, the T field is located in the $2^{nd}$ octet in the M octets. It may be understood that, in FIG. 12, descriptions are provided by using an example in which a T field, an AC field, and an R field each use one bit, and a candidate RS ID field uses six bits. In some other implementations, a quantity of bits used in the foregoing fields may alternatively be another value. This is not specifically limited herein. Optionally, in different octets included in the MAC CE in FIG. 12, quantities of bits used in same fields (for example, AC fields) may be different.

Figure 13:
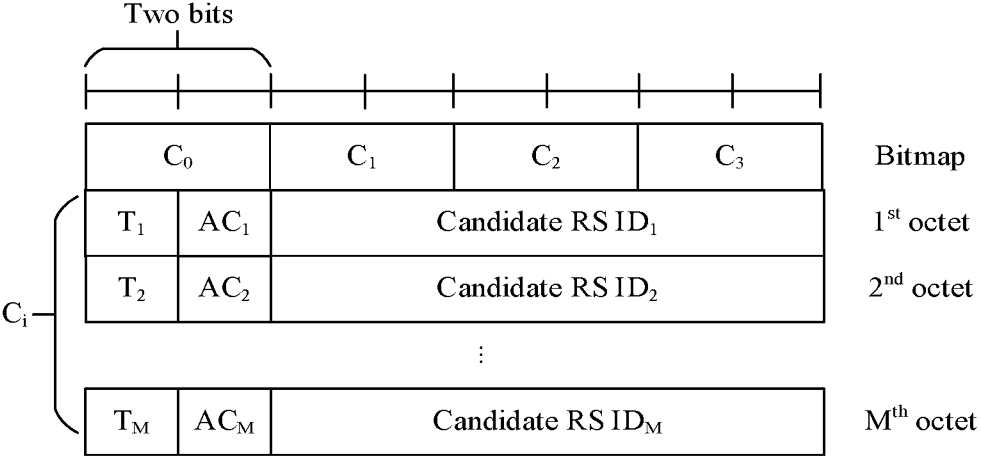
FIG. 13 is a schematic diagram of a format of a fourth type of first MAC CE according to an embodiment of this application.

The following describes another specific format of the fourth type of first MAC CE provided in this embodiment of this application with reference to FIG. 13.

For example, the format of the fourth type of first MAC CE provided in this embodiment of this application is described by using an example in which two bits in the bitmap included in the first MAC CE correspond to one field and the network device configures four cells for one terminal device, and configures M (M is an integer greater than 1) beam failure detection resource groups and M candidate beam resource groups for each cell. The four cells may be understood as multi-TRP cells.

As shown in FIG. 13, the fourth type of first MAC CE provided in this embodiment of this application may include four fields (the four fields are respectively denoted as $C_0$, $C_1$, $C_2$, and $C_3$, each field occupies two bits, and the four fields are in a one-to-one correspondence with four cells) and one or more octets corresponding to any field $C_i$ (i is an integer greater than or equal to 0 and less than or equal to 3). A cell corresponding to the any field $C_i$ is a multi-TRP cell in which the beam failure occurs. A quantity of octets corresponding to any field $C_i$ is the same as a quantity of TRPs in which the beam failure occurs in the multi-TRP cell corresponding to the any field $C_i$. The four fields included in the fourth type of first MAC CE may be considered as one entire bitmap (for example, the bitmap included in the MAC CE shown in FIG. 6).

As shown in FIG. 13, if the quantity of TRPs in which the beam failure occurs in the multi-TRP cell corresponding to the any field $C_i$ is M, the any field $C_i$ corresponds to M octets, and each of the M octets may include a T field (that is, an example of the sixth field), an AC field (that is, an example of the seventh field), and a candidate RS ID field (that is, an example of the eighth field). The T field indicates a beam failure detection resource group corresponding to the octet of the T field, or the T field indicates a candidate beam resource group corresponding to the octet of the T field. The AC field indicates that there is a candidate beam or candidate beam resource meeting the quality requirement in the candidate beam resource group corresponding to the octet of the AC field. The candidate RS ID field indicates information about the candidate beam or candidate beam resource that meets the quality requirement and that is determined in the candidate beam resource group corresponding to the octet of the RS ID field. A $1^{st}$ octet in the M octets is used as an example. The $1^{st}$ octet includes a $T_1$ field (that is, an example of the sixth field), an $AC_1$ field, and a candidate RS $ID_1$ field. A $2^{nd}$ octet in the M octets is used as an example. The $2^{nd}$ octet includes a $T_2$ field (that is, an example of the sixth field), an $AC_2$ field, and a candidate RS $ID_2$ field.

Optionally, each of the M octets may alternatively include a T field (that is, an example of the sixth field) and an AC field (that is, an example of the seventh field). In this case, the AC field indicates that there is no candidate beam or candidate beam resource meeting the quality requirement in a candidate beam resource group corresponding to the octet of the AC field. In this case, it may also be understood that a value of the candidate RS $ID_1$ field corresponding to the octet of the AC field is null.

It should be understood that FIG. 12 and FIG. 13 are merely examples, and do not constitute any limitation on the format of the fourth type of first MAC CE provided in this embodiment of this application. For example, based on the format of the first type of first MAC CE, a description may alternatively be provided by using an example in which "a plurality of bits in a bitmap included in the first type of first MAC CE correspond to one field, and a plurality of fields correspond to one cell (for example, a multi-TRP cell or a single-TRP cell)".

Format of the Fifth Type of First MAC CE

The fifth type of first MAC CE provided in this embodiment of this application includes one bitmap. It may be understood that a definition of one bitmap included in the fifth type of first MAC CE is the same as a definition of one bitmap included in the first type of first MAC CE. For content that is not described in detail herein, refer to the definition of the one bitmap included in the first type of first MAC CE. Alternatively, a definition of one bitmap included in the fifth type of first MAC CE is the same as a definition of one bitmap included in the fourth type of first MAC CE. For content that is not described in detail herein, refer to the definition of the one bitmap included in the fourth type of first MAC CE.

Optionally, any bit in the bitmap corresponds to one or more octets.

The first MAC CE further includes one tenth field. The tenth field indicates a beam failure type. When M is equal to 2, the beam failure type may include: a beam failure occurs in a $1^{st}$ beam failure detection resource group in M beam failure detection resource groups, a beam failure occurs in a $2^{nd}$ beam failure detection resource group in M beam failure detection resource groups, a beam failure occurs in two of M beam failure detection resource groups, or the like.

Optionally, the tenth field may be located in a $1^{st}$ octet in the one or more octets.

Optionally, the tenth field may include two bits. For example, the tenth field may be first two bits in the $1^{st}$ octet. It may be understood that the tenth field may alternatively include more bits (for example, three bits). This is not specifically limited herein.

In some implementations, when the tenth field includes two bits, each of the two bits corresponds to one of M (M is equal to 2) beam failure detection resource groups, and each bit indicates whether a beam failure occurs in one corresponding beam failure detection resource group. For example, when the tenth field includes two bits (that is, the tenth field occupies two bits), and two (that is, M is equal to 2) beam failure detection resource groups are configured for a cell, a value of the tenth field corresponds to four field values: 00, 01, 10, and 11. Each of the four field values may indicate any one of the following: a beam failure occurs in a $1^{st}$ beam failure detection resource group, a beam failure occurs in a $2^{nd}$ beam failure detection resource group, and the beam failure occurs in the two beam failure detection resource groups. For example, 01 indicates that the beam failure occurs in the $1^{st}$ beam failure detection resource group, 10 indicates that the beam failure occurs in the $2^{nd}$ beam failure detection resource group, and 00 or 11 indicates that the beam failure occurs in the two beam failure detection resource groups. For another example, 10 indicates that the beam failure occurs in the $1^{st}$ beam failure detection resource group, 01 indicates that the beam failure occurs in the $2^{nd}$ beam failure detection resource group, and 00 or 11 indicates that the beam failure occurs in the two beam failure detection resource groups. For another example, 00 indicates that the beam failure occurs in the $1^{st}$ beam failure detection resource group, 01 indicates that the beam failure occurs in the $2^{nd}$ beam failure detection resource group, and 10 or 11 indicates that the beam failure occurs in the two beam failure detection resource groups. In some other implementations, when the tenth field includes two bits (that is, the tenth field occupies two bits), and two (that is, M is equal to 2) beam failure detection resource groups are configured for a cell, the tenth field may also be considered as two independent 1-bit fields. Each 1-bit field indicates whether a beam failure occurs in one corresponding beam failure detection resource group. The two 1-bits may be two consecutive bits, or may be two inconsecutive bits. For example, a $1^{st}$ bit corresponds to the $1^{st}$ beam failure detection resource group, and a $2^{nd}$ bit corresponds to the $2^{nd}$ beam failure detection resource group. Alternatively, a $1^{st}$ bit corresponds to the $2^{nd}$ beam failure detection resource group, and a $2^{nd}$ bit corresponds to the $1^{st}$ beam failure detection resource group. A bit value 0 indicates that no beam failure occurs in a corresponding beam failure detection resource group, or a bit value 1 indicates that a beam failure occurs in a corresponding beam failure detection resource group. Alternatively, a bit value 0 indicates that a beam failure occurs in a corresponding beam failure detection resource group, or a bit value 0 indicates that no beam failure occurs in a corresponding beam failure detection resource group. In the foregoing technical solutions, an example in which the tenth field includes two bits and M is equal to 2 is used for description, but does not constitute a limitation on a function of the tenth field provided in this embodiment of this application. In some implementations, the tenth field may alternatively include more bits, for example, three bits.

Optionally, when the tenth field indicates that a beam failure occurs in two of the M beam failure detection resource groups, any bit corresponds to two octets. When the tenth field indicates that a beam failure occurs in one of the M beam failure detection resource groups, any bit corresponds to one octet. In other words, when M is equal to 2, and the beam failure type indicated by the tenth field is that a beam failure occurs in two of the M beam failure detection resource groups, the first MAC CE includes two octets used to carry beam failure recovery information of two TRPs or two beam failure detection resource groups of the cell. The $1^{st}$ octet corresponds to the $1^{st}$ beam failure detection resource group, and the $2^{nd}$ octet corresponds to the $2^{nd}$ beam failure detection resource group. When M is equal to 2, and the beam failure information indicated by the tenth field is that a beam failure occurs in one of the M beam failure detection resource groups, for example, when the beam failure occurs in the 1st beam failure detection resource group or the beam failure occurs in the $2^{nd}$ beam failure detection resource group, the first MAC CE includes one octet used to carry beam failure recovery information of the TRP or beam failure detection resource group in which the beam failure occurs. The beam failure recovery information includes indication information indicating whether there is a candidate beam resource meeting the quality requirement, information about the candidate beam resource meeting the quality requirement, and the like.

Optionally, each of the one or more octets further includes one seventh field, and the seventh field indicates whether there is a candidate beam resource meeting the quality requirement in a candidate beam resource group corresponding to each octet. For a specific feature of the seventh field, refer to the format of the second type of first MAC CE.

Optionally, each of the one or more octets further includes one eighth field, and the eighth field indicates information about the candidate beam resource that meets the quality requirement and that is determined in the candidate beam resource group corresponding to each octet. For a specific feature of the eighth field, refer to the format of the second type of first MAC CE.

The foregoing describes the format of the fifth type of first MAC CE provided in this embodiment of this application in detail with reference to text. The following describes specific formats of the fifth type of first MAC CE with reference to FIG. 14 and FIG. 15.

For example, a schematic diagram of the format of the fifth type of first MAC CE provided in this embodiment of this application is described by using an example in which the network device configures eight cells for one terminal device, and configures M (M is an integer greater than 1) beam failure detection resource groups and M candidate beam resource groups for each cell. It may be understood that the eight cells are all multi-TRP cells.

Figure 14:
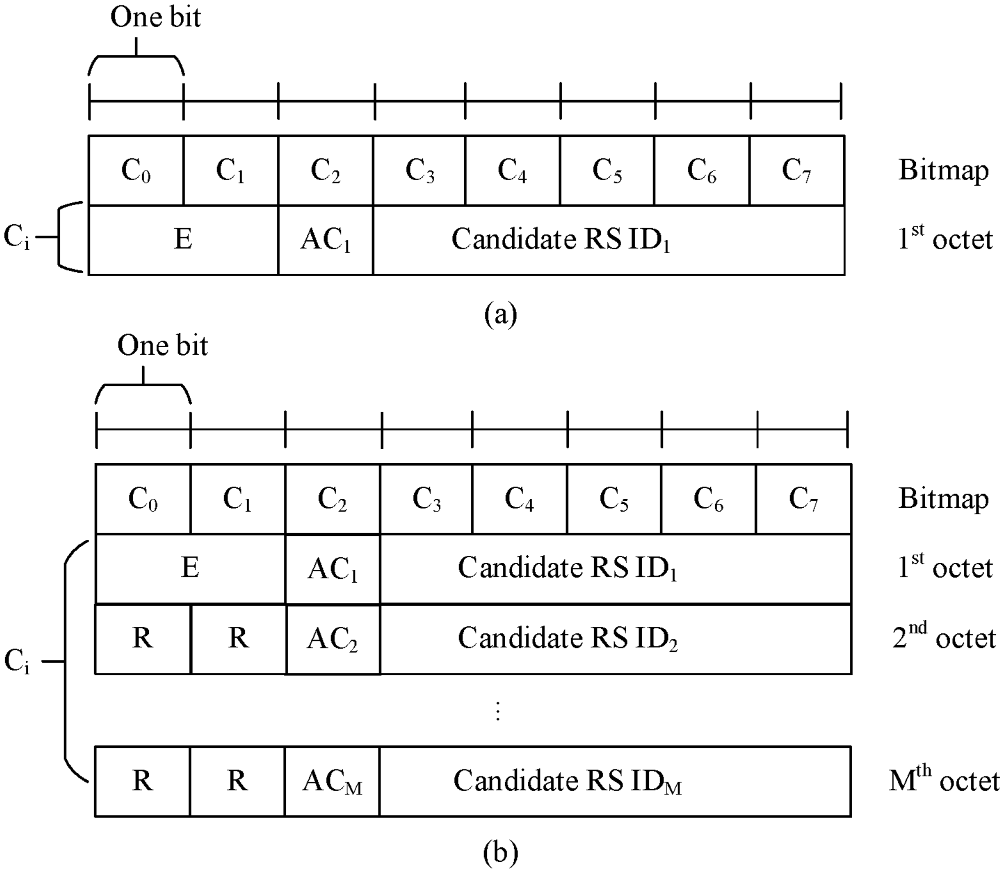
FIG. 14 is a schematic diagram of a format of a fifth type of first MAC CE according to an embodiment of this application.

The following describes a specific format of the fifth type of first MAC CE with reference to FIG. 14.

As shown in (a) in FIG. 14, the fifth type of first MAC CE provided in this embodiment of this application includes one bitmap (the one bitmap includes eight bits (that is, eight fields, where each field uses one bit), and the eight bits are respectively denoted as $C_0$, $C_1$, $C_2$, $C_3$, $C_4$, $C_5$, $C_6$, and $C_7$, and are in a one-to-one correspondence with the eight cells) and one or more octets corresponding to any bit $C_i$ (i is an integer greater than or equal to 0 and less than or equal to 7) in the one bitmap. A cell corresponding to the any bit $C_i$ is a multi-TRP cell in which the beam failure occurs. A quantity of octets corresponding to the any bit $C_i$ is the same as a quantity of TRPs in which a beam failure occurs in a multi-TRP cell corresponding to the any bit $C_i$.

As shown in (a) in FIG. 14, if the quantity of TRPs in which the beam failure occurs in the multi-TRP cell corresponding to the any bit $C_i$ is 1, the any bit $C_i$ corresponds to one octet, and the one octet may include an E field (that is, an example of the tenth field), an $AC_1$ field (that is, an example of the seventh field), and a candidate RS $ID_1$ field (that is, an example of the eighth field in the first definition manner). The E field indicates that a beam failure occurs in a $1^{st}$ beam failure detection resource group in M beam failure detection resource groups (M is an integer greater than 1, for example, M is equal to 2) in a cell corresponding to the any bit $C_1$. The E field may include two bits, each of the two bits corresponds to one beam failure detection resource group, a 1 bit (for example, the 1 bit is set to 0) in the two bits indicates that no beam failure occurs in a corresponding beam failure detection resource group, and another 1 bit (for example, the 1 bit is set to 1) in the two bits indicates that a beam failure occurs in a corresponding beam failure detection resource group. The $AC_1$ field includes one bit, and the $AC_1$ field indicates that there is a candidate beam resource meeting the quality requirement in a candidate beam resource group corresponding to the one octet. The candidate RS $ID_1$ field includes five bits, and the candidate RS $ID_1$ field indicates information about the candidate beam resource that meets the quality requirement and that is determined in the candidate beam resource group corresponding to the one octet.

Optionally, the one octet corresponding to the any bit C; may further include a reserved field, and a value of the reserved field is null.

The fifth type of first MAC CE shown in (b) in FIG. 14 includes one bitmap. A definition of the bitmap is the same as the definition of the one bitmap included in the fifth type of first MAC CE shown in (a) in FIG. 14. Details are not described herein again. As shown in (b) in FIG. 14, if the quantity of TRPs in which a beam failure occurs in a multi-TRP cell corresponding to any bit $C_i$ is M (M is an integer greater than 1, for example, M is equal to 2), the any bit $C_i$ corresponds to M octets. The 1st octet in the M octets may include: an E field (that is, an example of the tenth field), an $AC_1$ field (that is, an example of the seventh field), and a candidate RS $ID_1$ field (that is, an example of the eighth field in the first definition manner). The E field indicates that the beam failure occurs in M (M is an integer greater than 1, for example, M is equal to 2) beam failure detection resource groups in a cell corresponding to the any bit $C_i$. The E field may include M bits, each of the M bits corresponds to one beam failure detection resource group, and each of the M bits indicates that a beam failure occurs in a corresponding beam failure detection resource group. Each octet following the 1st octet may include an R field (namely, a reserved field), an AC field (that is, an example of the seventh field), and a candidate RS ID field (that is, an example of the eighth field in the first definition manner).

Figure 15:
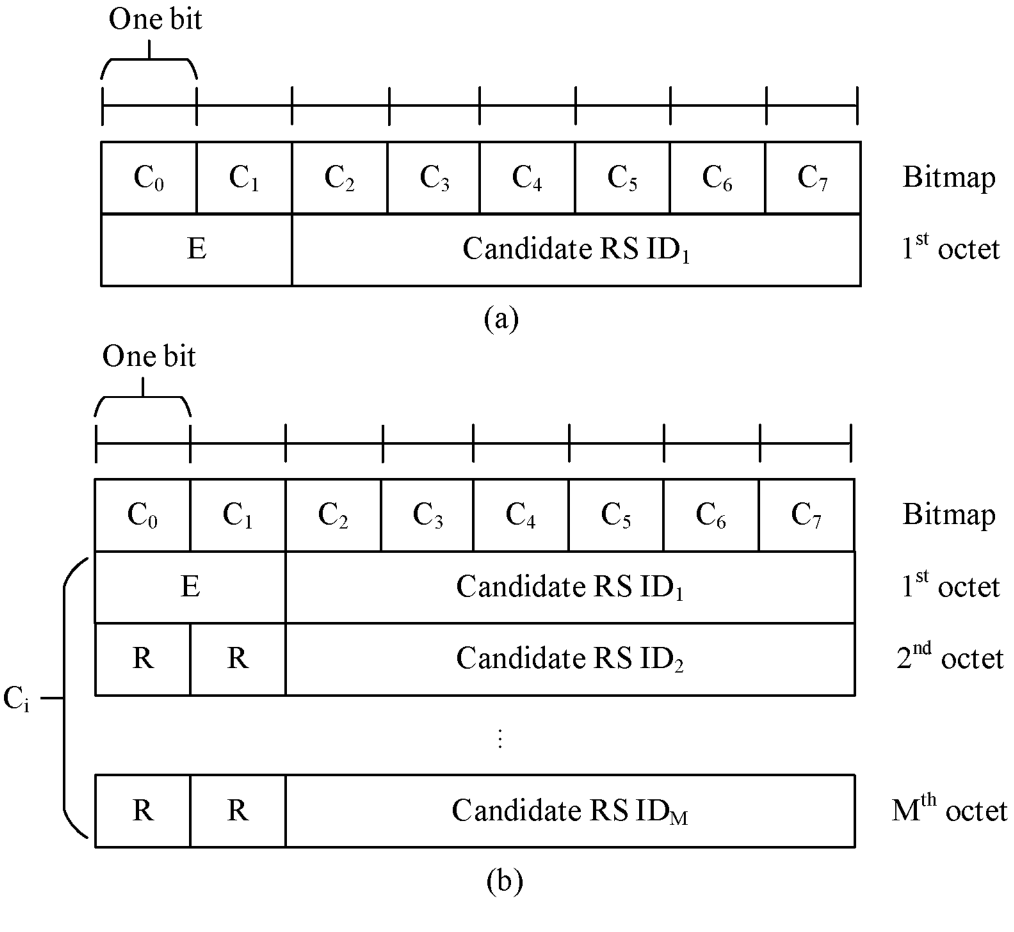
FIG. 15 is a schematic diagram of a format of a fifth type of first MAC CE according to an embodiment of this application.

The following describes another specific format of the fifth type of first MAC CE provided in this embodiment of this application with reference to FIG. 15.

A definition of one bitmap included in the fifth type of first MAC CE shown in (a) in FIG. 15 and (b) in FIG. 15 is the same as the definition of one bitmap included in the fifth type of first MAC CE shown in (a) in FIG. 14. For content that is not described in detail, refer to the foregoing description of the bitmap in (a) in FIG. 14.

As shown in (a) in FIG. 15, if the quantity of TRPs in which the beam failure occurs in the multi-TRP cell corresponding to the any bit $C_i$ is 1, the any bit $C_1$ corresponds to one octet, and the one octet may include an E field (that is, an example of the tenth field) and a candidate RS $ID_1$ field (that is, an example of the eighth field in the second definition manner). The E field indicates that a beam failure occurs in a 1st beam failure detection resource group in M beam failure detection resource groups (M is an integer greater than 1, for example, M is equal to 2) in a cell corresponding to the any bit $C_i$. The E field may include two bits, each of the two bits corresponds to one beam failure detection resource group, a 1 bit (for example, the 1 bit is set to 1) in the two bits indicates that no beam failure occurs in a corresponding beam failure detection resource group, and another 1 bit (for example, the 1 bit is set to 0) in the two bits indicates that a beam failure occurs in a corresponding beam failure detection resource group. The candidate RS $ID_1$ field may occupy six bits, and the candidate RS $ID_1$ field may indicate that there is no candidate beam resource meeting the quality requirement in a candidate beam resource group corresponding to the one octet, and indicate information about the candidate beam resource meeting the quality requirement. In this case, a function of the candidate RS $ID_1$ field includes: a function of the $AC_1$ field in the 1st octet shown in (a) in FIG. 14, and a function of the candidate RS $ID_1$ field in the 1st octet shown in (a) in FIG. 14.

Optionally, the one octet corresponding to the any bit C; may further include a reserved field, and a value of the reserved field is null.

As shown in (b) in FIG. 15, if the quantity of TRPs in which a beam failure occurs in a multi-TRP cell corresponding to any bit $C_i$ is M (M is an integer greater than 1, for example, M is equal to 2), the any bit C; corresponds to M octets. The 1st octet in the M octets may include: an E field (that is, an example of the tenth field) and a candidate RS $ID_1$ field (that is, an example of the eighth field in the second definition manner). The E field indicates that the beam failure occurs in M (M is an integer greater than 1, for example, M is equal to 2) beam failure detection resource groups in a cell corresponding to the any bit $C_i$. The E field may include M bits, each of the M bits corresponds to one beam failure detection resource group, and each of the M bits indicates that a beam failure occurs in a corresponding beam failure detection resource group. Each octet following the 1st octet may include an R field (namely, a reserved field) and a candidate RS ID field (that is, an example of the eighth field in the second definition manner).

It should be understood that FIG. 14 and FIG. 15 are merely examples, and do not constitute any limitation on the specific format of the fifth type of first MAC CE provided in this embodiment of this application. For example, $C_i$ in the bitmap shown in (a) in FIG. 14 may occupy more bits. For example, $C_i$ may alternatively occupy two bits. For example, C; in the bitmap shown in (a) in FIG. 15 may occupy more bits. For example, $C_i$ may alternatively occupy two bits.

The foregoing describes the formats of five types of first MAC CEs provided in this embodiment of this application in detail. Each type of first MAC CE is used by the terminal device to report only beam failure recovery information corresponding to a multi-TRP cell. In other words, each type of first MAC CE provided in this embodiment of this application is not used by the terminal device to report beam failure recovery information corresponding to a single-TRP cell. It should be further understood that the formats of the foregoing five types of first MAC CEs do not constitute any limitation on the format of the first MAC CE provided in this embodiment of this application. For example, in some implementations, more bits (for example, three bits) in the bitmap correspond to one field (for example, a fourth field). Features in the formats of the foregoing five types of first MAC CEs may be combined, and a new MAC CE format generated through combination also falls within the protection scope of this application. For example, one first MAC CE may include a 2-bit field that is in the fourth type of first MAC CE and that indicates beam failure information in a cell, and a fifth field in the second type of first MAC CE. The first MAC CE format also falls within the protection scope of this application.

It may be understood that, in some other implementations, the first MAC CE may further include any one or more of the following fields: a field 1, a field 2, a field 3, a field 4, a field 5, a field 6, and a field 8.

The field 1 indicates a quantity of TRPs in which a beam failure occurs in a multi-TRP cell, or the field 1 indicates a quantity of beam failure detection resource groups in which a beam failure occurs in a multi-TRP cell.

The field 2 indicates a beam failure type of the beam failure in the multi-TRP cell, and the beam failure type may include one or more of the following: a beam failure occurs in a single TRP in the multi-TRP cell, the beam failure occurs in some TRPs in the multi-TRP cell, or the beam failure occurs in all TRPs in the multi-TRP cell. When two beam failure detection resource groups are configured for the multi-TRP cell, the beam failure type may alternatively include one or more of the following: a beam failure occurs in a 1st TRP, a beam failure occurs in a 2nd TRP, the beam failure occurs in the two TRPs, and no beam failure occurs in the two TRPs. For example, the field 2 includes two bits. The field 2 corresponds to four field values. Each field value corresponds to one of the foregoing types. The beam failure type may alternatively include one or more of the following: a beam failure occurs in a 1st TRP, a beam failure occurs in a 2nd TRP, or the beam failure occurs in the two TRPs. The field 2 includes two bits, and corresponds to four field values. Three field values respectively indicate that the beam failure occurs in the 1st TRP, the beam failure occurs in the 2nd TRP, and the beam failure occurs in the two TRPs.

The field 3 corresponds to one TRP. The field 3 indicates whether the beam failure occurs in the TRP corresponding to the field 3. Alternatively, the field 3 corresponds to one beam failure detection resource group, and the field 3 indicates whether the beam failure is detected in the beam failure detection resource group corresponding to the field 3. When one of the foregoing fields indicates that no beam failure occurs, a remaining field in an octet of the field may have no specific meaning, and the terminal device may ignore the remaining field. There may be M fields 3, which respectively correspond to M TRPs, respectively correspond to M beam failure detection resource groups, respectively correspond to M TRPs, or respectively correspond to M CORESET groups.

The field 4 indicates information about a TRP in which a beam failure occurs, for example, an index of the TRP. The index of the TRP may be an index of one beam failure detection resource group, namely, an index of a beam failure detection resource group corresponding to the TRP, may be an index of a candidate beam resource group, namely, an index of a candidate beam resource group corresponding to the TRP, or may be an index of one CORESET group, namely, CORESETPoolIndex. Alternatively, a plurality of fields in the foregoing fields may be included, to indicate a plurality of TRPs in which the beam failure occurs, or indexes of beam failure detection resource groups/candidate beam resource groups/CORESET groups corresponding to the TRPs.

In this embodiment of this application, a type of the information about the TRP in which the beam failure occurs is not limited. For example, the information about the TRP in which the beam failure occurs may be information about the index of the TRP in which the beam failure occurs. The index of the TRP may be an index of one beam failure detection resource group, namely, an index of a beam failure detection resource group corresponding to the TRP. Alternatively, the index of the TRP may be an index of one candidate beam resource group, namely, an index of a candidate beam resource group corresponding to the TRP. Alternatively, the index of the TRP may be an index of one CORESET group, namely, CORESETPoolIndex.

Optionally, the first MAC CE may further include a plurality of fields 4. For example, the first MAC CE may include three fields 4. A 1st field 4 indicates an index of a beam failure detection resource group corresponding to the TRP in which the beam failure occurs. A 2nd field 4 indicates an index of a candidate beam resource group corresponding to the TRP in which the beam failure occurs. A 3rd field 4 indicates an index of a CORESET group corresponding to the TRP in which the beam failure occurs.

The field 5 indicates a quantity of candidate beam resources reported by the terminal device.

The field 6 corresponds to one TRP, and the field 6 indicates whether there is a candidate beam resource meeting the quality requirement in one TRP corresponding to the field 6. Alternatively, the field 6 corresponds to one candidate beam resource group, and the field 6 indicates whether there is a candidate beam resource meeting the quality requirement in the candidate beam resource group corresponding to the field 6. Alternatively, when one of the foregoing fields indicates that there is no candidate beam resource meeting the quality requirement, a remaining field in an octet of the field has no specific meaning, and the terminal device may ignore the remaining field. There may be M fields 6, which respectively correspond to M TRPs, respectively correspond to M beam failure detection resource groups, respectively correspond to M TRPs, or respectively correspond to M CORESET groups.

The field 7 indicates information about a candidate beam resource. There may be M fields 7, which respectively correspond to M TRPs, respectively correspond to M beam failure detection resource groups, respectively correspond to M TRPs, or respectively correspond to M CORESET groups. One field value of the field 7 may be reserved to indicate that there is no candidate beam resource meeting the quality requirement. For example, when values of all bits corresponding to the field 7 are all 0 or all 1, it indicates that there is no candidate beam resource meeting the quality requirement. Other field values indicate information about one candidate beam resource meeting the quality requirement.

It may be understood that when the first MAC CE includes the plurality of fields 7, a plurality of candidate beam resources indicated by the plurality of fields 7 may be understood as resources in a plurality of candidate beam resource groups. That is, the plurality of candidate beam resources are in a one-to-one correspondence with the plurality of candidate beam resource groups. In this case, the plurality of candidate beam resources may be sorted in the first MAC CE in an order (for example, an index order or a configuration order) of candidate beam resource groups corresponding to the plurality of candidate beam resources. The information about the candidate beam resource may be but is not limited to an index of the candidate beam resource.

The field 8 indicates a TRP to which one reported candidate beam resource belongs, or the field 8 indicates a candidate beam resource group to which one reported candidate beam resource belongs.

It may be understood that when the terminal device needs to report a plurality of candidate beam resources, the first MAC CE may include a plurality of fields 8. The plurality of fields 8 indicate TRPs to which the plurality of reported candidate beam resources respectively belong, or the plurality of fields 8 indicate candidate beam resource groups to which the plurality of candidate beam resources respectively belong.

In a case, when a beam failure occurs in one beam failure detection resource group, the terminal device sends the first MAC CE, and then the beam failure also occurs in another beam failure detection resource group. To be specific, beam failure recovery of one TRP is being performed, and the beam failure occurs in another TRP. In this case, the terminal device may use the following method. Method 1: The terminal device sends another first MAC CE, to notify the network device that the beam failure also occurs in another beam failure detection resource group, and report information about a candidate beam resource corresponding to the beam failure detection resource group, for example, information about whether there is a candidate beam resource meeting the quality requirement and specific information about the candidate beam resource. Method 2: The terminal device may send another first MAC CE, to notify the network device that a beam failure occurs in two beam failure detection resource groups, and report information about candidate beam resources corresponding to the two beam failure detection resource groups, for example, information about whether there is a candidate beam resource meeting the quality requirement and specific information about the candidate beam resource. Alternatively, it may be specified that the terminal device does not send another first MAC CE before a previous beam failure recovery procedure is completed. In other words, the terminal device can send another first MAC CE only after receiving a response message of a previous first MAC CE or after receiving the response message for a specific time period, for example, a time period corresponding to 28 symbols, to notify the network device that the beam failure also occurs in another beam failure detection resource group.

Optionally, which one of the foregoing method 1 and method 2 is specifically used by the terminal device may also be determined based on a condition. Specifically, when a first condition is met, the method 1 is used. When a second condition is met, the second method is used.

The first condition may be one or a combination of the following.

After sending the previous first MAC CE, the terminal device has received the corresponding response message.

A time period from a current time point to a time point at which the response message of the previous first MAC CE is received is less than the specific time period, for example, the time period corresponding to the 28 symbols.

The second condition may be one or a combination of the following.

After sending the previous first MAC CE, the terminal device has not received the corresponding response message.

Optionally, after the terminal device performs the step 530, the terminal device may further perform the following step 540 (not shown in FIG. 5).

When M is equal to 1, and the beam failure is detected in the M beam failure detection resource groups, the terminal device sends, by using a second MAC CE, the beam failure recovery information corresponding to the cell. It may be understood that the method described in the step 540 may be applied to the communication system shown in FIG. 1. In other words, the step 540 may be performed by the network device 110 in FIG. 1, and the terminal device 120*a* and/or the terminal device 120*b* in FIG. 1. It may be further specified that the foregoing method is applicable to only an SCell. Specifically, when the beam failure is detected in a cell for which only a single beam failure detection resource group is configured, if the cell is an SCell, beam failure recovery information is generated by using the second MAC CE; if the cell is a PCell, beam failure recovery information is generated by using a random access process; or if the cell is a PSCell, beam failure recovery information is generated by using the second MAC CE, or beam failure recovery information is generated by using a random access process.

The following specifically describes a format of a first type of second MAC CE provided in this embodiment of this application.

Format of the First Type of Second MAC CE

The second MAC CE includes one bitmap. If configuration information of a cell corresponding to any bit in the one bitmap includes M beam failure detection resource groups and M candidate beam resource groups, and M is equal to 1, when a value of the any bit is a first value, it indicates that no beam failure occurs in the cell corresponding to the bit, or when a value of the any bit is a second value, it indicates that the beam failure occurs in the cell corresponding to the bit. The first value is different from the second value. For example, the first value is 0, and the second value is 1. For example, the first value is 1, and the second value is 0.

Optionally, when the beam failure occurs in the cell corresponding to the any bit, the second MAC CE includes one octet corresponding to the any bit. The one octet includes an AC field and a candidate RS ID field. The AC field indicates whether there is a candidate beam resource meeting the quality requirement in a candidate beam resource group corresponding to the one octet. The candidate RS ID field indicates information about the candidate beam resource that meets the quality requirement and that is determined in the candidate beam resource group corresponding to the one octet.

Optionally, if configuration information of a cell corresponding to any bit in the one bitmap includes M beam failure detection resource groups and M candidate beam resource groups, and M is an integer greater than 1. A value of the bit is null, and the terminal device ignores the value of the bit, and considers the bit as a reserved field without information. It may also be understood as that the value of the bit is a first value by default, and the network device cannot set the value of the bit to another value, or the terminal device considers the value of the bit as the first value regardless of the value of the bit set by the network device. The first value indicates that no beam failure occurs in the corresponding cell.

In the foregoing technical solution, the terminal device may report, by using the first type of second MAC CE, beam failure recovery information corresponding to a single-TRP cell in which the beam failure occurs. In other words, in the foregoing technical solution, the first type of second MAC CE is not used to report beam failure recovery information corresponding to a multi-TRP cell in which the beam failure occurs.

It may be understood that a first logical channel identifier (LCID) corresponding to the first MAC CE provided in this embodiment of this application is different from a second LCID corresponding to the second MAC CE.

Optionally, in some implementations, the second LCID may be 50 or 51, and the first LCID may be any one of the following logical channel identifiers: 35, 36, 37, 38, 39, 40, 41, 42, 43, 44, or 47.

It should be understood that the format of the first type of second MAC CE provided in this embodiment of this application is applicable to reporting only the beam recovery information corresponding to the single-TRP cell in which the beam failure occurs.

It may be understood that the format of the first type of second MAC CE is the same as the format shown in FIG. 4, but a definition of the R field in the format of the first type of second MAC CE is different from the definition of the R field in the format of the MAC CE in FIG. 4. For the format of the first type of second MAC CE, refer to the format of the MAC CE shown in FIG. 4.

The foregoing describes a beam failure recovery reporting method. To be specific, the terminal device reports, by using the first MAC CE, the beam failure recovery information of the multi-TRP cell in which the beam failure occurs, and the terminal device reports, by using the first type of second MAC CE, the beam failure recovery information of the single-TRP cell in which the beam failure occurs.

The following describes another beam failure recovery reporting method. To be specific, the terminal device reports, by using a second type of second MAC CE, beam failure recovery information of a single-TRP cell and multi-TRP cell in which the beam failure occurs. That is, regardless of whether the beam failure occurs in the single-TRP cell or the beam failure occurs in the multi-TRP cell, the beam failure recovery information is reported by using the second type of second MAC CE.

The following describes the second type of second MAC CE. The terminal device may report, by using the second type of second MAC CE, the beam failure recovery information of the single-TRP cell and multi-TRP cell in which the beam failure occurs.

Format of the Second Type of Second MAC CE

The second type of second MAC CE includes one bitmap. One bit in the bitmap corresponds to one cell. The cell may be a single-TRP cell or a multi-TRP cell. The bit indicates whether the beam failure occurs in the cell. A value of the bit is 0 or 1. For example, it may be defined as follows: the value of the bit being 1 indicates that the beam failure occurs in the cell, and the value of the bit being 0 indicates that no beam failure occurs in the cell. Alternatively, it may be defined as follows: the value of the bit being 0 indicates that the beam failure occurs in the cell, and the value of the bit being 1 indicates that no beam failure occurs in the cell.

If a beam failure occurs in a cell corresponding to one bit in the bitmap, the second MAC CE includes one octet, and the one octet corresponds to the bit, and includes beam failure recovery information corresponding to the cell. The one octet may further include one field #1. The one field #1 is used to report whether there is a candidate beam resource meeting a quality requirement in a candidate beam resource group corresponding to the octet of the one field #1. The one octet may further include one field #2 (that is, an example of a ninth field). The one field #2 is used to report beam failure recovery information corresponding to a cell corresponding to the octet of the one field #2. An R field indicates a quantity of TRPs in which the beam failure occurs. An R field indicates a beam failure type. Alternatively, the one field #2 is a reserved field, in other words, the field #2 has no specific meaning. Optionally, the one octet may further include one field #3. The one field #3 is used to report information about the candidate beam resource that meets the quality requirement and that is determined in the candidate beam resource group corresponding to the octet of the one field #3. For ease of description, in the following, an AC field is used to represent the one field #1, the R field is used to represent the one field #2, and the candidate RS ID field is used to represent the one field #3 for description. It may be understood that the one field #1, the one field #2, and the one field #3 may also be defined by other names. This is not specifically limited herein.

The R field in the second MAC CE may be a $2^{nd}$ bit of an octet of the R field. If configuration information of a cell corresponding to any bit in the one bitmap includes M beam failure detection resource groups and M candidate beam resource groups, and M is an integer greater than 1, a definition of the R field in the second MAC CE may be any one of the following:

Definition 1

The R field indicates information about a TRP in which a beam failure occurs (for example, an index of the TRP in which the beam failure occurs), the R field indicates information about a beam failure detection resource group in which the beam failure is detected, or the R field indicates information about a candidate beam resource group corresponding to a reported candidate beam resource.

Definition 2

The R field indicates the quantity of TRPs in which the beam failure occurs, or the R field indicates the beam failure type. The beam failure type includes: a beam failure occurs in a single TRP in a multi-TRP cell, or the beam failure occurs in some or all TRPs in a multi-TRP cell. For example, it may be defined as follows: R=0 indicates that the beam failure occurs in the single TRP in the multi-TRP cell, and R=1 indicates that the beam failure occurs in some or all TRPs in the multi-TRP cell. For example, it may be defined as follows: R=1 indicates that the beam failure occurs in the single TRP in the multi-TRP cell, and R=0 indicates that the beam failure occurs in some or all TRPs in the multi-TRP cell.

It may be understood that, when the R field is defined in the manner of the foregoing definition 2, the terminal device may determine, by using an index of the reported candidate beam resource, a TRP to which the candidate beam resource specifically belongs. In this case, the network device needs to configure a candidate beam resource in a candidate beam resource group in a cell in a cross-resource-group numbering manner (for details, refer to the step 510).

Figure 16:
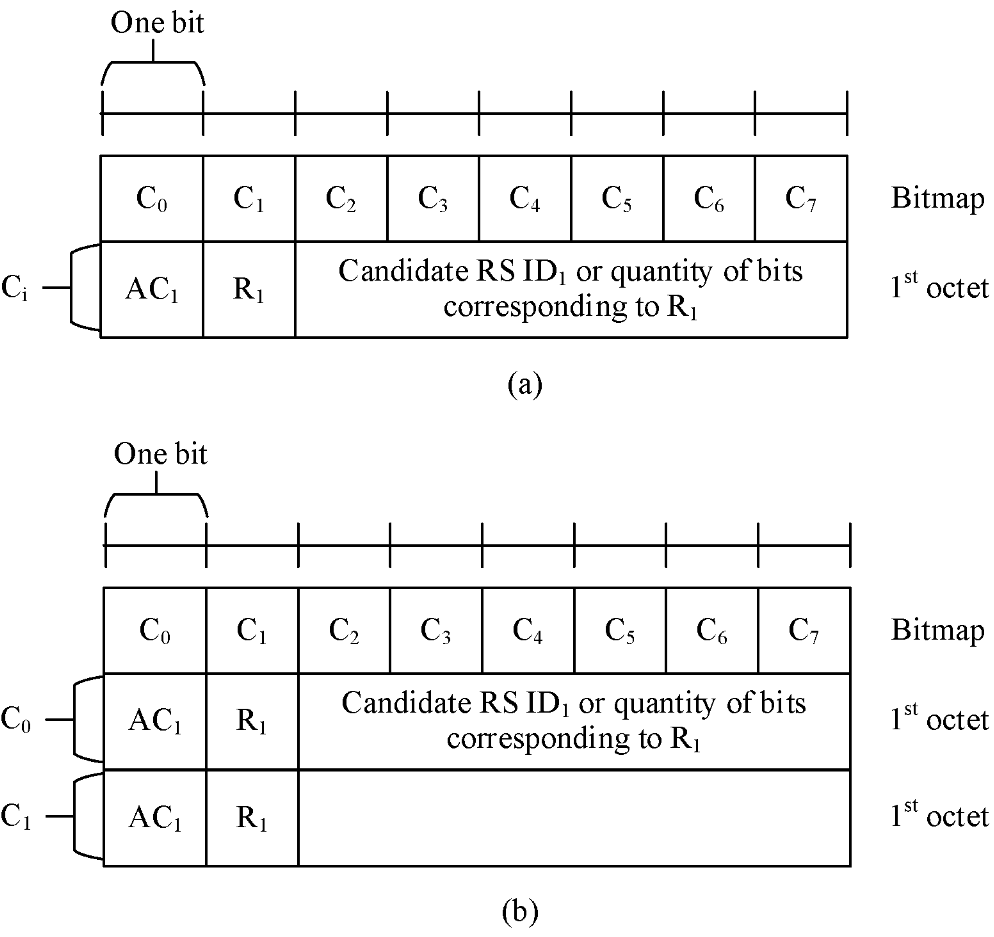
FIG. 16 is a schematic diagram of a format of a second type of second MAC CE according to an embodiment of this application.

For example, the format of the second type of second MAC CE may be shown in (a) in FIG. 16. In (a) in FIG. 16, the second type of second MAC CE includes one bitmap and one octet corresponding to any bit in the one bitmap. The one bitmap includes eight bits, which are respectively denoted as $C_0$, $C_1$, $C_2$, $C_3$, $C_4$, $C_5$, $C_6$, and $C_7$. The eight bits are in a one-to-one correspondence with eight multi-TRP cells configured by the network device for one terminal device. The network device configures M beam failure detection resource groups and M candidate beam resource groups for any one of the eight multi-TRP cells, M is an integer greater than 1, and a cell corresponding to the any bit is a multi-TRP cell in which the beam failure occurs. It may be understood that, if there is a candidate beam resource meeting the quality requirement in a candidate beam resource group corresponding to the octet of the any bit, the octet of the any bit includes a candidate RS ID field. If there is no candidate beam resource meeting the quality requirement in a candidate beam resource group corresponding to the octet of the any bit, the octet of the any bit does not include a candidate RS ID field.

For example, if a beam failure occurs in a multi-TRP cell corresponding to a $1^{st}$ bit $C_0$ in the foregoing eight bits, a beam failure occurs in a multi-TRP cell corresponding to a $2^{nd}$ bit $C_1$ in the foregoing eight bits, there is a candidate beam resource meeting the quality requirement in a candidate beam resource group corresponding to an octet of the $1^{st}$ bit $C_0$, and there is no candidate beam resource meeting the quality requirement in a candidate beam resource group corresponding to an octet of the $2^{nd}$ bit $C_0$, the format of the second type of second MAC CE may be a format shown in (b) in FIG. 16. If configuration information of a cell corresponding to any bit in the one bitmap includes M beam failure detection resource groups and M candidate beam resource groups, and M is equal to 1, the R field in the second MAC CE may be understood as a reserved field. In this case, the R field is reserved, that is, the R field has no specific meaning.

It may be understood that, in FIG. 16, descriptions are provided by using an example in which an AC field and an R field each use one bit, and a candidate RS ID field uses six bits. In some other implementations, a quantity of bits used in the foregoing fields may alternatively be another value. This is not specifically limited herein. Optionally, in different octets included in the MAC CE in FIG. 16, quantities of bits used in same fields (for example, AC fields) may be different. That is, FIG. 16 is merely an example, and does not constitute any limitation on the format of the second type of second MAC CE provided in this embodiment of this application. It should be understood that the format of the second type of second MAC CE provided in this embodiment of this application is applicable to reporting the beam recovery information corresponding to the multi-TRP cell or single-TRP cell in which the beam failure occurs. It may be understood that, if a cell corresponding to any bit in one bitmap included in the second type of second MAC CE is a single-TRP cell, an R field corresponding to the any bit has no specific meaning. If a cell corresponding to any bit in one bitmap included in the second type of second MAC CE is a multi-TRP cell, an R field corresponding to the any bit indicates beam failure recovery information corresponding to the cell corresponding to an octet of the R field, indicate a quantity of TRPs in which the beam failure occurs, or indicate a beam failure type.

The foregoing describes two beam failure recovery reporting methods.

Method 1: The terminal device reports, by using any one of the foregoing types of first MAC CEs, the beam failure recovery information of the multi-TRP cell in which the beam failure occurs, and reports, by using the foregoing first type of second MAC CE, the beam failure recovery information of the single-TRP cell in which the beam failure occurs.

Method 2: The terminal device reports, by using the second type of second MAC CE, the beam failure recovery information of the single-TRP cell and multi-TRP cell in which the beam failure occurs.

The following describes a third beam failure recovery reporting method. Specifically, when a beam failure occurs in a single TRP in a multi-TRP cell, beam failure recovery information is reported by using any one of the foregoing types of first MAC CEs. When the beam failure occurs in all TRPs in a multi-TRP cell, or a beam failure occurs in a single-TRP cell, beam failure recovery information is reported by using the second type of second MAC CE.

It may be understood that the format of the any type of first MAC CE and the specific format of the any type of second MAC CE are merely examples, and do not constitute any limitation. For example, the any type of first MAC CE or the any type of second MAC CE may further include another field. It should be further understood that MAC CEs obtained by combining the foregoing plurality of fields (the first field, the second field, the third field, the fourth field, the fifth field, the sixth field, the seventh field, and the eighth field) based on a correspondence between an octet and any bit in a bitmap included in each MAC CE all belong to the formats of the MAC CE claimed in this embodiment of this application.

In this embodiment of this application, the terminal device may report, by using any one of the foregoing types of first MAC CEs and the foregoing second type of second MAC CE, the beam failure recovery information corresponding to the multi-TRP cell in which the beam failure occurs, so that beam failure recovery can be implemented in the multi-TRP cell in time. In addition, the terminal device reports, by using any one of the foregoing types of second MAC CEs, the beam failure recovery information corresponding to the single-TRP cell in which the beam failure occurs, so that beam failure recovery can be implemented in the single-TRP cell in time.

The foregoing describes the communication system to which embodiments of this application are applicable in detail with reference to FIG. 1 to FIG. 3, and describes the beam failure recovery method provided in embodiments of this application in detail with reference to FIG. 5 to FIG. 16. The following describes communication apparatuses provided in embodiments of this application in detail with reference to FIG. 17 to FIG. 19. It should be understood that descriptions of apparatus embodiments correspond to the descriptions of the method embodiment. Therefore, for content that is not described in detail, refer to the foregoing method embodiment. For brevity, details are not described herein again.

The foregoing mainly describes the solutions provided in embodiments of this application from a perspective of interaction between network elements. It may be understood that, to implement the foregoing functions, each network element such as a transmit end device or a receive end device includes a corresponding hardware structure and/or software module for performing each function. A person skilled in the art should be aware that, in combination with the examples described in embodiments disclosed in this specification, units and algorithm steps can be implemented by hardware or a combination of hardware and computer hardware in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, division into functional modules may be performed on a transmit end device or a receive end device based on the foregoing method examples. For example, each functional module may be obtained through division corresponding to each function, or two or more functions may be integrated into one processing module. The integrated module may be implemented in a form of hardware, or may be implemented in a form of a software functional module. It should be noted that, in embodiments of this application, module division is an example, and is merely a logical function division. During actual implementation, another division manner may be used. An example in which each functional module is obtained through division based on each corresponding function is used below for description.

Figure 17:
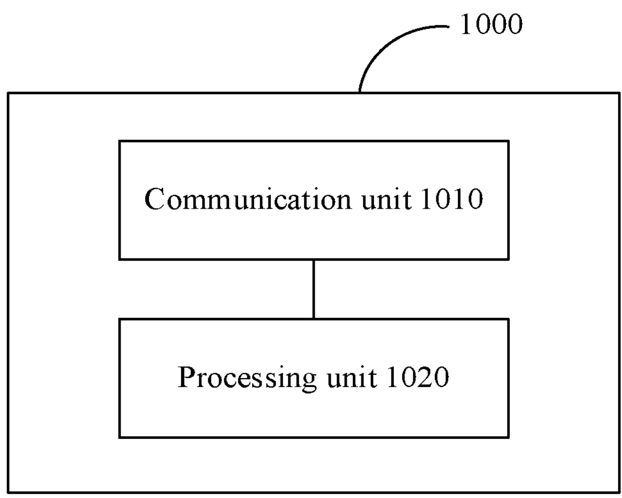
FIG. 17 is a schematic block diagram of a communication apparatus 1000 according to an embodiment of this application.

FIG. 17 is a schematic block diagram of a communication apparatus 1000 according to an embodiment of this application. As shown in the figure, the communication apparatus 1000 may include a communication unit 1010 and a processing unit 1020. The communication unit 1010 may communicate with the outside, and the processing unit 1020 is configured to process data. The communication unit 1010 may also be referred to as a communication interface or a transceiver unit. The transceiver unit may include a sending unit and a receiving unit, which are respectively configured to perform sending and receiving steps in the method embodiment. The communication interface is configured to input and/or output information. The information includes at least one of data and instructions. Optionally, the communication apparatus may be a chip or a chip system. When the communication apparatus is a chip or a chip system, the communication interface may be an input/output interface, or may be an input/output interface, an interface circuit, an output circuit, an input circuit, a pin, a related circuit, or the like on the chip or the chip system. The processor may alternatively be a processing circuit or a logic circuit. An input and an output respectively correspond to receiving and sending in the method embodiment.

In a possible design, the communication apparatus 1000 may implement a step or a procedure performed by the terminal device in the foregoing method embodiment, for example, may be the terminal device, or a chip, a chip system, or a circuit configured in the terminal device. In this case, the communication apparatus 1000 may be referred to as a terminal device. The communication unit 1010 is configured to perform a sending/receiving-related operation on a terminal device side in the foregoing method embodiment, and the processing unit 1020 is configured to perform a processing-related operation of the terminal device in the foregoing method embodiment.

In a possible implementation, the communication unit 1010 is configured to receive configuration information of a cell. The configuration information of the cell includes M beam failure detection resource groups and M candidate beam resource groups. The M beam failure detection resource groups are in a one-to-one correspondence with the M candidate beam resource groups. M is an integer.

The processing unit 1020 is configured to determine that M is an integer greater than 1 and a beam failure occurs in at least one of the M beam failure detection resource groups.

Optionally, the communication unit 1010 is further configured to send, by using a first medium access control control element (MAC CE), beam failure recovery information corresponding to the cell.

Optionally, the first MAC CE includes one bitmap.

If configuration information of a cell corresponding to any bit in the bitmap includes N beam failure detection resource groups and N candidate beam resource groups, N is 0 or 1, and a value of the any bit is a first value by default, the first value indicates that no beam failure occurs in the cell corresponding to the any bit.

Optionally, any bit in the bitmap corresponds M octets.

The M octets are in a one-to-one correspondence with the M beam failure detection resource groups.

The M octets are in a one-to-one correspondence with the M candidate beam resource groups.

The M octets are in a one-to-one correspondence with M transmission reception points TRPs.

Optionally, each of the M octets includes one first field, and the first field indicates whether a beam failure is detected in a beam failure detection resource group corresponding to each octet.

Optionally, a remaining field in each octet is reserved if the first field indicates that no beam failure is detected in the beam failure detection resource group corresponding to each octet.

Optionally, each of the M octets further includes one second field.

The second field indicates whether there is a candidate beam resource meeting a quality requirement in a candidate beam resource group corresponding to each octet.

Optionally, each of the M octets further includes one third field.

The third field indicates information about the candidate beam resource that meets the quality requirement and that is determined in the candidate beam resource group corresponding to each octet.

Optionally, any bit in the bitmap corresponds to one or more octets.

Optionally, a $1^{st}$ octet in the one or more octets includes one fourth field. The fourth field indicates whether a next octet of the $1^{st}$ octet carries the beam failure recovery information corresponding to the cell, or the fourth field indicates a quantity of octets corresponding to the any bit.

Optionally, the $1^{st}$ octet in the one or more octets further includes a fifth field.

The fifth field indicates information about a TRP in which a beam failure occurs.

Optionally, each of the one or more octets further includes one sixth field, and the sixth field indicates a beam failure detection resource group corresponding to each octet or a candidate beam resource group corresponding to each octet.

Optionally, each of the one or more octets further includes one seventh field.

The seventh field indicates whether there is a candidate beam or candidate beam resource meeting a quality requirement in the candidate beam resource group corresponding to each octet.

Optionally, each of the one or more octets further includes one eighth field.

The eighth field indicates information about the candidate beam or candidate beam resource that meets the quality requirement and that is determined in the candidate beam resource group corresponding to each octet.

Optionally, each of the one or more octets further includes one eighth field. A value of the eighth field includes a plurality of field values.

One of the plurality of field values indicates that there is no candidate beam resource meeting the quality requirement in the candidate beam resource group corresponding to each octet, and each field value that is different from the one field value and that is in the plurality of field values indicates information about one candidate beam resource meeting the quality requirement.

Optionally, the first MAC CE further includes one tenth field.

The tenth field indicates a beam failure type. When M is equal to 2, the beam failure type includes: a beam failure occurs in a $1^{st}$ beam failure detection resource group in the M beam failure detection resource groups, a beam failure occurs in a $2^{nd}$ beam failure detection resource group in the M beam failure detection resource groups, or a beam failure occurs in two of the M beam failure detection resource groups.

Optionally, the tenth field includes two bits.

Each of the two bits corresponds to one of the M beam failure detection resource groups, and each bit indicates whether a beam failure occurs in one corresponding beam failure detection resource group.

Optionally, when the tenth field indicates that a beam failure occurs in two of the M beam failure detection resource groups, the any bit corresponds to two octets.

When the tenth field indicates that a beam failure occurs in one of the M beam failure detection resource groups, the any bit corresponds to one octet.

Optionally, the processing unit 1020 is further configured to determine that M is equal to 1, and the beam failure occurs in the M beam failure detection resource groups.

Optionally, the communication unit 1010 is further configured to send, by using a second MAC CE, beam failure recovery information corresponding to the cell.

Optionally, the second MAC CE includes one bitmap.

If configuration information of a cell corresponding to any bit in the bitmap includes N beam failure detection resource groups and N candidate beam resource groups, N is an integer greater than 1, and a value of the any bit is a second value by default, the second value indicates that no beam failure occurs in the cell corresponding to the any bit.

Optionally, a first logical channel identifier (LCID) corresponding to the first MAC CE is different from a second LCID corresponding to the second MAC CE.

Optionally, the second LCID is 50 or 51.

The first LCID is any one of the following logical channel identifiers: 35, 36, 37, 38, 39, 40, 41, 42, 43, 44, or 47.

Figure 18:
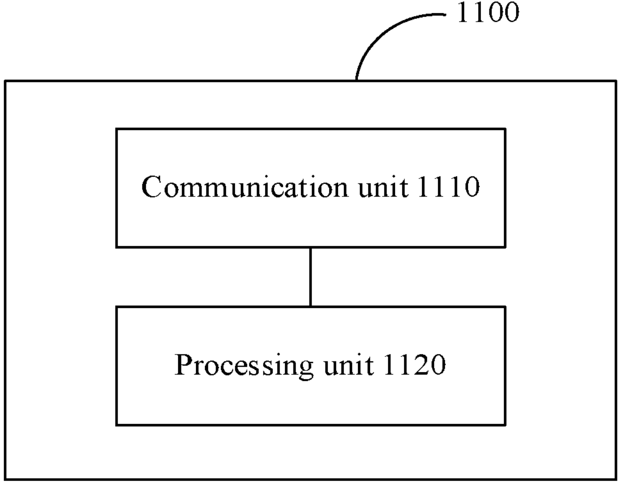
FIG. 18 is a schematic block diagram of a communication apparatus 1100 according to an embodiment of this application.

FIG. 18 is a schematic block diagram of a communication apparatus 1100 according to an embodiment of this application. As shown in the figure, the communication apparatus 1100 may include a communication unit 1110 and a processing unit 1120. The communication unit 1110 may communicate with the outside, and the processing unit 1120 is configured to process data. The communication unit 1110 may also be referred to as a communication interface or a transceiver unit. The transceiver unit may include a sending unit and a receiving unit, which are respectively configured to perform sending and receiving steps in the method embodiment. The communication interface is configured to input and/or output information. The information includes at least one of data and instructions. Optionally, the communication apparatus may be a chip or a chip system. When the communication apparatus is a chip or a chip system, the communication interface may be an input/output interface, or may be an input/output interface, an interface circuit, an output circuit, an input circuit, a pin, a related circuit, or the like on the chip or the chip system. The processor may alternatively be a processing circuit or a logic circuit. An input and an output respectively correspond to receiving and sending in the method embodiment.

In another possible design, the communication apparatus 1100 may implement a step or a procedure performed by the network device in the foregoing method embodiment, for example, may be the network device, or a chip, a chip system, or a circuit configured in the network device. In this case, the communication apparatus 1100 may be referred to as a network device. The communication unit 1110 is configured to perform a sending/receiving-related operation on a network device side in the foregoing method embodiment, and the processing unit 1120 is configured to perform a processing-related operation of the network device in the foregoing method embodiment.

In a possible implementation, the communication unit 1110 is configured to:

send configuration information of a cell, where the configuration information of the cell includes M beam failure detection resource groups and M candidate beam resource groups, the M beam failure detection resource groups are in a one-to-one correspondence with the M candidate beam resource groups, and M is an integer.

The communication unit 1110 is further configured to:

receive a first medium access control control element (MAC CE), where the first MAC CE carries beam failure recovery information corresponding to the cell, the first MAC CE is sent by a terminal device when a beam failure occurs in at least one of the M beam failure detection resource groups, and M is an integer greater than 1.

The processing unit 1120 is configured to:

determine, by using the first MAC CE, whether to switch a first beam to a second beam, where the first beam is a beam used to transmit the at least one beam failure detection resource group, the second beam is a beam used to transmit at least one candidate beam resource group in the M candidate beam resource groups, and the at least one candidate beam resource group is in a one-to-one correspondence with the at least one beam failure detection resource group.

Optionally, the processing unit 1120 is further configured to:

determine, by using the first MAC CE, that there is a first candidate beam resource meeting a quality requirement in a candidate beam resource group corresponding to the at least one beam failure detection resource group, and determine information about the first candidate beam resource meeting the quality requirement; and switch the first beam to the second beam.

Optionally, the communication unit 1110 is further configured to:

receive a second MAC CE, where the second MAC CE carries beam failure recovery information corresponding to the cell, the second MAC CE is sent by the terminal device when a beam failure occurs in the M beam failure detection resource groups, and M is an integer equal to 1.

The processing unit 1120 is further configured to:

determine, by using the second MAC CE, whether to switch a third beam to a fourth beam, where the third beam is a beam used to transmit the M beam failure detection resource groups, the fourth beam is a beam used to transmit the M candidate beam resource groups, and the M beam failure detection resource groups correspond to the M candidate beam resource groups.

Optionally, the processing unit 1120 is further configured to:

determine, by using the second MAC CE, that there is a second candidate beam resource meeting a quality requirement in candidate beam resource groups corresponding to the M beam failure detection resource groups, and determine information about the second candidate beam resource meeting the quality requirement; and switch the third beam to the fourth beam.

Optionally, a first logical channel identifier (LCID) corresponding to the first MAC CE is different from a second LCID corresponding to the second MAC CE.

Optionally, the second LCID is 50 or 51.

The first LCID is any one of the following logical channel identifiers: 35, 36, 37, 38, 39, 40, 41, 42, 43, 44, or 47.

It should be understood that the first MAC CE and the second MAC CE are the same as those in the method 500. Therefore, for content that is not described in detail, refer to the descriptions in the method 500.

Figure 19:
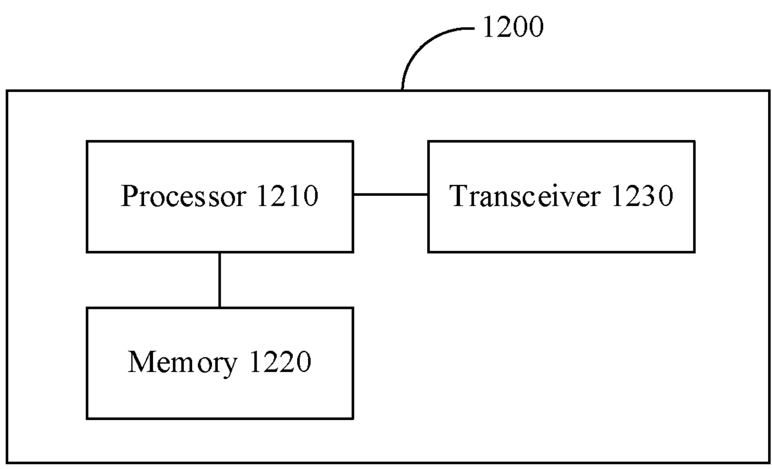
FIG. 19 is a schematic block diagram of a communication apparatus 1200 according to an embodiment of this application.

FIG. 19 is a schematic block diagram of a communication apparatus 1200 according to an embodiment of this application.

As shown in FIG. 19, the communication apparatus 1200 includes a processor 1210, a memory 1220, and a transceiver 1230. The memory 1220 stores a program. The processor 1210 is configured to execute the program stored in the memory 1220. The program stored in the memory 1220 is executed, so that the processor 1210 is configured to perform related processing steps in the foregoing method embodiment, and the program stored in the memory 1220 is executed, so that the processor 1210 controls the transceiver 1230 to perform related sending and receiving steps in the foregoing method embodiment.

In an implementation, the communication apparatus 1200 is configured to perform an action performed by the terminal device in the foregoing method embodiment. In this case, the program stored in the memory 1220 is executed, so that the processor 1210 is configured to perform a processing step on a terminal device side in the foregoing method embodiment, and the program stored in the memory 1220 is executed, so that the processor 1210 controls the transceiver 1230 to perform receiving and sending steps on the terminal device side in the foregoing method embodiment.

In another implementation, the communication apparatus 1200 is configured to perform an action performed by the network device in the foregoing method embodiment. In this case, the program stored in the memory 1220 is executed, so that the processor 1210 is configured to perform a processing step on a network device side in the foregoing method embodiment, and the program stored in the memory 1220 is executed, so that the processor 1210 controls the transceiver 1230 to perform receiving and sending steps on the network device side in the foregoing method embodiment.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for ease and brevity of description, for a detailed working process of foregoing systems, apparatuses, and units, refer to a corresponding process in the foregoing method embodiment. Details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the method described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A beam failure recovery method performed by a terminal device or a chip of a terminal device, wherein the method comprises:

receiving configuration information of a cell, wherein the configuration information of the cell comprises two beam failure detection resource groups and two candidate beam resource groups, the two beam failure detection resource groups are in a one-to-one correspondence with the two candidate beam resource groups; and sending, by using a first medium access control control element (MAC CE), beam failure recovery information corresponding to the cell in response to a beam failure occurring in at least one of the two M beam failure detection resource groups, wherein:

the first MAC CE comprises a bitmap, one bit in the bitmap corresponds to one cell, and the one bit indicates whether a beam failure occurs in the one cell, when a beam failure occurs in the one cell corresponding to the one bit, the one cell corresponds to one or two separate octets in the first MAC CE, and the first MAC CE further comprises a first field separate from the one bit, and the first field indicates whether the one cell corresponds to one or two separate octets in the first MAC CE.

2. The method according to claim 1, wherein each octet in the one or two octets comprises a second field, and the second field indicates information about a beam failure detection resource group in which the beam failure occurs.

3. The method according to claim 2, wherein when the first field indicates that the one bit corresponds to one octet, the second field indicates the information about the beam failure detection resource group in which the beam failure occurs; or wherein the second field is reserved when the first field indicates that the one bit corresponds to two octets.

4. The method according to claim 1, wherein each of the one or two octets further comprises one third field, and the third field indicates a beam failure detection resource group corresponding to the octet.

5. The method according to claim 1, wherein each of the one or two octets further comprises one fourth field, and the fourth field indicates whether there is a candidate beam or candidate beam resource meeting a quality requirement in the candidate beam resource group corresponding to the octet.

6. The method according to claim 1, wherein each of the one or two octets further comprises one fifth field, and the fifth field indicates information about the candidate beam or candidate beam resource that meets a quality requirement and that is in the candidate beam resource group corresponding to the octet.

7. The method according to claim 1, wherein a logical channel identifier corresponding to the first MAC CE is any one of the following logical channel identifiers: 35, 36, 37, 38, 39, 40, 41, 42, 43, 44, or 47.

8. A communication apparatus, comprising:

at least one processor, and a memory, the memory comprising instructions that, when executed by the processor, cause the communication apparatus to:

receive configuration information of a cell, wherein the configuration information of the cell comprises two beam failure detection resource groups and two candidate beam resource groups, the two beam failure detection resource groups are in a one-to-one correspondence with the two candidate beam resource groups;

detect a beam failure in at least one of the two beam failure detection resource groups; and send, by using a first medium access control control element (MAC CE), beam failure recovery information corresponding to the cell in response to the detecting a beam failure, wherein:

the first MAC CE comprises a bitmap, one bit in the bitmap corresponds to one cell, and the one bit indicates whether a beam failure occurs in the one cell, when a beam failure occurs in the one cell corresponding to the one bit, the one cell corresponds to one or two separate octets in the first MAC CE, and the first MAC CE further comprises a first field separate from the one bit, and the first field indicates whether the one cell corresponds to one or two separate octets in the first MAC CE.

9. The communication apparatus according to claim 8, wherein each octet in the one or two octets comprises a second field, and the second field indicates information about a beam failure detection resource group in which the beam failure occurs.

10. The communication apparatus according to claim 9, wherein when the first field indicates that the one bit corresponds to one octet, the second field indicates the information about the beam failure detection resource group in which the beam failure occurs; or wherein the second field is reserved when the first field indicates that the one bit corresponds to two octets.

11. The communication apparatus according to claim 8, wherein each of the one or two octets further comprises one third field, and the third field indicates a beam failure detection resource group corresponding to the octet.

12. The communication apparatus according to claim 8, wherein each of the one or two octets further comprises one fourth field, and the fourth field indicates whether there is a candidate beam or candidate beam resource meeting a quality requirement in the candidate beam resource group corresponding to the octet.

13. The communication apparatus according to claim 8, wherein each of the one or two octets further comprises one fifth field, and the fifth field indicates information about a candidate beam or candidate beam resource that meets a quality requirement and that is in the candidate beam resource group corresponding to the octet.

14. The communication apparatus terminal device according to claim 8, wherein a logical channel identifier corresponding to the first MAC CE is any one of the following logical channel identifiers: 35, 36, 37, 38, 39, 40, 41, 42, 43, 44, or 47.

15. A computer readable medium (CRM) containing non-transitory computer instructions, that when executed by at least one processor of an apparatus, causes the apparatus to perform the steps comprising:

receiving configuration information of a cell, wherein the configuration information of the cell comprises two beam failure detection resource groups and two candidate beam resource groups, the two beam failure detection resource groups are in a one-to-one correspondence with the two candidate beam resource groups; and sending, by using a first medium access control control element (MAC CE), beam failure recovery information corresponding to the cell in response to a beam failure occurring in at least one of the two beam failure detection resource groups, wherein:

the first MAC CE comprises a bitmap, one bit in the bitmap corresponds to one cell, and the one bit indicates whether a beam failure occurs in the one cell, when a beam failure occurs in the one cell corresponding to the one bit, the one cell corresponds to one or two separate octets in the first MAC CE, and the first MAC CE further comprises a first field separate from the one bit, and the first field indicates whether the one cell corresponds to one or two separate octets in the first MAC CE.

16. The computer readable medium according to claim 15, wherein each octet in the one or two octets comprises a second field, and the second field indicates information about a beam failure detection resource group in which the beam failure occurs.

17. The computer readable medium according to claim 16, wherein when the first field indicates that the one bit corresponds to one octet, the second field indicates the information about the beam failure detection resource group in which the beam failure occurs; or wherein the second field is reserved when the first field indicates that the one bit corresponds to two octets.

18. The computer readable medium according to claim 15, wherein each of the one or two octets further comprises one third field, and the third field indicates a beam failure detection resource group corresponding to the octet.

19. The computer readable medium according to claim 15, wherein each of the one or two octets further comprises one fourth field, and the fourth field indicates whether there is a candidate beam or candidate beam resource meeting a quality requirement in the candidate beam resource group corresponding to the octet.

20. The computer readable medium according to claim 15, wherein each of the one or two octets further comprises one fifth field, and the fifth field indicates information about a candidate beam or candidate beam resource that meets a quality requirement and that is in the candidate beam resource group corresponding to the octet.

* * * * *